(12) United States Patent
Uehara

(10) Patent No.: US 12,298,476 B1
(45) Date of Patent: May 13, 2025

(54) IMAGING LENS

(71) Applicant: MEJIRO 67 INC., Tokyo (JP)

(72) Inventor: Makoto Uehara, Tokyo (JP)

(73) Assignee: MEJIRO 67 INC., Tokyo (JP)

( * ) Notice: Subject to any disclaimer, the term of this patent is extended or adjusted under 35 U.S.C. 154(b) by 0 days.

(21) Appl. No.: 18/730,812

(22) PCT Filed: Jan. 23, 2023

(86) PCT No.: PCT/JP2023/001885
§ 371 (c)(1),
(2) Date: Feb. 3, 2025

(87) PCT Pub. No.: WO2023/145678
PCT Pub. Date: Aug. 3, 2023

(30) Foreign Application Priority Data

Jan. 25, 2022 (JP) .................................. 2022-009414

(51) Int. Cl.
*G02B 13/00* (2006.01)
(52) U.S. Cl.
CPC ................. *G02B 13/0015* (2013.01)
(58) Field of Classification Search
CPC .................................................. G02B 13/0015
See application file for complete search history.

(56) References Cited

FOREIGN PATENT DOCUMENTS

| JP | 2014-081485 | * | 5/2014 | ............ G02B 13/00 |
|----|-------------|---|--------|-----------------------|
| JP | 2014-81485 A | | 5/2014 | |
| JP | 2014-178436 A | | 9/2014 | |

OTHER PUBLICATIONS

"Written Opinion" mailed on Mar. 20, 2023 for international application No. PCT/JP2023/001885, international filing date: Jan. 23, 2023.
"International Search Report" mailed on Mar. 20, 2023 for international application No. PCT/JP2023/001885, international filing date: Jan. 23, 2023.

* cited by examiner

*Primary Examiner* — Joseph P Martinez
(74) *Attorney, Agent, or Firm* — Winston Hsu

(57) ABSTRACT

Provided is an imaging lens consisting of a front-group imaging lens having a plurality of lenses in front and behind a diaphragm, and a convex-concave Galilean system composed of a convex lens on the front group side and a concave lens on the imaging plane side, the imaging lens performing focusing by fixing the convex-concave Galileo system near the imaging plane and extending the front-group imaging lens, wherein the surface on the imaging plane side of the lens at the end of the Galileo system on the imaging plane side is a flat surface, and the flat surface is in contact with the end of an image sensor on the imaging lens side, or the front-group imaging lens is a four-group, six-element Gauss lens, a four-group, seven-element Summitar lens, or a five-group, seven-element modified Summitar lens obtained by separating a Summitar front-lens-element doublet lens.

20 Claims, 62 Drawing Sheets

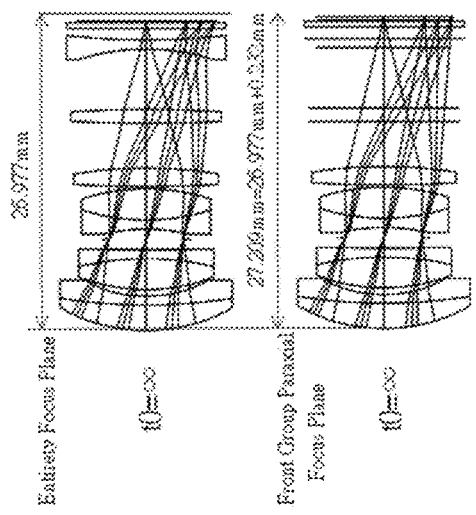

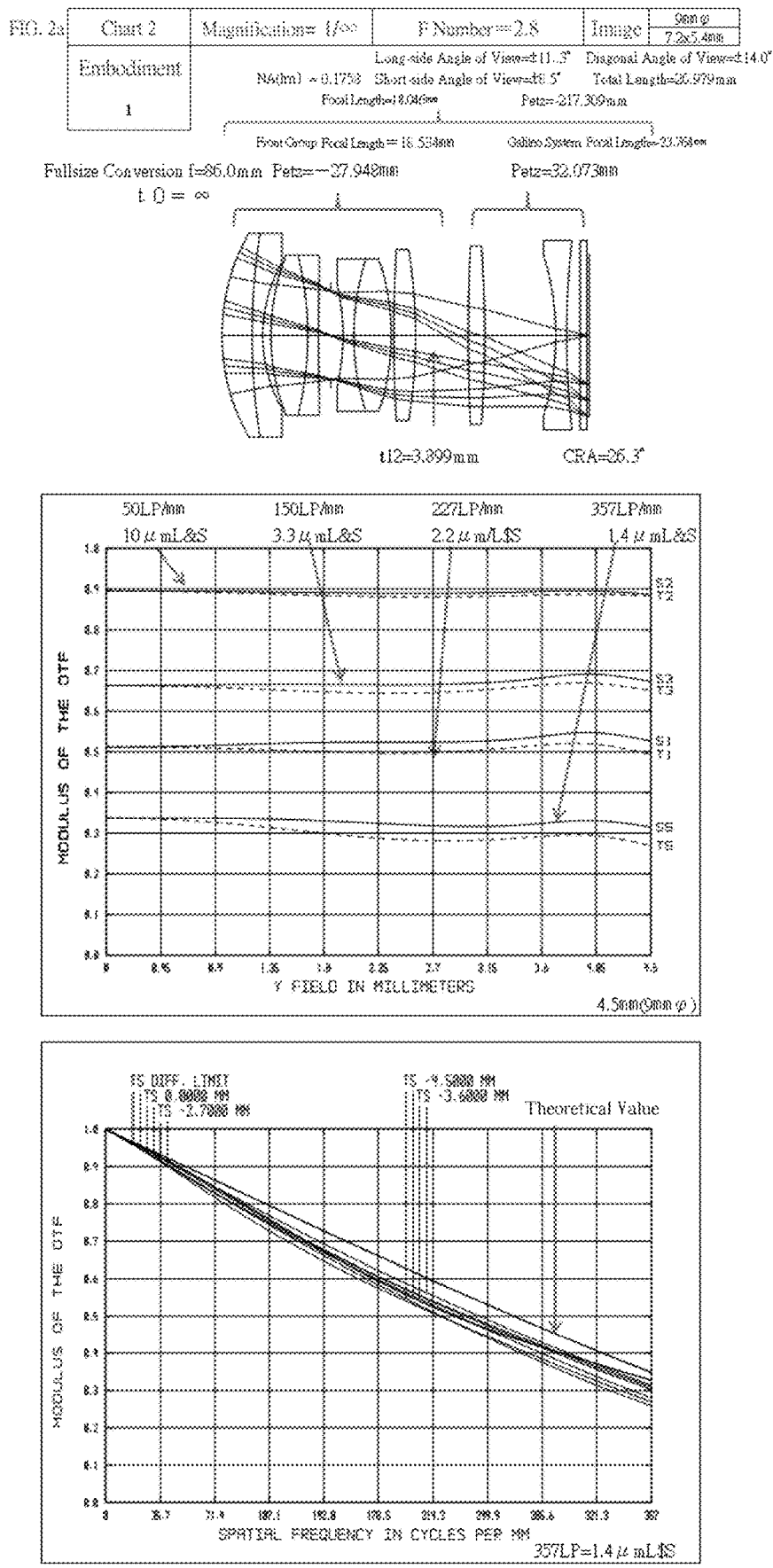

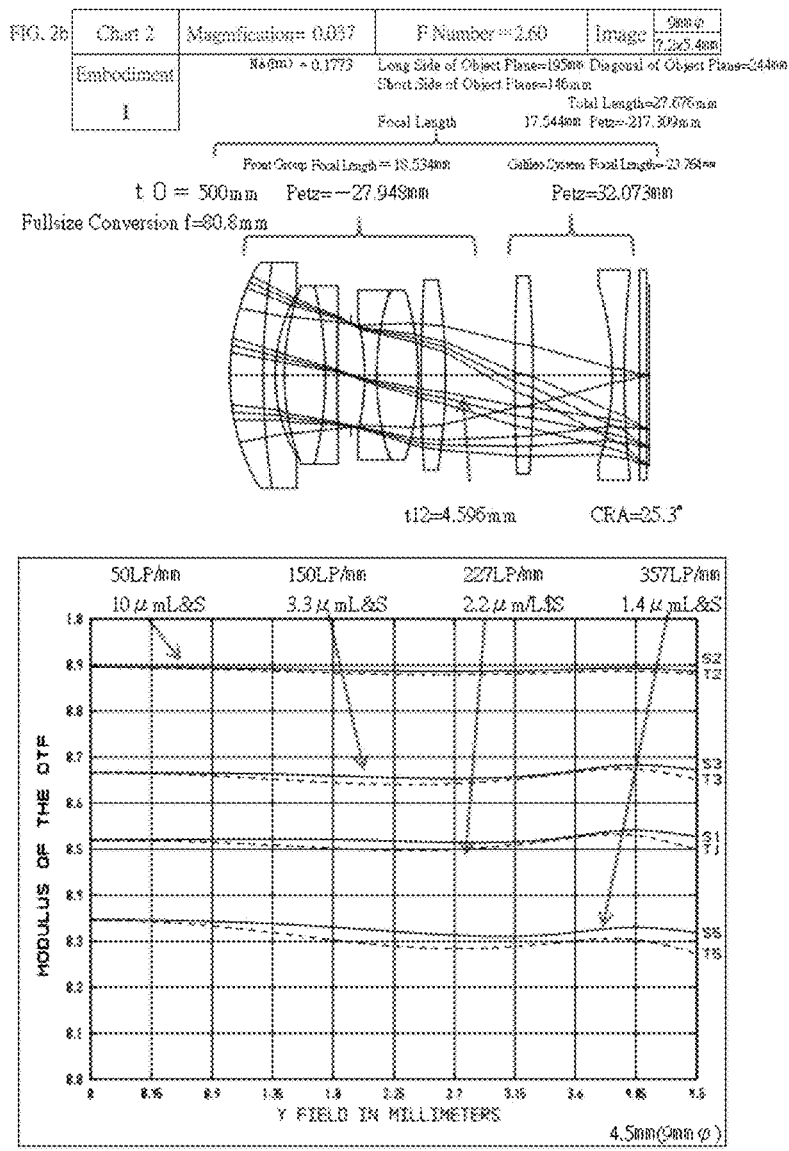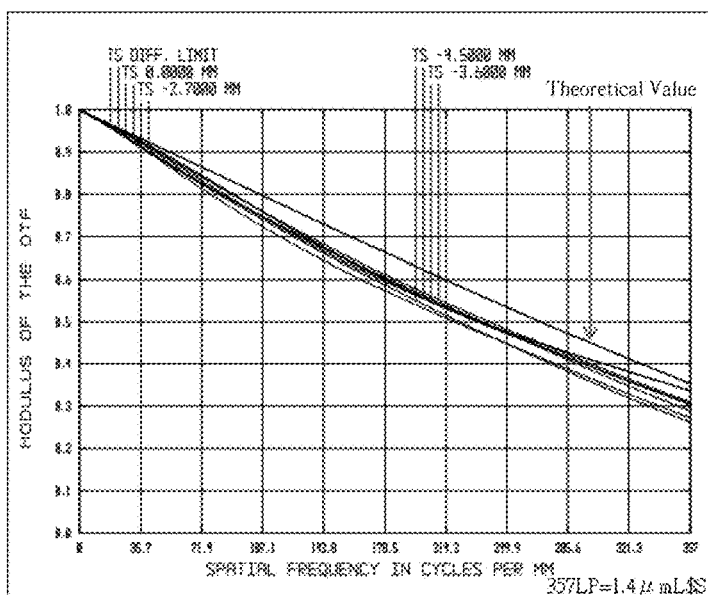

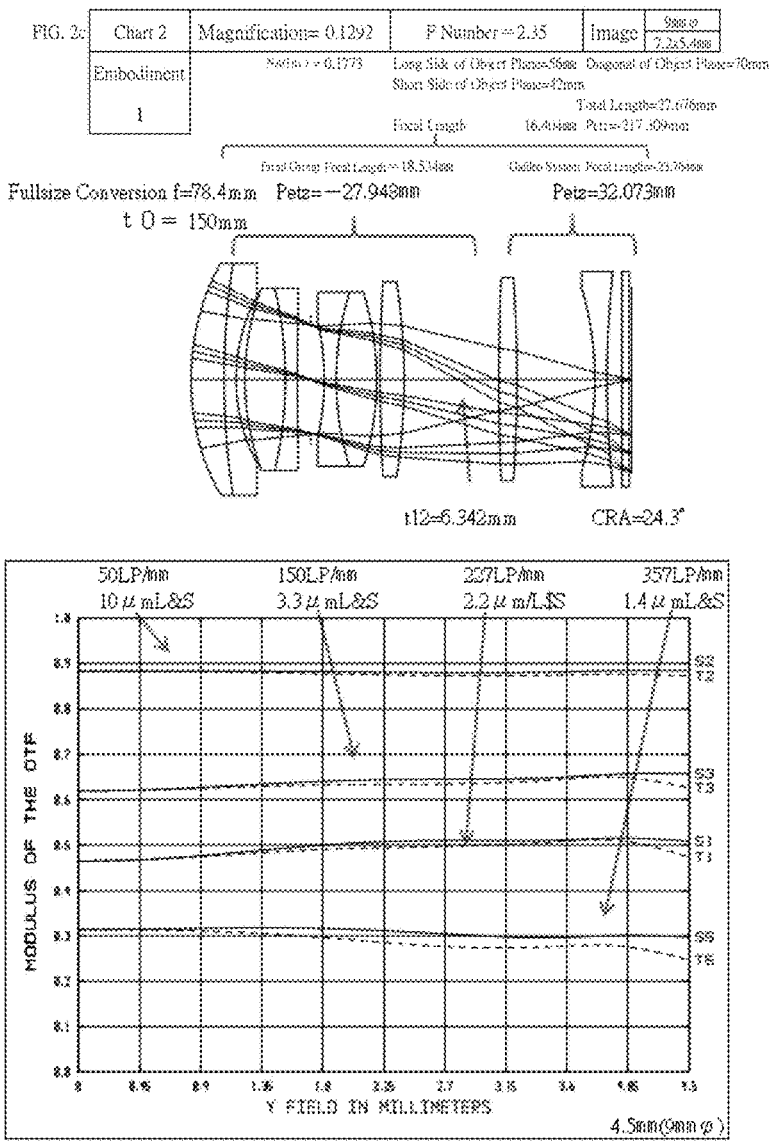
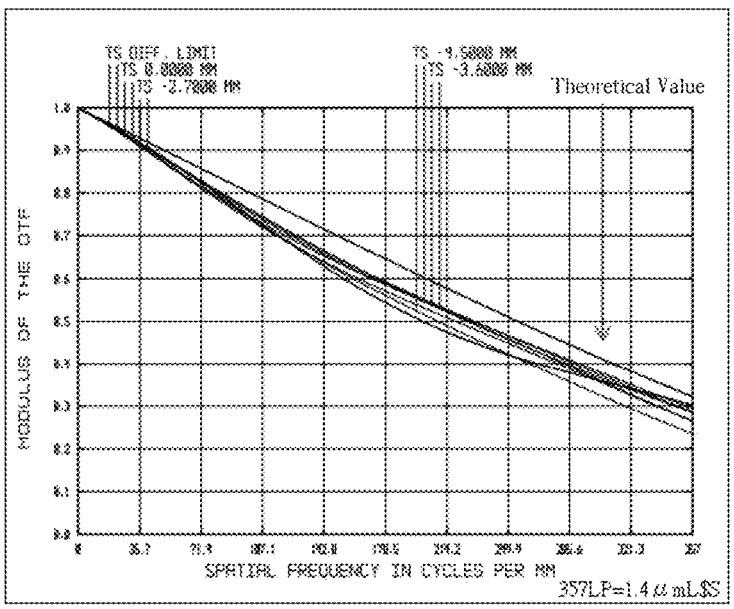

| Chart 3 | Embodiment 1 | | Image | 9mm φ |
|---|---|---|---|---|
| | | | | 7.2x5.4mm |

| Surf | Radius | Thick | Glass | | Semi-Dia |
|---|---|---|---|---|---|
| | | | Index | Abbe | |
| OBJ | Infinity | 1.80E+05 | | | |
| 1 | 8.901 | 2.200 | 1.5952 | 67.736 | 5.600 |
| 2 | 26.709 | 0.800 | 1.5163 | 64.142 | 5.600 |
| 3 | 6.414 | 0.600 | | | 4.000 |
| 4 | 9.312 | 2.700 | 1.4970 | 81.546 | 4.400 |
| 5 | -13.894 | 0.800 | 1.5174 | 52.430 | 4.400 |
| 6 | 97.597 | 0.900 | | | 3.100 |
| STO | Infinity | 0.900 | | | 2.445 |
| 8 | -9.250 | 0.800 | 1.5174 | 52.430 | 2.800 |
| 9 | 10.403 | 2.700 | 1.4970 | 81.546 | 4.200 |
| 10 | -10.529 | 0.200 | | | 4.200 |
| 11 | 61.690 | 1.600 | 1.5952 | 67.736 | 4.700 |
| 12 | -22.156 | 12.842 | | | 4.700 |
| IMA | Infinity | | | | 4.500 |

(a)

| Wavelength[μm] | 0.546 | 0.436 | 0.486 | 0.579 | 0.656 |
|---|---|---|---|---|---|
| Weight | 1.0 | 0.6 | 0.2 | 0.6 | 0.2 |

| Magnification= 1/∞ | F Number= 2.8 | Image | 9mm φ |
|---|---|---|---|
| | | | 7.2x5.4mm |

NA(Im) = 0.1758  
Long-Side Angle of View=±11.3°  
Short-Side Angle of View=±8.5°  
Focal Length 18.534mm  
Radius of Petzval Curvature=-27.948mm  
Front Group  Total Length=27.042mm  
t 0 = 1.80E+05

(a) middle portion

| Surf | Radius | Thick | Glass | | Semi-Dia |
| --- | --- | --- | --- | --- | --- |
| | | | Index | Abee | |
| 13 | 83.395 | 1.200 | 1.5952 | 67.736 | 4.900 |
| 14 | -51.086 | 5.232 | | | 4.900 |
| 15 | -11.250 | 0.800 | 1.5174 | 52.952 | 4.400 |
| 16 | 83.395 | 1.000 | | | 5.200 |
| 17 | -51.086 | 0.491 | 1.5233 | 54.517 | 5.200 |
| 18 | -11.250 | 0.164 | | | 5.200 |
| IMA | 34.500 | | | | 4.500 |

Focal Length  -23.764mm
Pertz=32.073mm
Gelileo System + CMOS lower portion (b)

| Surf | Radius | Thick | Glass | | Semi-Dia |
| --- | --- | --- | --- | --- | --- |
| | | | Index | Abbe | |
| OBJ | Infinity | 1.80E+05 | | | |
| 1 | 5.215 | 2.200 | 1.5952 | 67.736 | 5.600 |
| 2 | 12.845 | 0.800 | 1.5163 | 64.142 | 5.600 |
| 3 | 3.365 | 0.600 | | | 4.000 |
| 4 | 5.967 | 2.700 | 1.4970 | 81.546 | 4.400 |
| 5 | -38.781 | 0.800 | 1.5174 | 52.430 | 4.400 |
| 6 | 8.827 | 0.900 | | | 3.100 |
| STO | Infinity | 0.900 | | | 2.445 |
| 8 | -6.751 | 0.800 | 1.5174 | 52.430 | 2.800 |
| 9 | 9.640 | 2.700 | 1.4970 | 81.546 | 4.200 |
| 10 | -9.254 | 0.200 | | | 4.200 |
| 11 | 35.379 | 1.600 | 1.5952 | 67.736 | 4.700 |
| 12 | -10.909 | 13.031 | | | 4.700 |
| 13 | Infinity | 0.012 | | | 4.5 |
| IMA | Infinity | | | | 4.500 |

| Magnification= 1/∞ | F Number=5.6 | Image | 9mm φ |
| --- | --- | --- | --- |
| | | | 7.2x5.4mm |

NA(Im) = 0.0889

Long-Side Angle of View=±11..3°
Short-Side Angle of View=±8.5°

Focal Length 18.534mm
Radius of Petzval Curvature=-73.263    Total Length=27.243mm t 0 = 1.80E+05

| Chart 4 | Configuration | | Embodiment 2 5-element 2-lens 2-piece Galileo Modified Gauss (Front Separated) + Galileo | | |
|---|---|---|---|---|---|
| Entirety | Image Size | | 1/1.8 inch, 5mm ⌀ 7.2x5.4mm | | |
| | t16 : Galileo Concave-Cover Glass (f[mm]) | | 125 | | |
| | t14 | | 3.995 | 6.395 | |
| | ⓒFocal Length | | 17.409 | 16.957 | |
| | Magnification | | 0.089 | 0.1577 | |
| | Angle of View (Object plane) | Diagonal | 25mm | 5mm | |
| | | Long Side | 20mm | 47mm | |
| | | Short Side | 15mm | 35mm | |
| | Chief Ray Angle | Diagonal | 20.1° | 18.7° | |
| | F/ | | 2.80 | 2.61 | 2.45 |
| | | | 0.018 | 0.017 | 0.252 |
| Front Group | ⓑEntirety Focus Plane – Front Group Paraxial Focus Plane | | | 1.09 | |
| | Radius of Petzval Curvature | | | -55.540 | |
| | ⓓFocal Length | | | 30.275 | |
| | TWD : Required range | | | | 1.12 |
| Galileo | Front Group Focal Length/Galileo Focal Length | | | -0.271 | |
| | Radius of Petzval Curvature | | | 67.360 | |
| | ⓒConvex Focal Length | | 30.910 | Radius of Convex Petzval Curvature | -60.194 |
| | ⓕConcave Focal Length | | 33.363 | Radius of Concave Petzval Curvature | 35.639 |
| | ⓔ/ⓕFocal Length Ratio | | -0.710 | Concave/Convex Petzval Ratio | 0.592 |

| Surf | Radius | Thick | Index | Abbe | Semi-Dia |
|---|---|---|---|---|---|
| OBJ | Infinity | ∞ | | | |
| 1 | Infinity | 1.001 | | | 6.390 |
| 2:aspheric | 14.091 | 2.200 | 1.5183 | 64.063 | 6.390 |
| 3 | 172.952 | 0.100 | | | 5.400 |
| 4 | 10.833 | 0.800 | 1.5174 | 52.430 | 4.290 |
| 5 | 5.393 | 0.600 | | | 4.090 |
| 6 | 6.124 | 4.200 | 1.5952 | 67.736 | 4.090 |
| 7 | -6.733 | 0.800 | 1.5174 | 52.430 | 4.600 |
| 8 | 5.524 | 1.000 | | | 2.400 |
| STO | Infinity | 1.000 | | | 2.100 |
| 10 | -9.716 | 0.800 | 1.5174 | 52.430 | 2.400 |
| 11 | 6.299 | 2.800 | 1.5952 | 67.736 | 3.900 |
| 12 | -12.256 | 0.200 | | | 3.900 |
| 13 | 34.816 | 1.900 | 1.5952 | 67.736 | 4.390 |
| 14 | -85.397 | 0.14 | | | 4.900 |
| 15 | 82.439 | 1.800 | 1.5952 | 67.736 | 4.900 |
| 16 | -47.946 | 3.179 | | | 4.900 |
| 17 | -15.115 | 0.800 | 1.5174 | 52.430 | 5.400 |
| 18 | 63.932 | 1.000 | | | 5.100 |
| 19 | Infinity | 0.800 | 1.5233 | 54.517 | 5.100 |
| 20 | Infinity | 0.200 | | | 5.100 |
| IMA | | | | | 4.500 |

| Surf | Radius | 2nd Term | 4th Term | 6th Term | 8th Term | 10th Term |
|---|---|---|---|---|---|---|
| 2:aspheric | 14.091 | 0.0000 | -2.785e-05 | -2.785e-06 | -5.795e-07 | 8.192e-09 | -1.925e-10 |

| Wavelength (nm) | 0.586 | 0.486 | 0.656 |
|---|---|---|---|
| Weight | 1.0 | 0.2 | 0.2 |

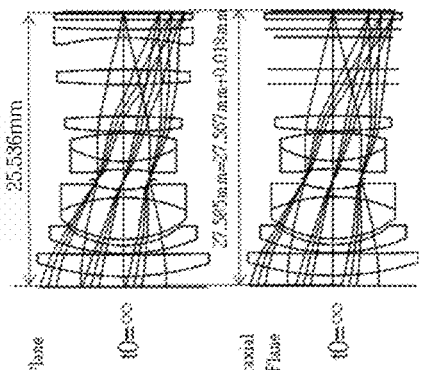

(b)

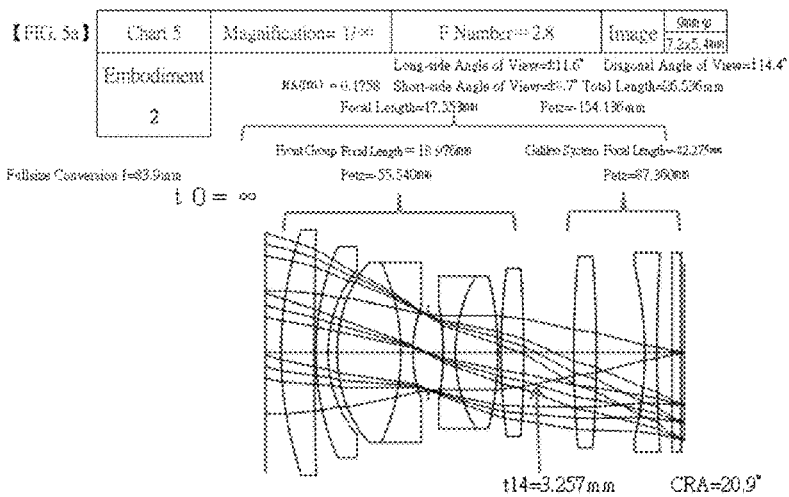
[FIG. 5a]
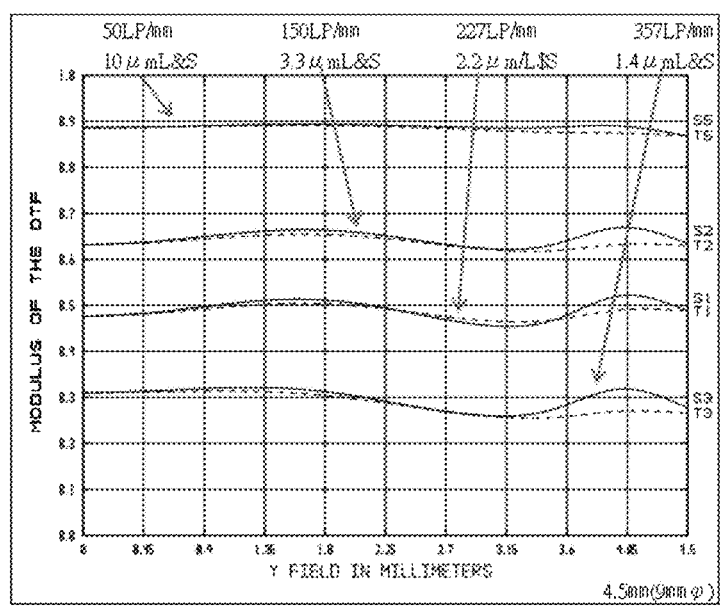
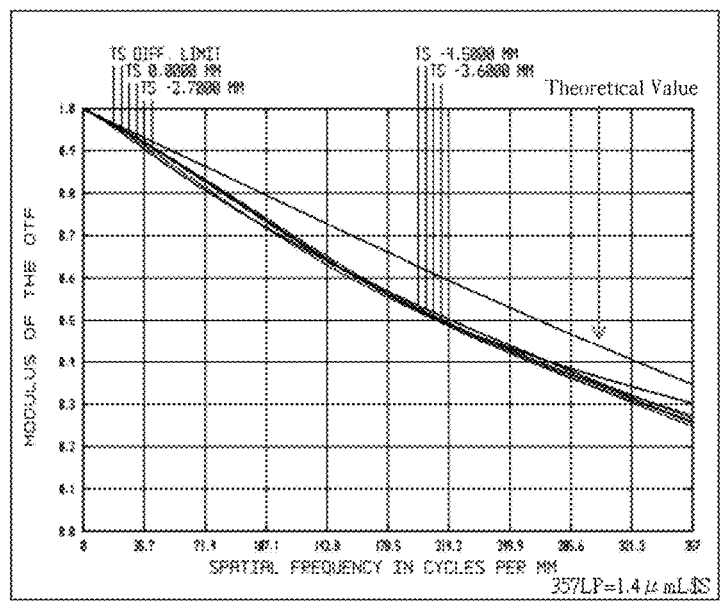

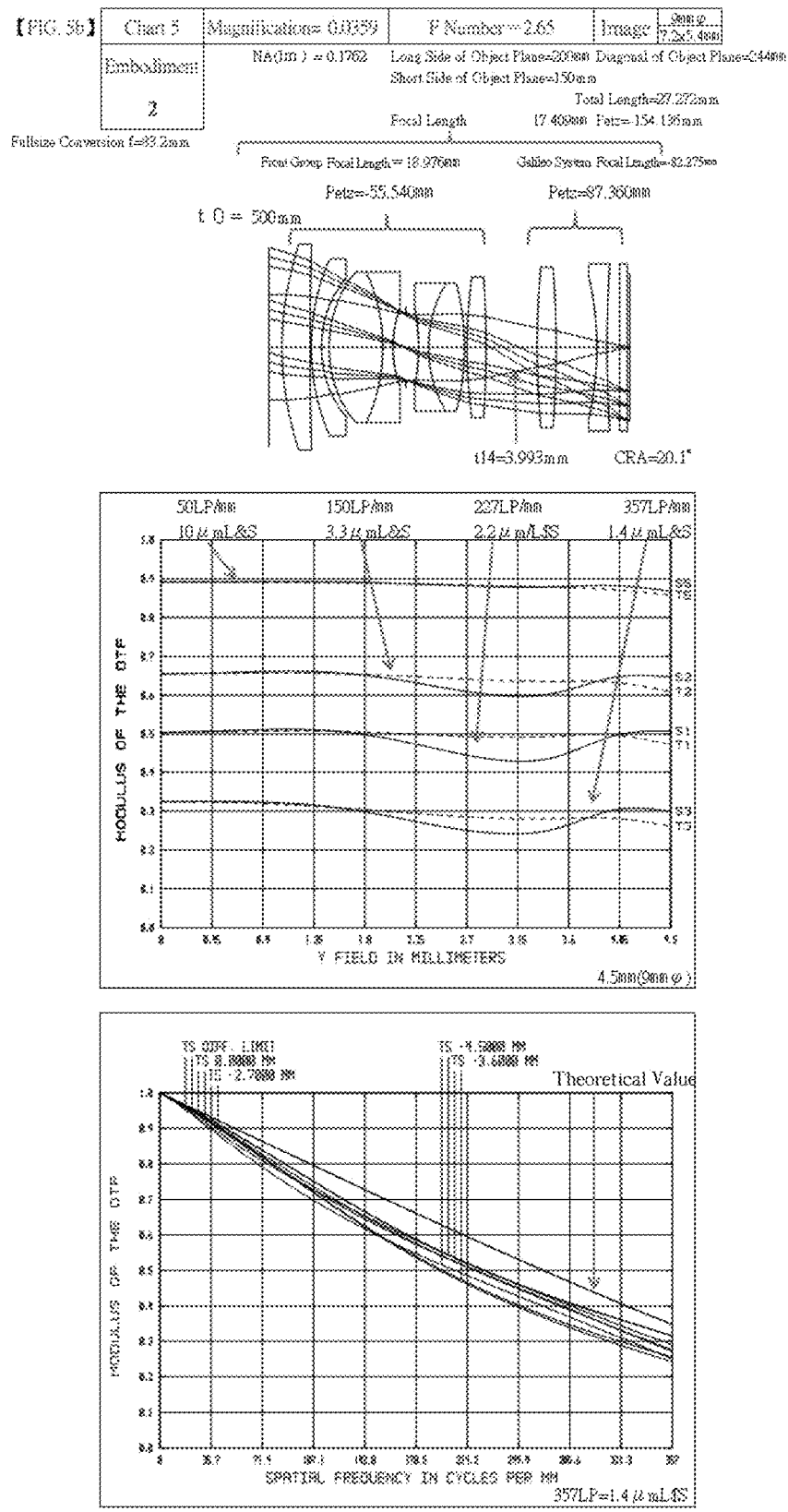

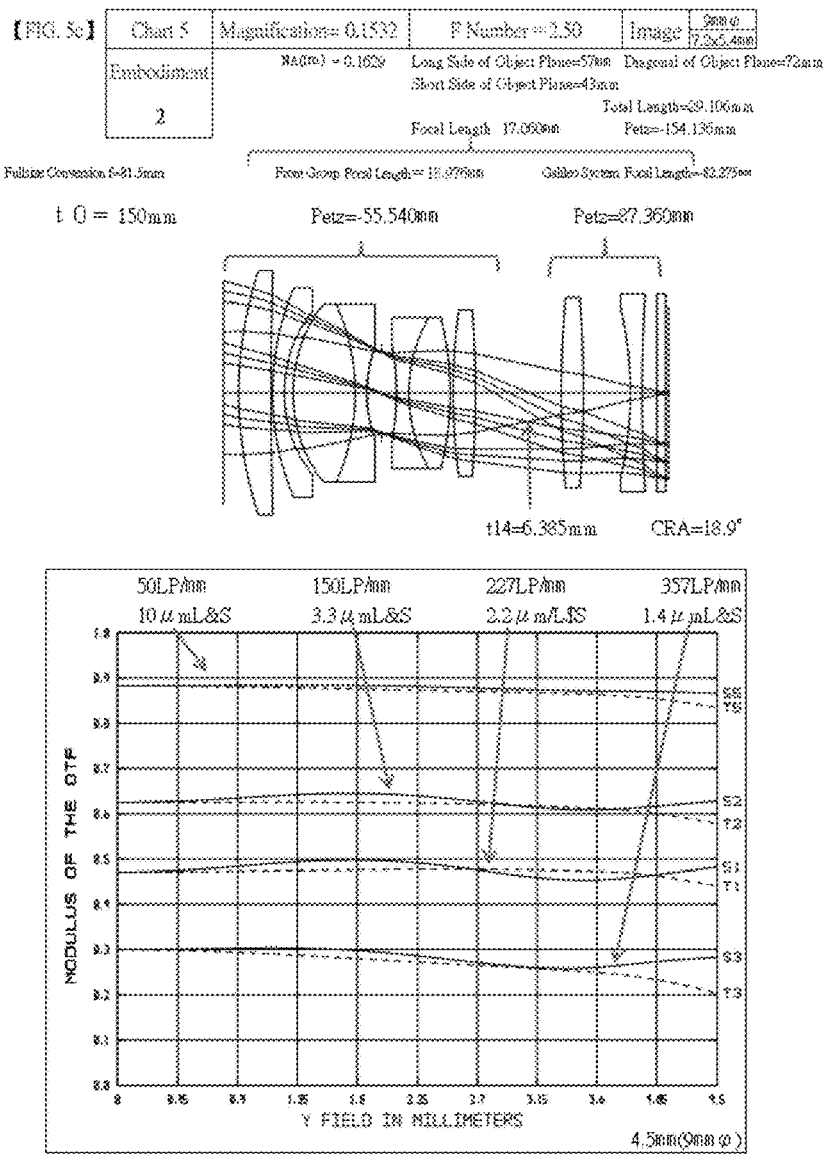
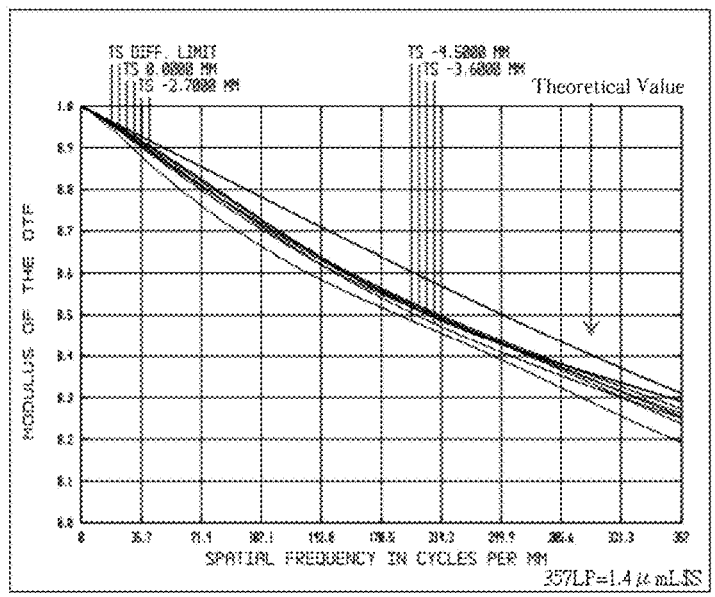

[FIG. 6]

Chart 6

| Configuration | | | | Embodiment 3 4-division-7-piece + 2-piece Galileo Modified Gauss (Summitar) + Galileo | |
|---|---|---|---|---|---|
| | Image Size | | | 1/1.8 inch 5mm φ 7.2×5.4mm | |
| | t16 : Galileo Concave-Cover Glass | | | 1mm | |
| | t[21][mm] | | | 500 | 150 |
| Entirety | ①Focal Length | | | 15.524 1.491 | 2.673 |
| | Magnification | | | 1/∞ 15.182 | 14.357 |
| | Angle of View (Object plane) | Diagonal | | ±16.2° 0.0314 | 0.107 |
| | | Long Side | | ±13.2° 287mm | 84mm |
| | | Short Side | | ±9.9° 229mm | 67mm |
| | Chief Ray Angle | Diagonal | | 29.3° 172mm | 50mm |
| | F/ | | | 2.95 | 28.2° |
| | ②Entirety Focus Plane - Front Group Paraxial Focus Plane | | | 0.115 3.725 | 2.50 |
| | Radius of Petzval Curvature | | | -132.037 0.1171 | 0.128 |
| Front Group | ③Focal Length | | | 14.658 | |
| | ②/③ : Required range | | | 0.94 0.97 | 1.02 |
| | Radius of Petzval Curvature | | | 23.058 | |
| | Front Group Focal Length/Galileo Focal Length | | | 20.459 | |
| Galileo | ④Focal Length | | | -0.718 | |
| | Radius of Petzval Curvature | | | 23.937 | |
| | ①Convex Focal Length | | | 54.694 | Radius of Convex Petzval Curvature -87.32 |
| | ②Concave Focal Length | | | -13.362 | Radius of Concave Petzval Curvature 21.166 |
| | ③Nl Focal Length Ratio | | | -0.244 | Concave/Convex Petzval Ratio -0.242 |

| Surf | Radius | Thick | Glass Index | Abbe | Semi-Dia |
|---|---|---|---|---|---|
| OBJ | Infinity | 0 | | | 5.600 |
| 1 | 7.199 | 2.300 | 1.5952 | 67.736 | 4.800 |
| 2 | 11.012 | 0.800 | 1.5163 | 64.142 | 3.600 |
| 3 | 4.911 | 1.000 | | | 3.600 |
| 4 | 9.403 | 3.300 | 1.4970 | 81.546 | 4.400 |
| 5 | -7.915 | 0.800 | 1.5174 | 52.430 | 4.400 |
| 6 | -63.792 | 0.900 | | | 3.100 |
| STO | Infinity | 0.900 | | | 1.900 |
| 8 | -8.343 | 0.800 | 1.5174 | 52.430 | 2.800 |
| 9 | 9.069 | 3.100 | 1.4970 | 81.546 | 4.000 |
| 10 | -7.396 | 0.200 | | | 4.000 |
| 11 | 29.095 | 1.600 | 1.5952 | 67.736 | 4.300 |
| 12 | -40.640 | t12 | | | 4.300 |
| 13 | 955.979 | 1.300 | 1.5952 | 67.736 | 4.400 |
| 14 | -33.809 | 5.421 | | | 4.400 |
| 15 | -9.862 | 0.800 | 1.5714 | 52.952 | 4.000 |
| 16 | 35.508 | 1.000 | 1.5233 | 54.517 | 5.200 |
| 17 | Infinity | 0.491 | | | 5.200 |
| 18 | Infinity | 0.164 | | | 4.500 |
| IMA | | | | | |
| Wavelength[μm] | 0.546 | 0.436 | 0.486 | 0.579 | 0.6563 |
| Weight | 1.0 | 0.6 | 0.2 | 0.2 | 0.2 |

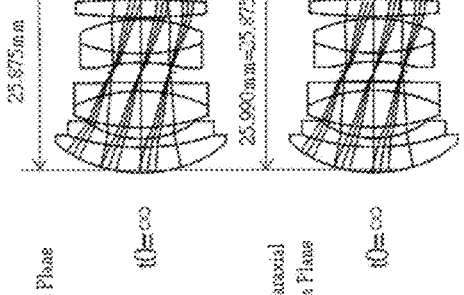

Entirety Focus Plane  t0=∞

Front Group Paraxial Focus Plane  t0=∞

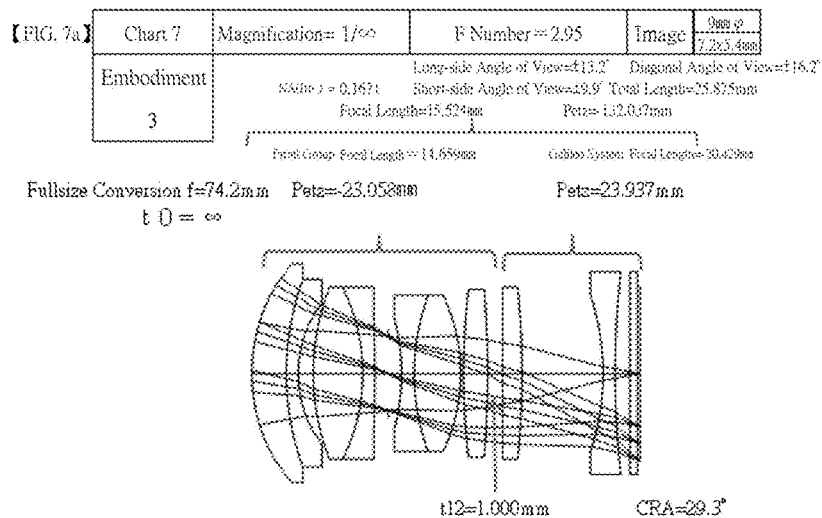
[FIG. 7a]
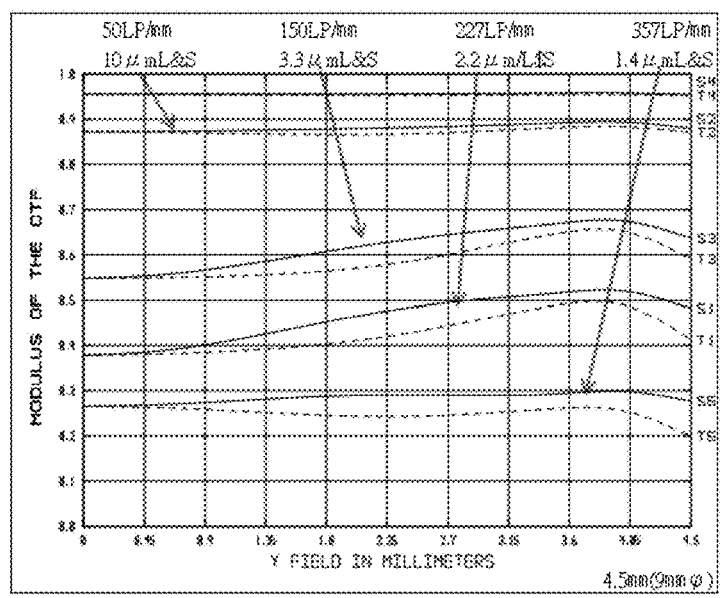
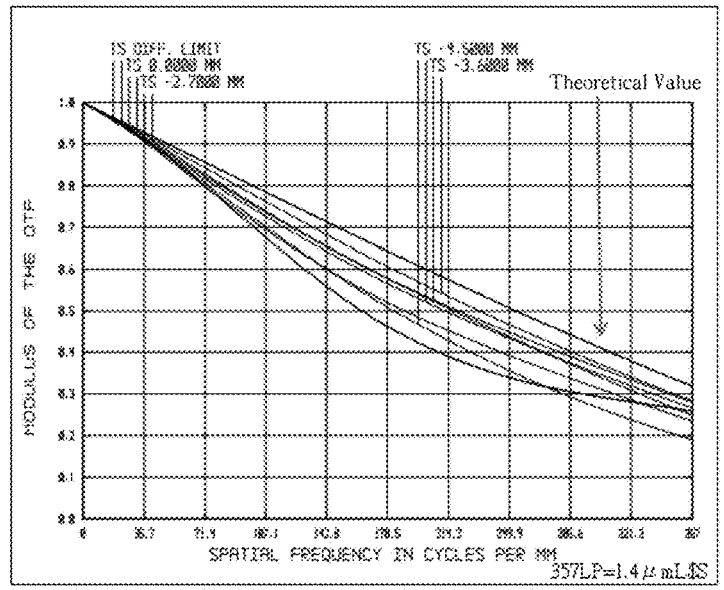

[FIG. 7b]
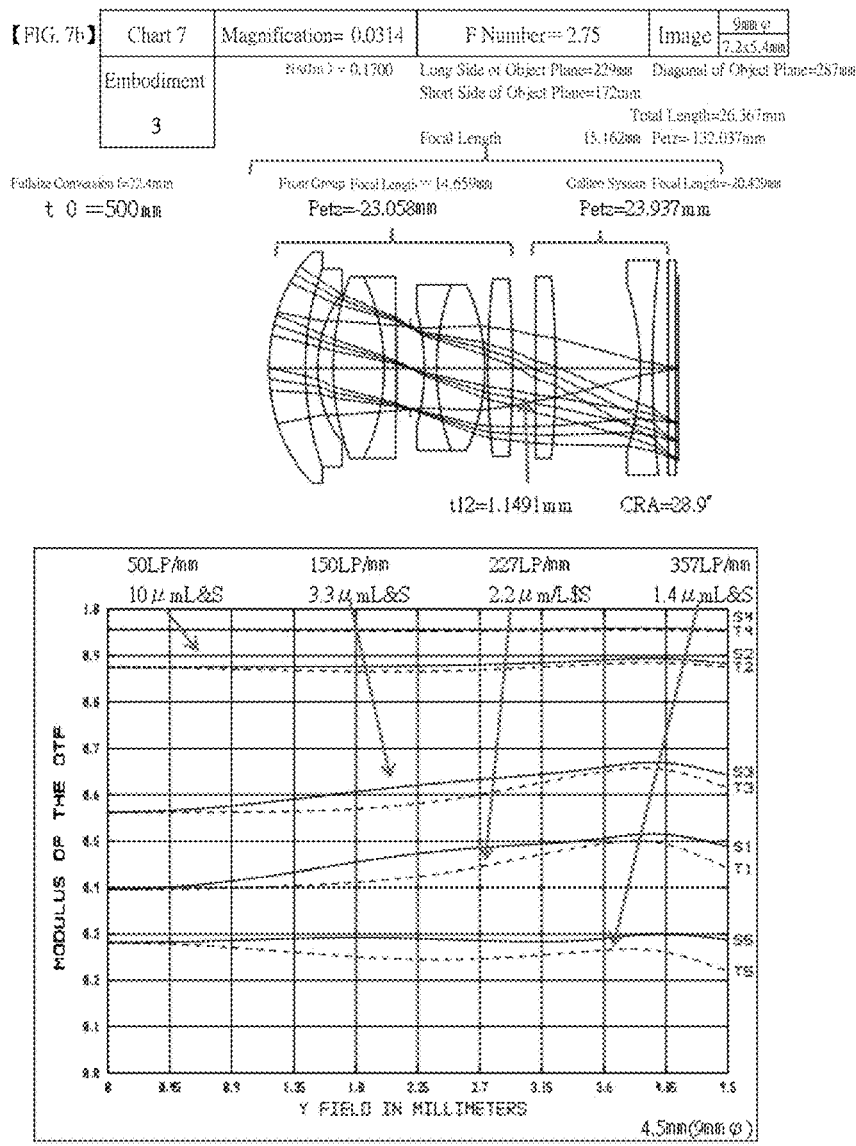
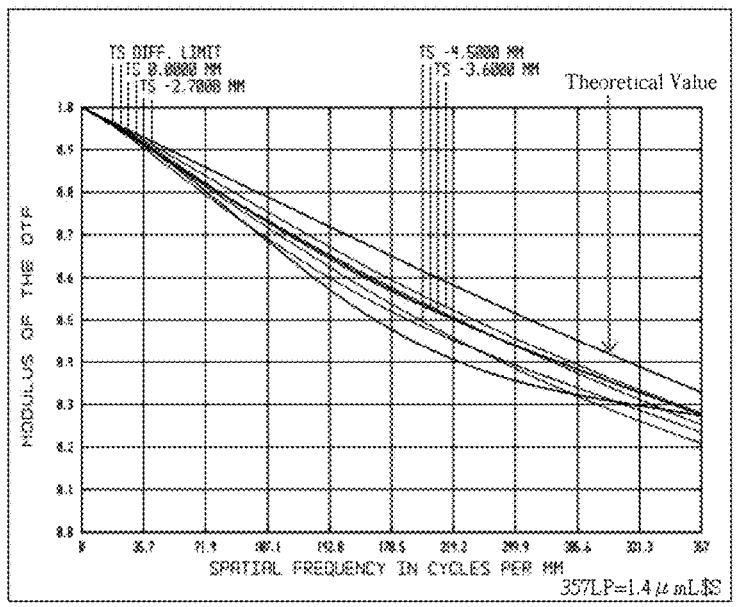

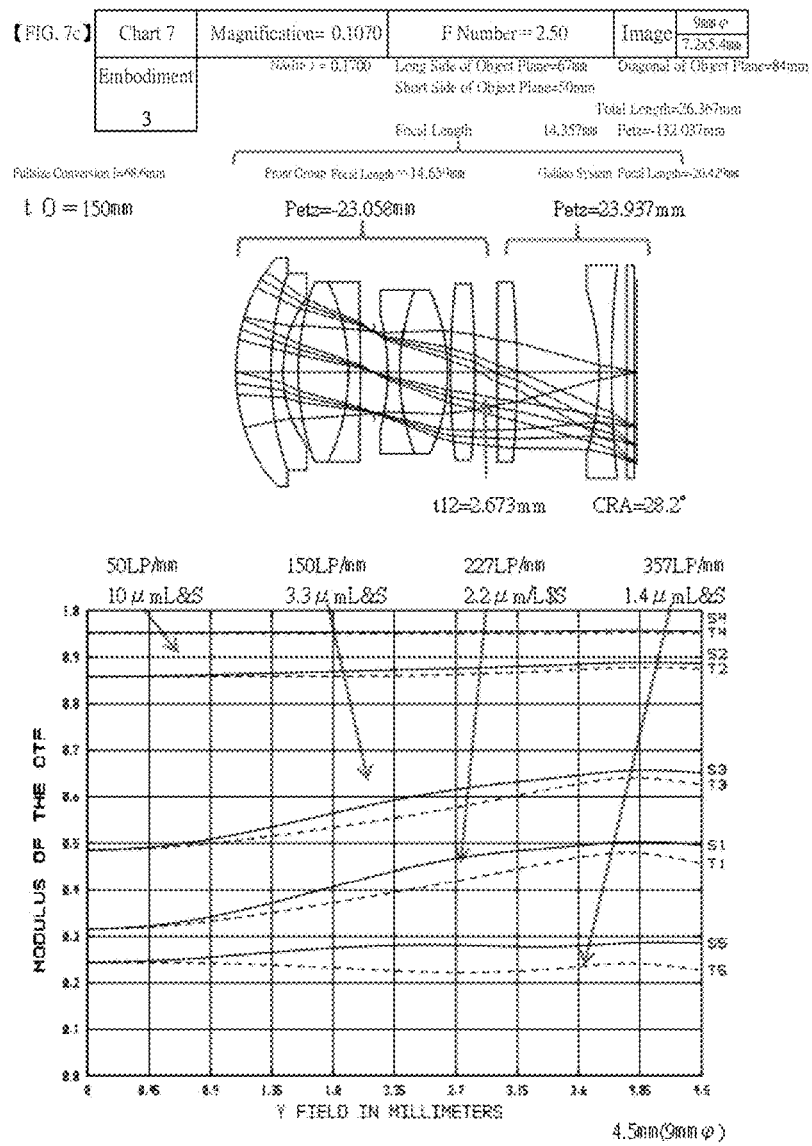
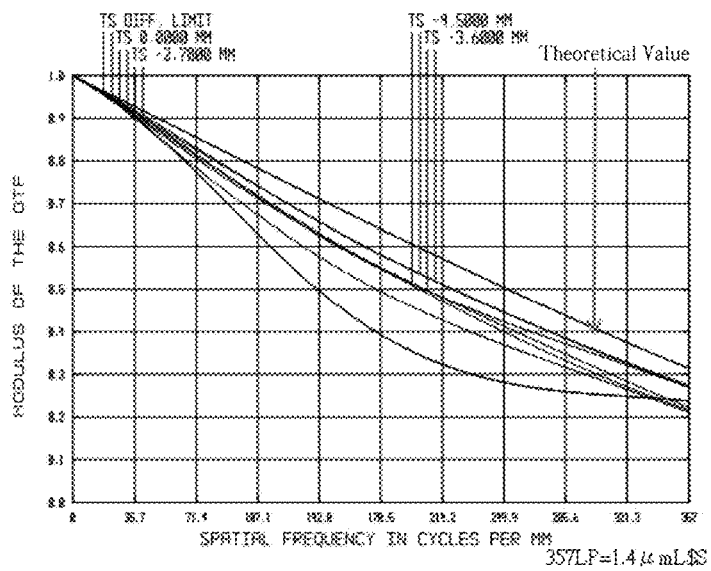

[FIG. 8]

Chart 8

| Configuration | | |
|---|---|---|
| Image Size | | |
| t6 : Galileo: Concave-Cover Glass | | |
| tD | | |
| Entirety | ①Focal Length | ∞ |
| | Magnification | 10.45% |
| | | Diagonal | Yes |
| | Angle of View (Object plane) | Long Side | ±10.2° |
| | | Short Side | 19.5° |
| | Chief Ray Angle | Diagonal | 16.5° |
| | F/ | | 20.1° |
| | ②Entirety Focus Plane – Front Group Paraxial Focus Plane | | 2.60 |
| | Radius of Petzval Curvature | | 0.076 |
| Front Group | ③Focal Length | | -356.900 |
| | ④D : Required image | | 24.796 |
| | Radius of Petzval Curvature | | 1.05 |
| Galileo | ⑤Focal Length | | -29.671 |
| | Front Group Focal Length/Galileo Focal Length | | -33.514 |
| | Radius of Petzval Curvature | | -0.737 |
| | ⑥Convex Focal Length | | 44.661 |
| | ⑦Concave Focal Length | | 48.174 |
| | ⑧Focal Length Ratio | | -17.925 |
| | | | 0.369 |

| | | |
|---|---|---|
| Radius of Convex Petzval Curvature | | .77 |
| Radius of Concave Petzval Curvature | | 28.243 |
| Concave/Convex Petzval Ratio | | 0.367 |

Embodiment 4

4 division-7 piece + 2 piece Galileo
Modified Gauss (9mm diameter) + Galileo
1/1.8 inch 9mm φ 7.2×5.4mm

| Surf | Radius | Thick | Glass Index | Glass Abbe | Semi-Dia |
|---|---|---|---|---|---|
| OBJ | Infinity | ∞ | | | 6.300 |
| 1 | 11.325 | 2.900 | 1.5852 | 67.736 | 6.300 |
| 2 | 97.191 | 0.800 | 1.5163 | 64.142 | 6.300 |
| 3 | 9.334 | 0.600 | | | 4.700 |
| 4 | 11.257 | 2.500 | 1.4970 | 81.546 | 5.300 |
| 5 | -27.630 | 0.800 | 1.5174 | 52.430 | 5.300 |
| 6 | 72.811 | 0.900 | | | 5.300 |
| STO | Infinity | 0.900 | | | 3.900 |
| 9 | -11.998 | 0.900 | 1.5174 | 52.430 | 3.900 |
| 9 | 14.164 | 2.800 | 1.4970 | 81.546 | 5.300 |
| 10 | -14.307 | 0.200 | | | 5.300 |
| 11 | 199.554 | 1.600 | 1.5892 | 67.736 | 5.300 |
| 12 | -22.565 | t2 | | | 5.300 |
| 13 | 28.348 | 1.400 | 1.5953 | 67.726 | 5.300 |
| 14 | -113.011 | 4.050 | | | 5.300 |
| 15 | -15.019 | 0.800 | 1.5714 | 52.952 | 4.500 |
| 16 | 52.766 | 1.000 | 1.5233 | 54.317 | 5.200 |
| 17 | Infinity | 0.491 | | | 5.200 |
| 18 | Infinity | 0.154 | | | 4.500 |
| IMA | | | | | |

| Wavelength(μm) | 0.546 | 0.496 | 0.486 | 0.799 | 0.656 |
| Weight | 1.0 | 0.6 | 0.6 | 0.6 | 0.2 |

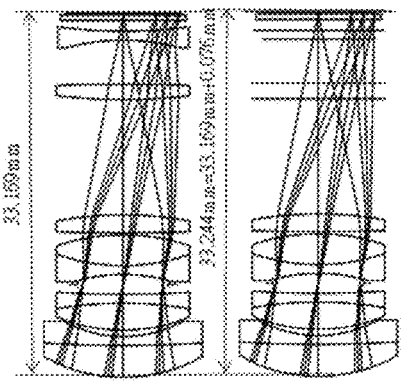

(a) Entirety Focus Plane  t0=∞

(b) Front Group Paraxial Focus Plane  t0=∞

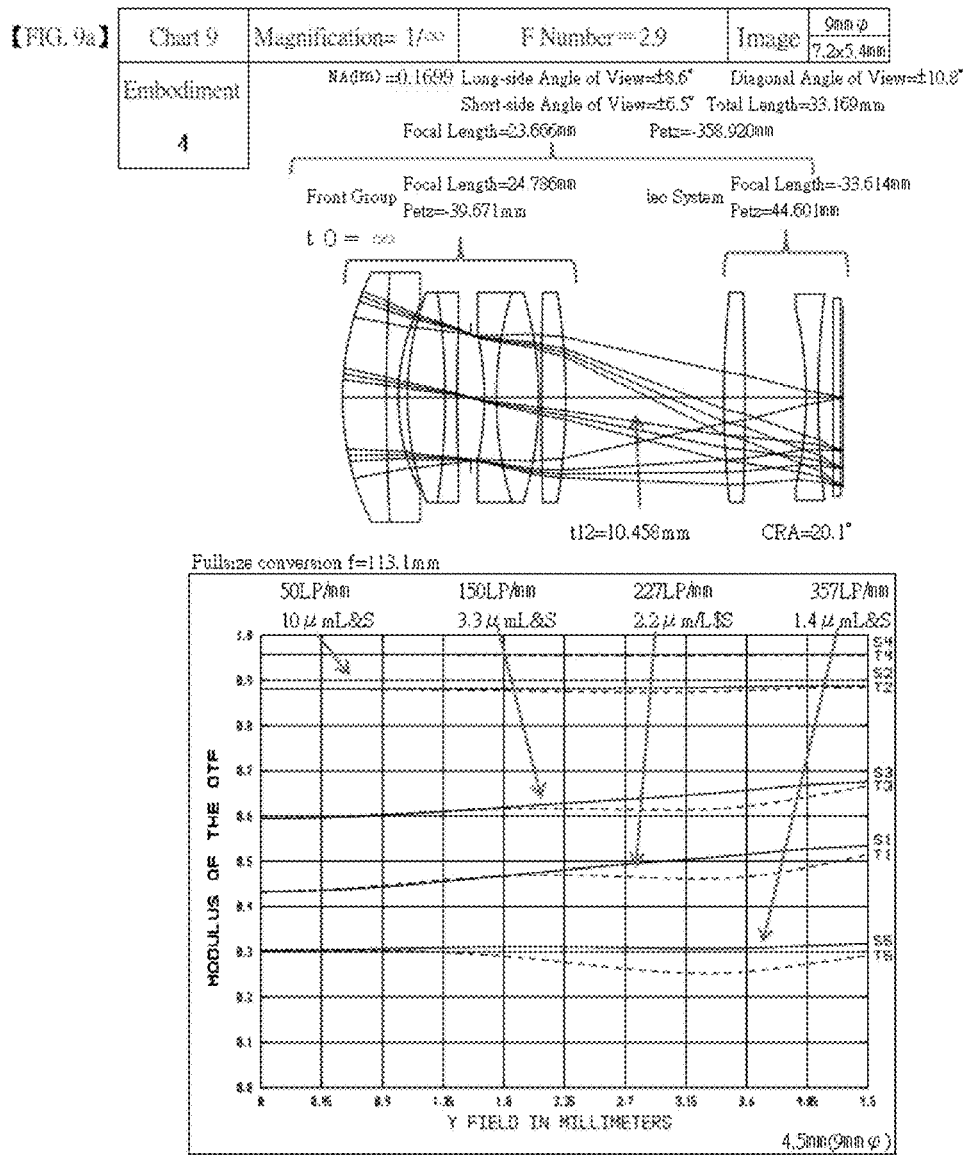
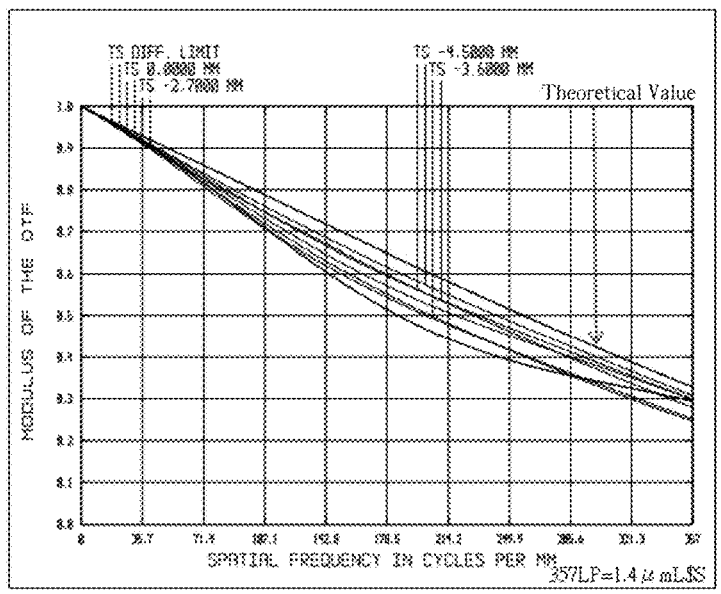

[FIG. 9b]
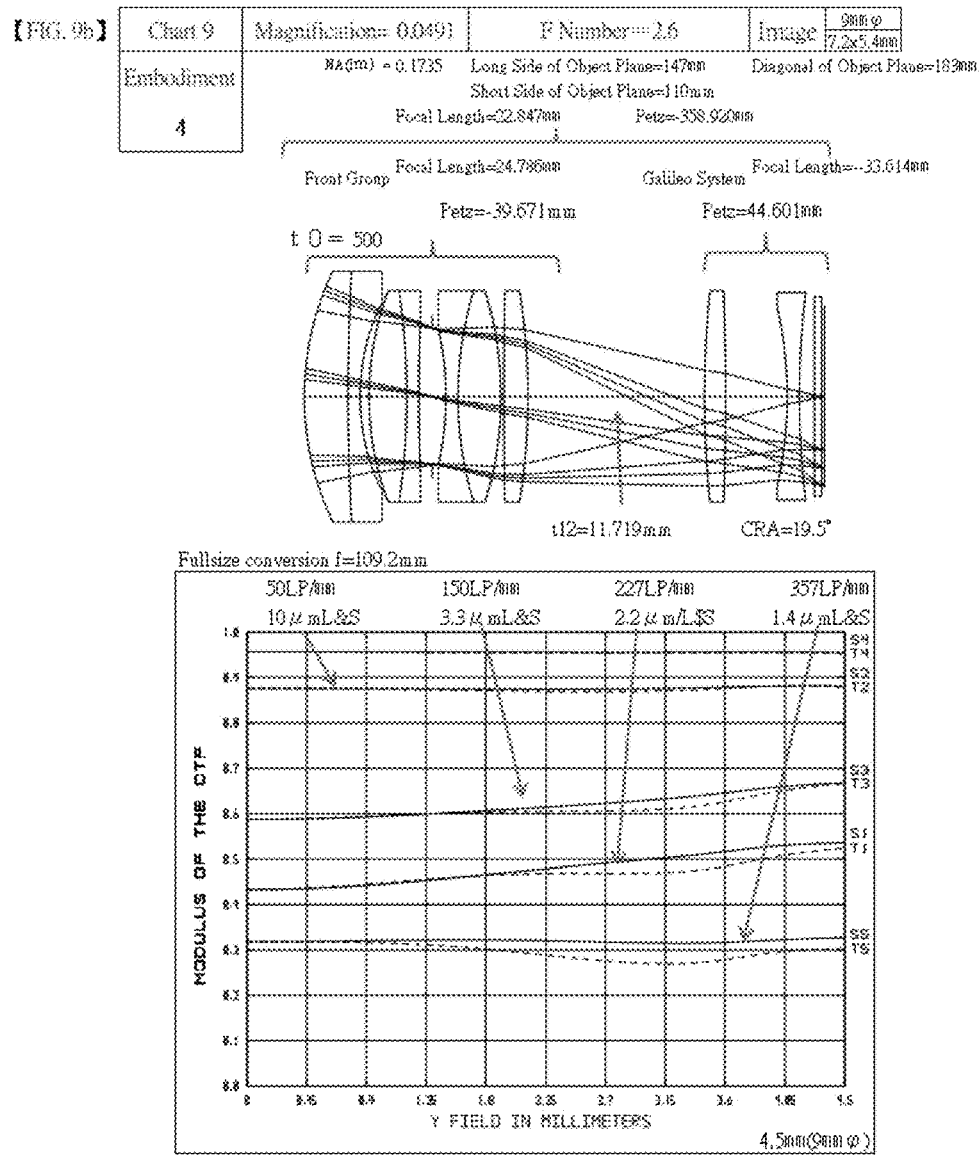
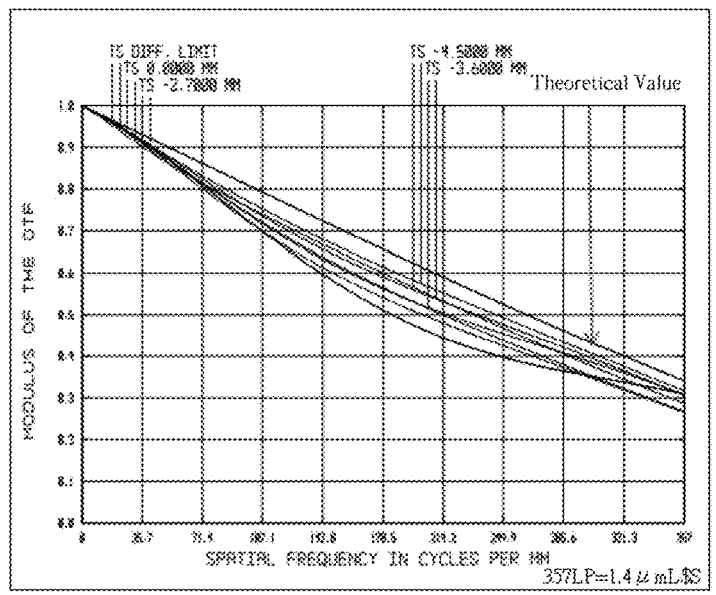

[FIG. 9c]
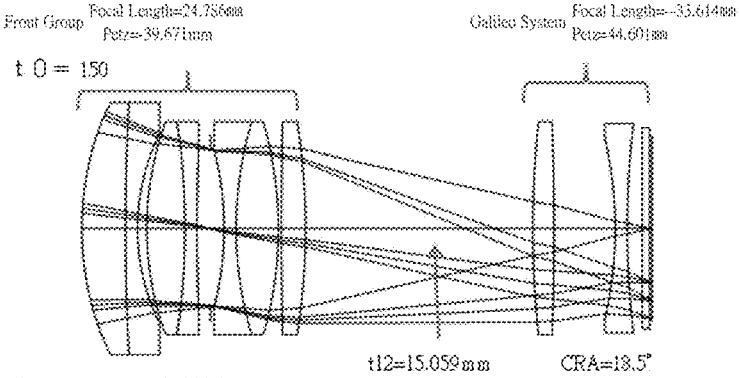
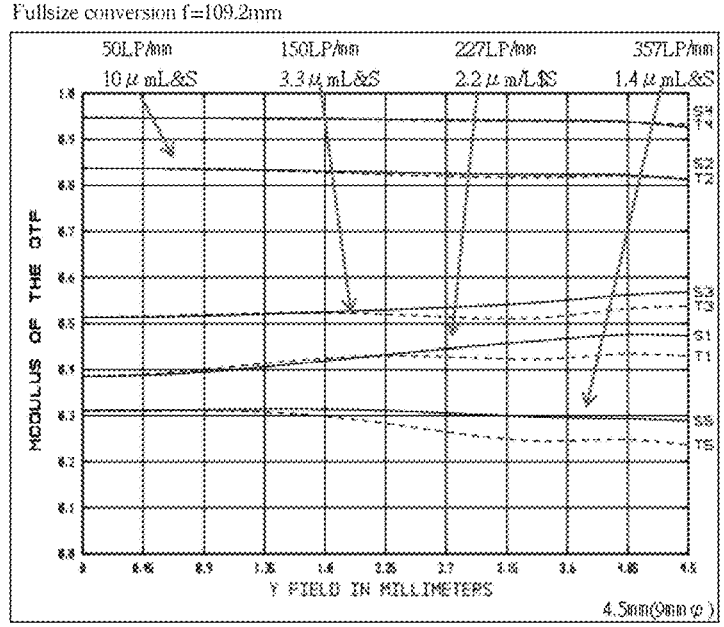
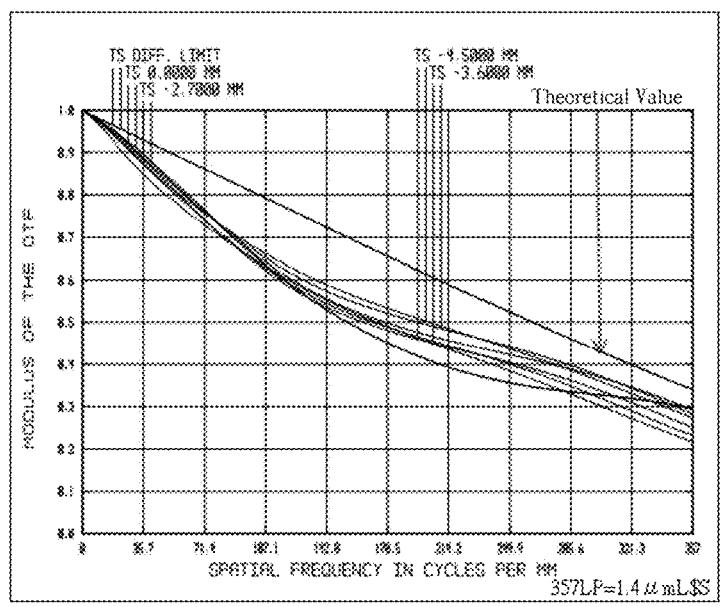

[Chart 10]

Embodiment 5
4-division 6-piece + 2-piece Galilean
Gauss Galilean

| | Configuration | | | | | | | | | |
|---|---|---|---|---|---|---|---|---|---|---|
| | Image Size | 1/1.8 inch 9mm Φ 7.2×5.4mm | | | | | | | | |
| | t16 : Galilean Concave-Convex Glass | 1mm | | | | | | | | |
| Entirety | ①[mm] | ∞ | 150 | | | | | | | |
| | ②t1 | 4.426 | 5.116 | 6.830 | | | | | | |
| | ③Focal Length | 19.077 | 17.550 | 16.380 | | | | | | |
| | Magnification | 1/∞ | 0.0369 | 0.1209 | | | | | | |
| | Angle of View (Object plane) Diagonal | ±14.6° | 24mm | 60mm | | | | | | |
| | Long Side | ±11.3° | 19.2mm | 55mm | | | | | | |
| | Short Side | ±8.5° | 14.4mm | 42mm | | | | | | |
| | Chief Ray Angle Diagonal | 35.5° | 26.0° | 24.5° | | | | | | |
| | F/ | 2.90 | 2.91 | | | | | | | |
| | ④Entirety Focus Plane - Front Group Paraxial Focus Plane | 0.149 | 0.153 | 0.169 | | | | | | |
| Front Group | ⑤Focal Length | -29.855 | | | | | | | | |
| | | 18.460 | | | | | | | | |
| | ⑥MO : Focused image | 1.02 | 1.05 | 1.13 | | | | | | |
| | Radius of Petzval Curvature | 22.036 | | | | | | | | |
| | ⑦Focal Length | 22.916 | | | | | | | | |
| Galileo | | -0.806 | | | | | | | | |
| | Radius of Petzval Curvature | 31.056 | | | | | | | | |
| | ⑧Front Group Focal Length/Galileo Focal Length | 53.053 | Radius of Convex Petzval Curvature | -26.691 | | | | | | |
| | ⑨Convex Focal Length | -14.388 | Radius of Concave Petzval Curvature | 22.795 | | | | | | |
| | ⑩Concave Focal Length | -0.267 | Concave/Convex Petzval Ratio | -0.263 | | | | | | |
| | ⑪F-focal Length Ratio | | | | | | | | | |

| Surf | Radius | Thick | Glass Index | Abbe | Semi-Dia |
|---|---|---|---|---|---|
| OBJ | Infinity | 0 | | | |
| 1 | 8.072 | 2.200 | 1.6935 | 53.205 | 5.200 |
| 2 | 6.772 | 0.600 | | | 3.900 |
| 3 | 9.363 | 2.700 | 1.4970 | 81.546 | 4.400 |
| 4 | -13.565 | 0.800 | 1.5174 | 52.431 | 4.400 |
| 5 | 102.371 | 0.800 | | | 4.400 |
| STO | Infinity | 0.800 | | | 2.700 |
| 7 | -9.051 | 0.800 | 1.5174 | 52.431 | 2.800 |
| 8 | 10.496 | 2.700 | 1.4970 | 81.546 | 4.200 |
| 9 | -10.196 | 0.200 | | | 4.200 |
| 10 | 87.699 | 1.600 | 1.5923 | 67.736 | 4.200 |
| 11 | -21.082 | 1.11 | | | 4.700 |
| 12 | 73.961 | 1.400 | 1.5923 | 67.736 | 4.900 |
| 13 | -26.777 | 5.147 | | | 4.900 |
| 14 | -11.196 | 0.800 | 1.5714 | 52.953 | 4.400 |
| 15 | 33.045 | 1.000 | | | 5.200 |
| 16 | Infinity | 0.491 | 1.5233 | 54.517 | 5.200 |
| 17 | Infinity | 0.200 | | | 5.200 |
| IMA | | | | | 4.500 |

| Wavelength[ μ m] | 0.546 | 0.436 | 0.486 | 0.579 | 0.656 |
|---|---|---|---|---|---|
| Weight | 1.0 | 0.6 | 0.3 | 0.6 | 0.2 |

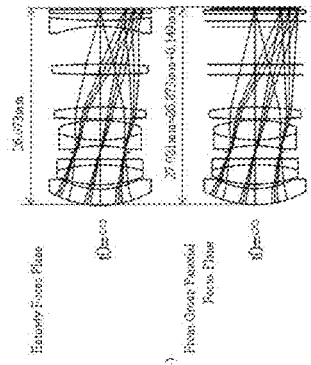

[FIG. 10]

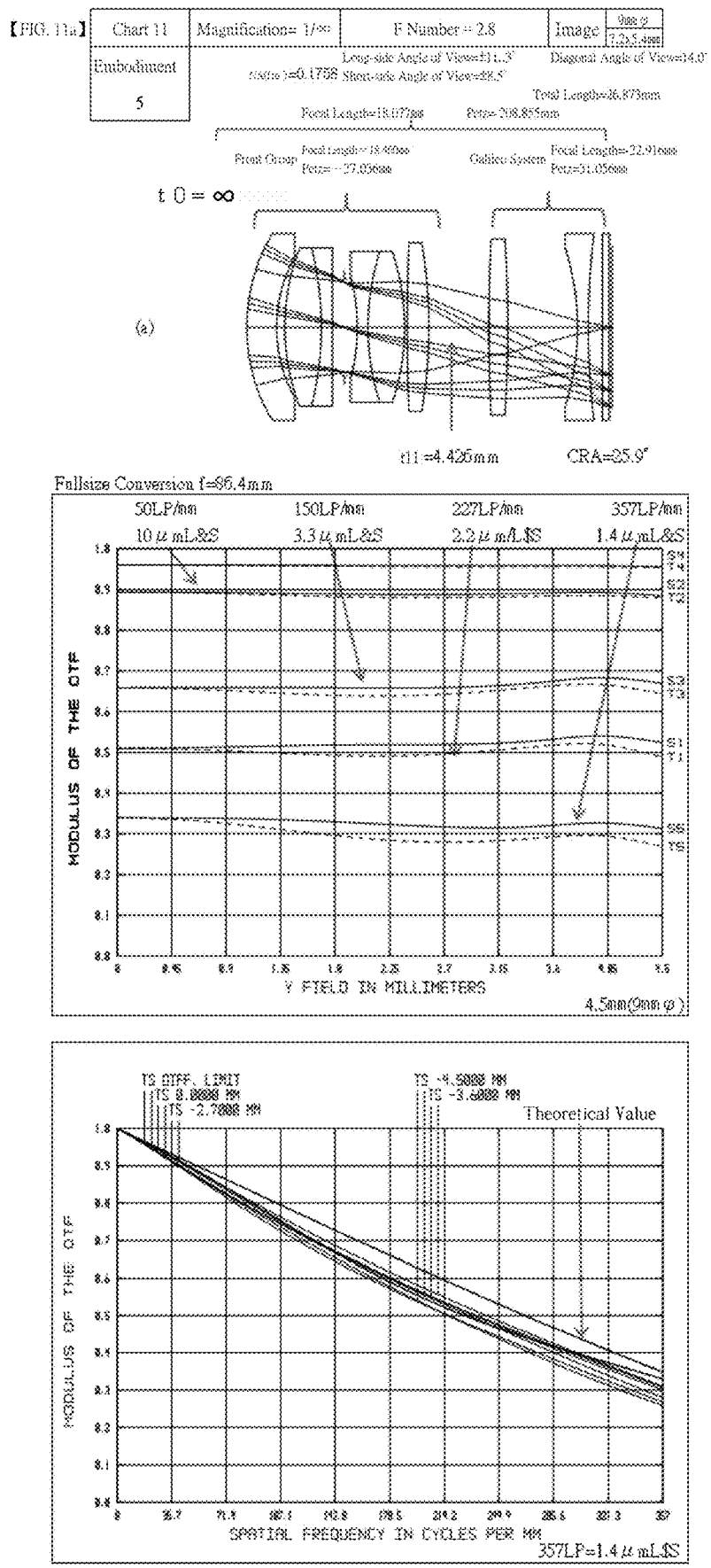

[FIG. 11b]
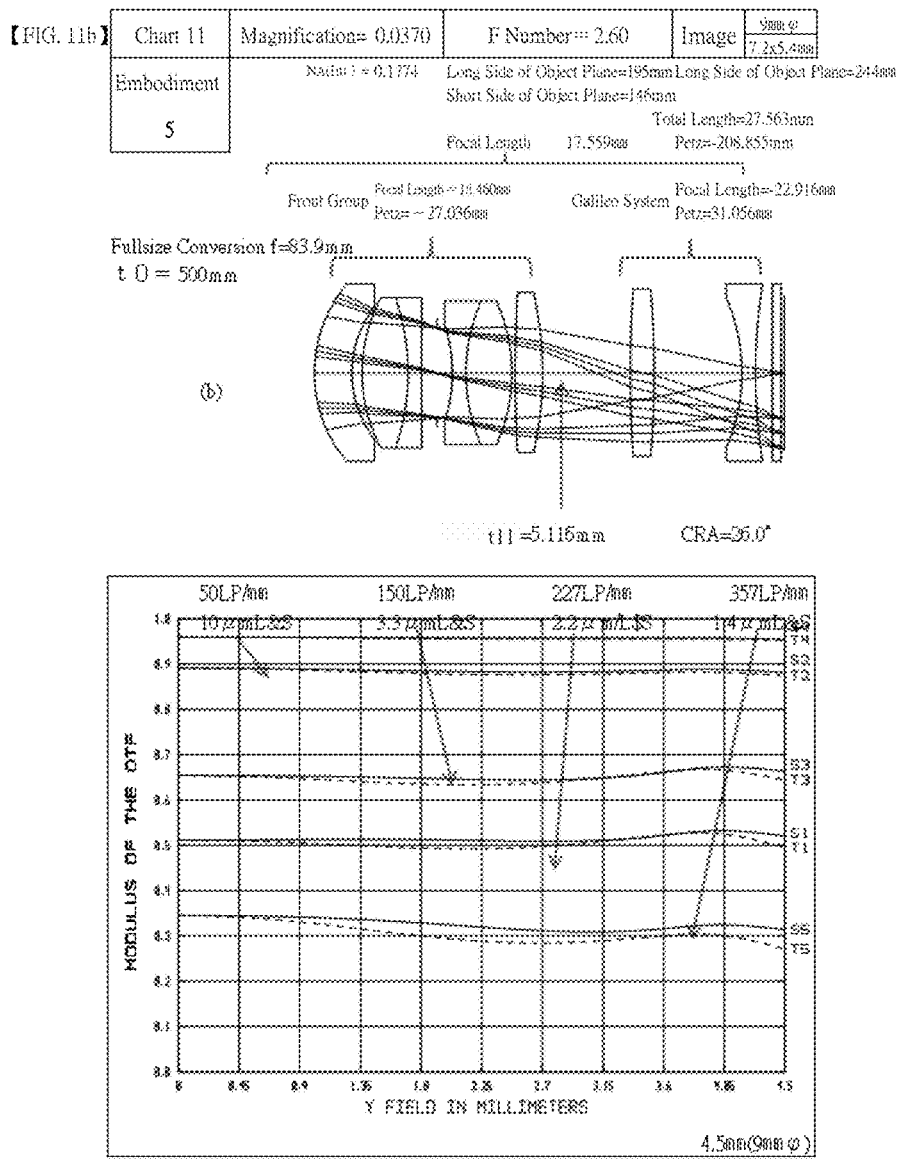
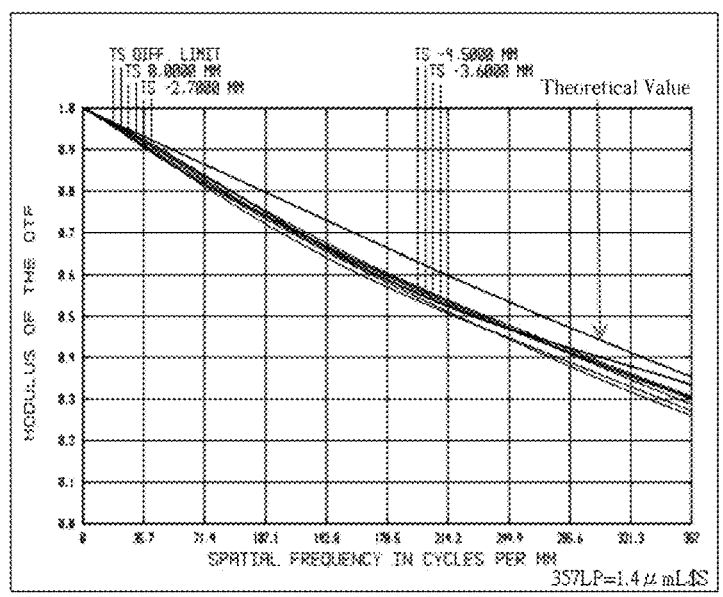

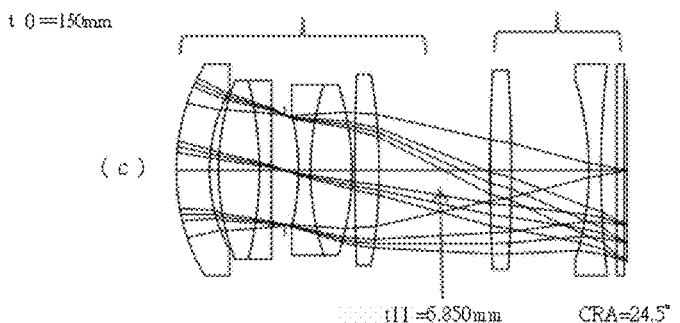
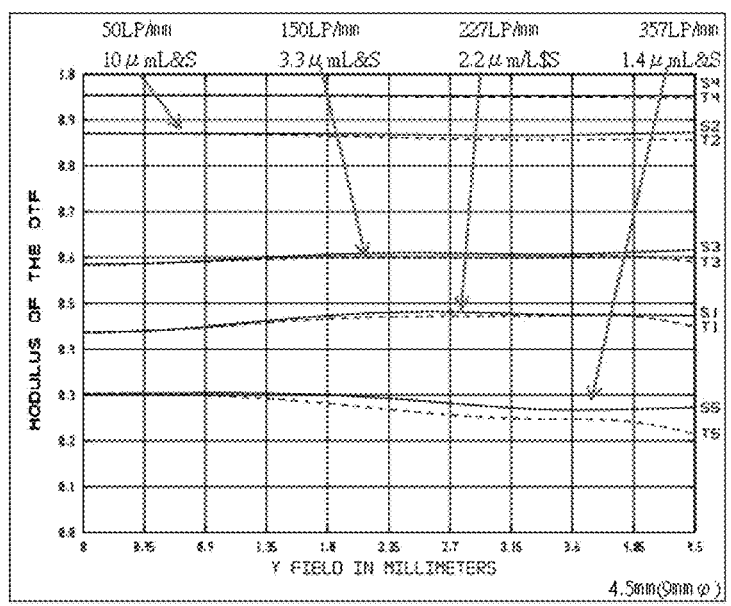
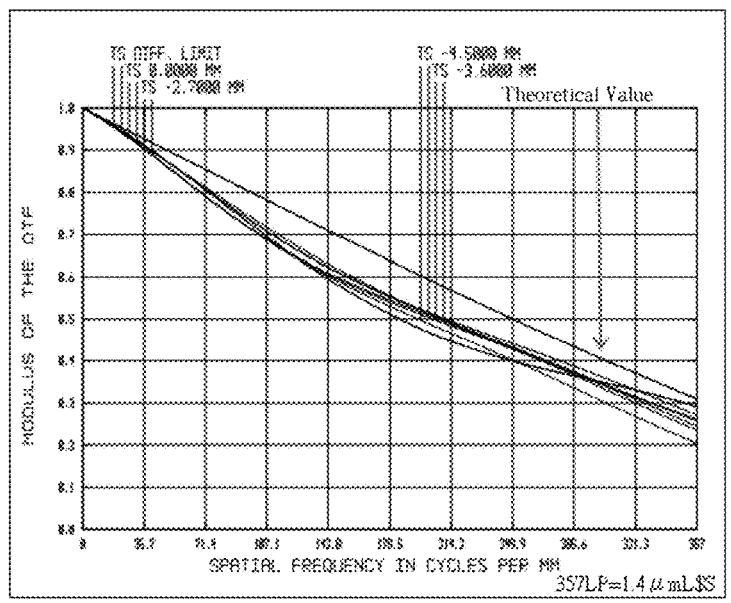

Chart 12

| | Configuration | | | | | |
|---|---|---|---|---|---|---|
| | Image Size | | | | | |
| | t6 : Galileo Concave-Cover Glass | | | | | |
| | | | Embodiment 6 | | | |
| | | | 4-division 6-piece + 2-piece Galileo | | | |
| | | | Glass + Galileo | | | |
| | | 1/1.8 inch | 9mm φ 7.5x5.4mm | | | |
| | | | 1mm | | | |
| | B[mm] | ∞ | 500 | 131 | | |
| | t1 | 1.000 | 1.475 | 3.615 | | |
| Entirety | ①Focal Length | 15.464 | 15.089 | 14.229 | | |
| | Magnification | 1/∞ | 0.0123 | 0.1005 | | |
| | Angle of View (Object plane) | Diagonal | ±16.2° | 228mm | 83mm |
| | | Long Side | ±13.1° | 231mm | 68mm |
| | | Short Side | ±9.9° | 173mm | 51mm |
| | Chief Ray Angle | Diagonal | 28.1° | 27.0° | 25.3° |
| | F/ | 3.00 | 2.80 | 2.52 | |
| | ②Entirety Focus Plane − Front Group Petzval Focus Plane | 0.026 | 0.031 | 0.041 | |
| | Radius of Petzval Curvature | −139.227 | | | |
| Front Group | ③Focal Length | 15.596 | | | |
| | ②/①: Required range | 1.00 | 1.02 | 1.08 | |
| | Radius of Petzval Curvature | −22.324 | | | |
| | ④ Focal Length | −19.223 | | | |
| Galileo | Radius of Petzval Curvature | 26.021 | | | |
| | ⑤Convex Focal Length | 39.362 | Radius of Convex Petzval Curvature | −95.116 | |
| | ⑥Concave Focal Length | −13.127 | Radius of Concave Petzval Curvature | 20.21 | |
| | ⑤/⑥ Focal Length Ratio | −0.220 | Concave/Convex Petzval Ratio | −0.219 | |

| Surf | Radius | Thick | Glass | | Semi-Dia |
|---|---|---|---|---|---|
| | | | Index | Abbe | |
| OBJ | Infinity | t0 | | | 5.100 |
| 1 | 6.033 | 2.000 | 1.6935 | 53.205 | 3.600 |
| 2 | 4.715 | 1.100 | | | 4.400 |
| 3 | 9.959 | 3.700 | 1.4970 | 81.546 | 4.400 |
| 4 | −7.000 | 0.800 | 1.5174 | 52.430 | 4.400 |
| 5 | 26.741 | 0.900 | | | 4.400 |
| STO | Infinity | 0.900 | | | 2.000 |
| 7 | −9.046 | 0.800 | 1.5174 | 52.430 | 2.800 |
| 8 | 9.552 | 3.400 | 1.4970 | 81.546 | 4.200 |
| 9 | −7.075 | 0.200 | | | 4.200 |
| 10 | 36.734 | 1.000 | 1.5952 | 67.736 | 4.700 |
| 11 | 30.676 | t11 | | | 4.900 |
| 12 | 2,098.26 | 1.400 | 1.5952 | 67.736 | 4.900 |
| 13 | −36.152 | 5.622 | | | 4.000 |
| 14 | −9.794 | 0.800 | 1.7714 | 52.952 | 4.000 |
| 15 | 33.613 | 1.000 | 1.5231 | 54.517 | 5.200 |
| 16 | Infinity | 0.500 | | | 5.200 |
| 17 | Infinity | 0.200 | | | 5.200 |
| IMA | | | | | 4.500 |

| Wavelength (μm) | 0.546 | 0.436 | 0.486 | 0.579 | 0.656 |
|---|---|---|---|---|---|
| Weight | 1.0 | 0.6 | 0.2 | 0.6 | 0.2 |

[FIG. 12]

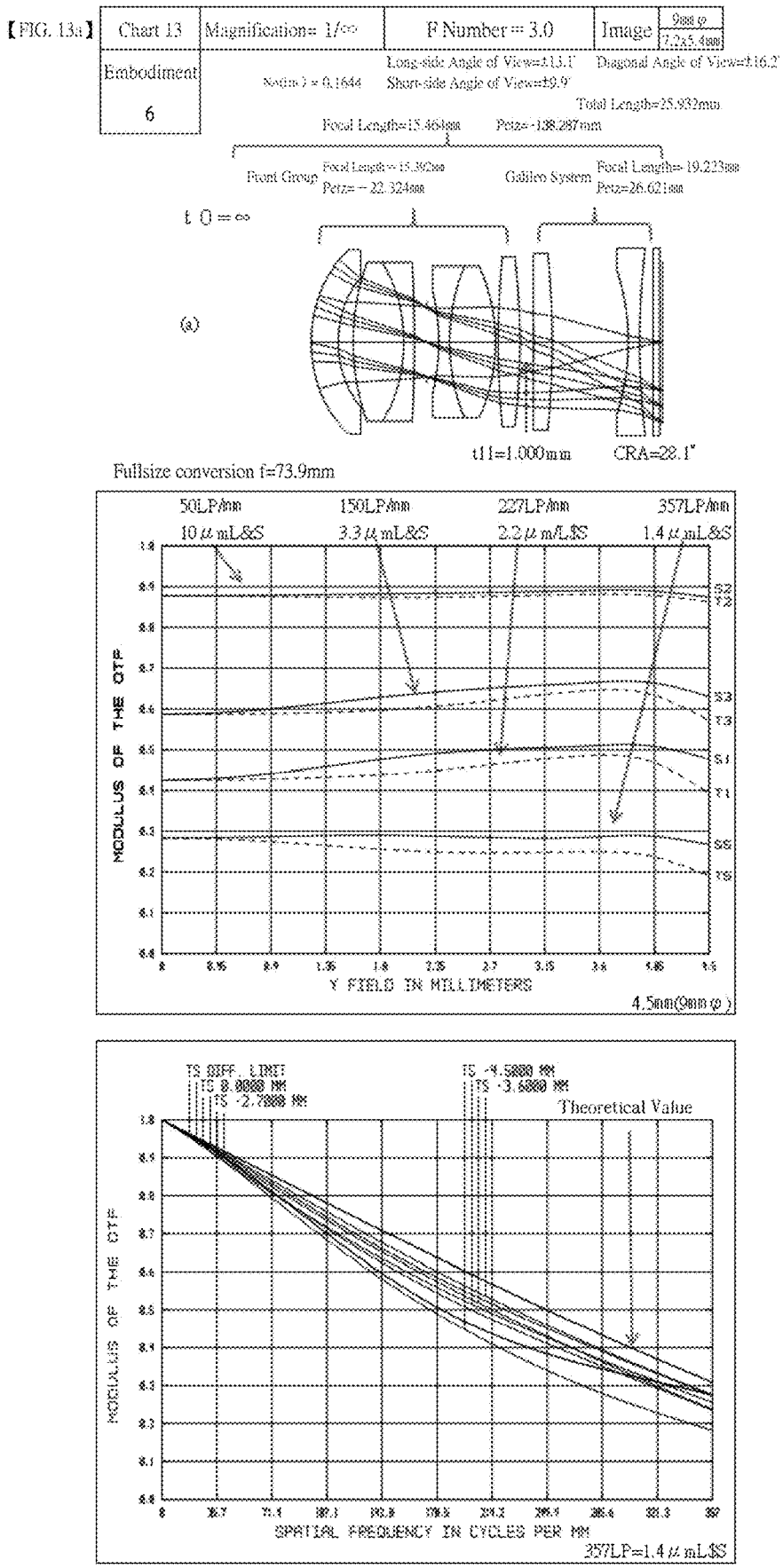

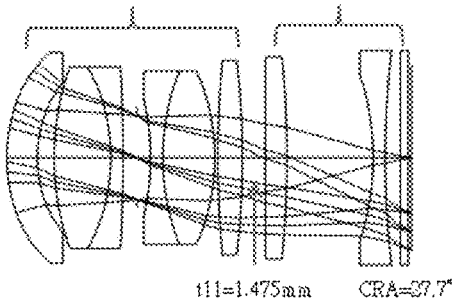
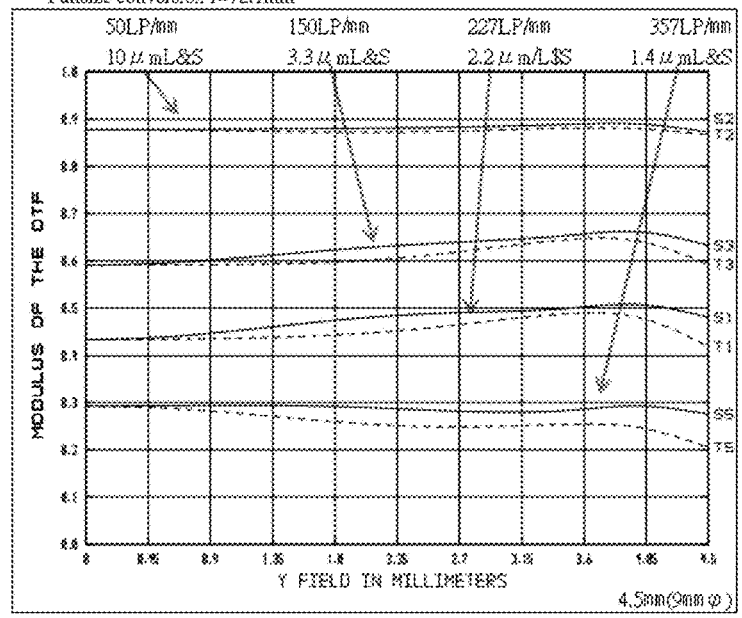
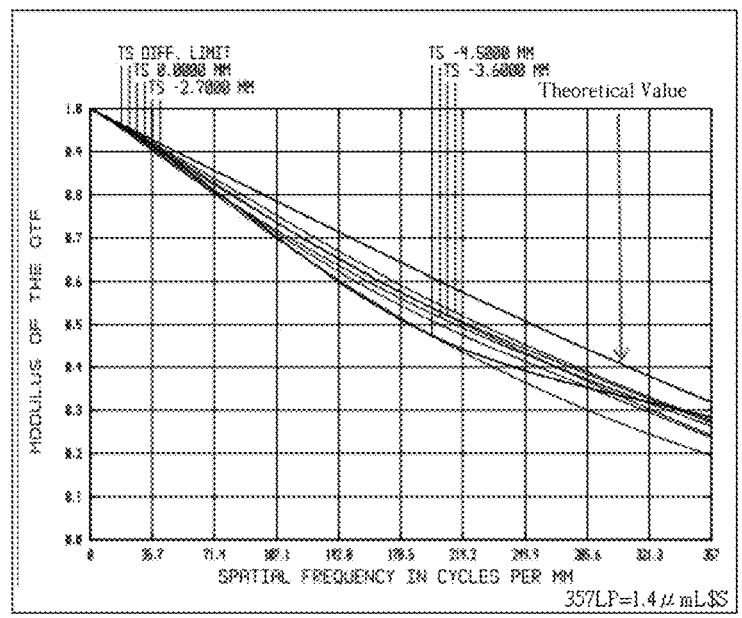

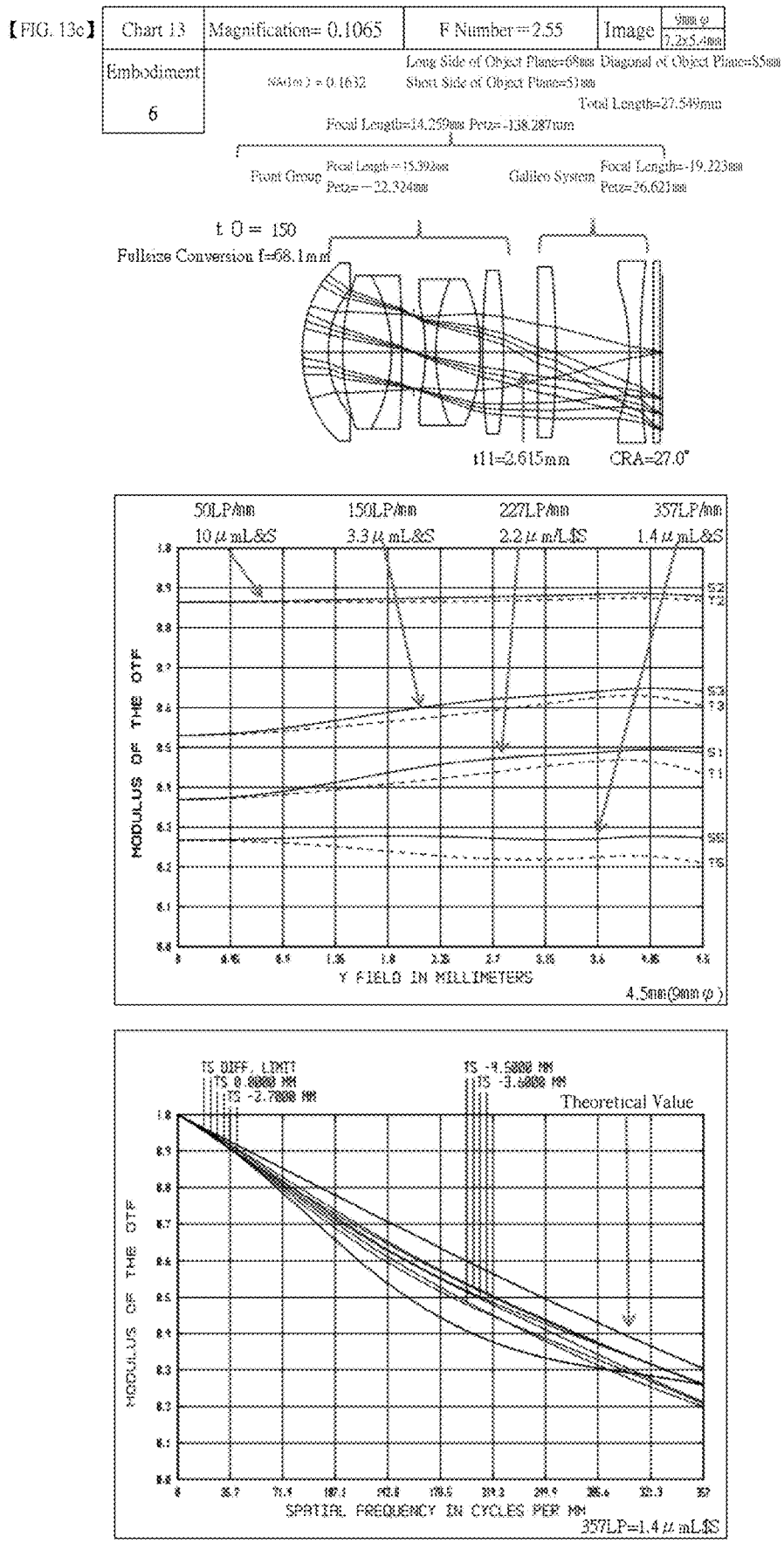

[FIG. 14]

Chart 14

| Configuration | Embodiment 7 | | | | | | | | | |
|---|---|---|---|---|---|---|---|---|---|---|
| | 4-division 6-piece + 2-piece Galileo | | | | | | | | | |
| | Gauss + Galileo | | | | | | | | | |
| | | | | Surf | Radius | Thick | Glass | | | Semi-Dia |
| | | | | | | | Index | Abbe | | |
| Image Size | 1/1.9 inch 9mm φ=7.2x5.4mm | | | OBJ | Infinity | t0 | | | | 6.100 |
| t0 [mm] | 1mm | | | 1 | 9.046 | 2.230 | 1.6935 | 55.205 | | 4.000 |
| t16 : Galileo Concave-Cover Glass | | | | 2 | 7.476 | 0.800 | | | | 5.200 |
| t11 | ∞ | 9.707 | 130 | 3 | 11.395 | 2.800 | 1.4970 | 81.546 | | 5.200 |
| ①Focal Length | 21.406 | 20.693 | 19.050 12.297 | 4 | -18.901 | 0.800 | 1.5174 | 52.430 | | 5.200 |
| Magnification | 1∞ | 0.0412 | 0.1584 | 5 | -422.235 | 0.800 | | | | 3.900 |
| Angle of View (Object plane) | Diagonal | ±11.9° | 20mm 57mm | STO | Infinity | 0.800 | | | | 4.000 |
| | Long Side | ±9.5° | 16.3mm 45mm | 7 | -10.606 | 0.800 | 1.5174 | 52.430 | | 5.000 |
| | Short Side | ±7.2° | 12.2mm 34mm | 8 | 11.050 | 2.800 | 1.4970 | 81.546 | | 5.000 |
| Chief Ray Angle | Diagonal | 22.0° | 20.6° | 9 | -12.461 | 0.200 | | | | 5.300 |
| F/ | | 2.90 | 2.40 | 10 | -1200.15 | 1.800 | 1.5932 | 67.726 | | 5.300 |
| ②Entrance Focus Plane - Front Group Paraxial Focus Plane | 0.061 | 0.090 | 0.117 | 11 | -21.466 | t11 | | | | 5.300 |
| Radius of Petzval Curvature | | -272.134 | | 12 | 41.492 | 1.400 | 1.5932 | 67.726 | | 5.300 |
| ③Focal Length | | 22.135 | | 13 | -106.344 | 4.220 | | | | 5.900 |
| ②x③ : Required range | 1.03 | 1.07 | 1.16 | 14 | -13.205 | 0.800 | 1.5714 | 52.920 | | 4.400 |
| Radius of Petzval Curvature | | -33.069 | | 15 | 31.719 | 1.080 | 1.5232 | 54.517 | | 5.200 |
| Focal Length | | 57.993 | | 16 | Infinity | 0.500 | | | | 5.200 |
| Front Group Focal Length/Galileo Focal Length | | -0.790 | | 17 | Infinity | 0.300 | | | | 5.200 |
| Radius of Petzval Curvature | | 57.643 | | IMA | Infinity | | | | | 4.500 |
| ④Convex Focal Length | 50.054 | Radius of Convex Petzval Curvature | | -29.717 | | | | | | |
| ⑤Concave Focal Length | -16.141 | Radius of Concave Petzval Curvature | | 26.569 | 1/1.8inch Cmos 9mm φ=7.2x5.4mm | | | | | |
| ④/⑤Focal Length Ratio | -0.322 | Concave/Convex Petzval Ratio | | -0.333 | | 0.546 0.486 0.436 0.486 0.579 0.656 | | | | |
| | | | | | | 1.0 0.2 0.6 0.6 0.6 0.2 | | | | |

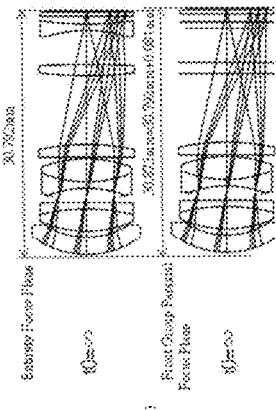

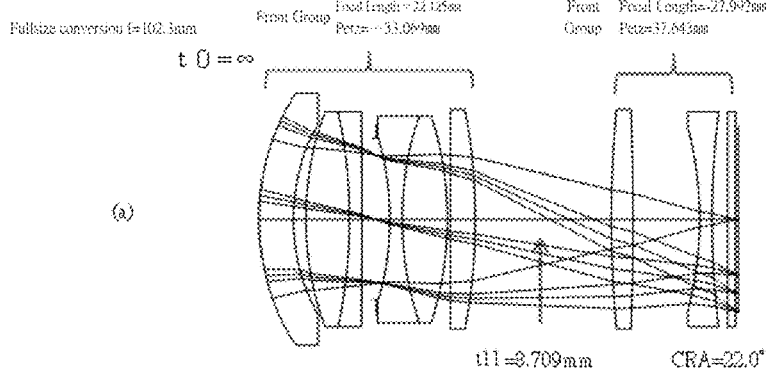
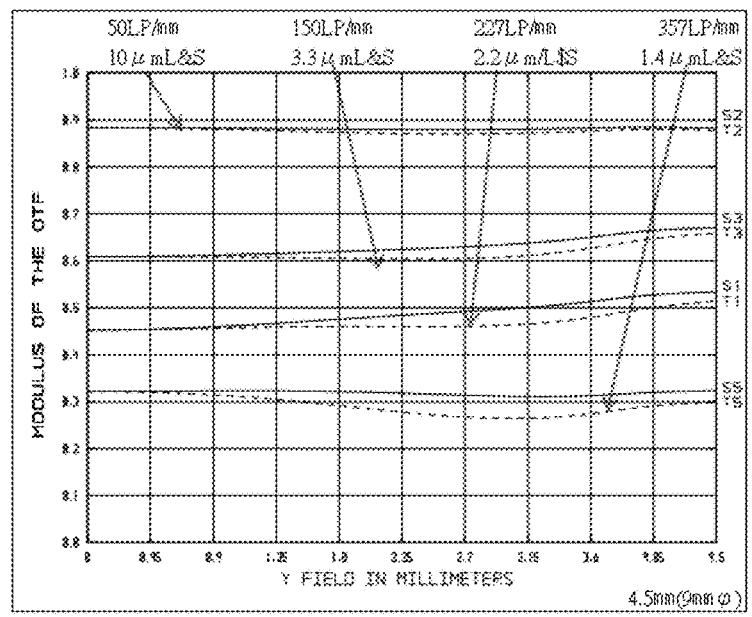
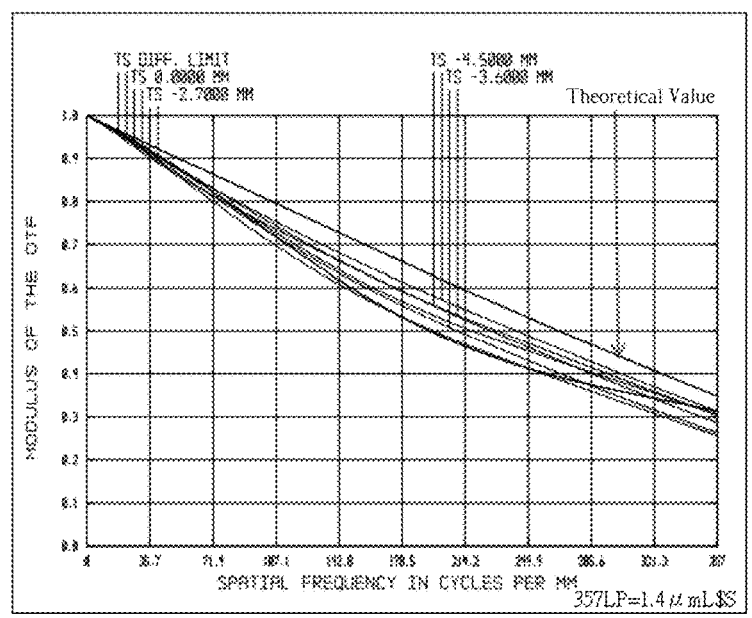

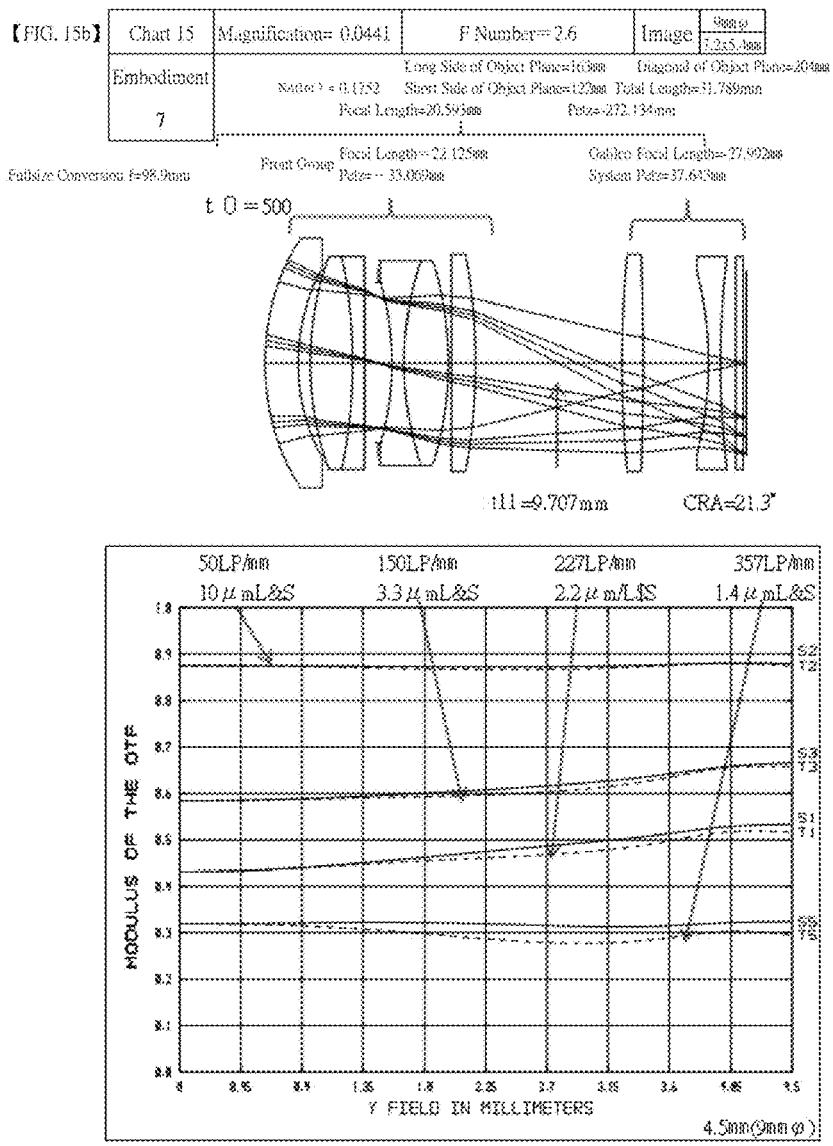
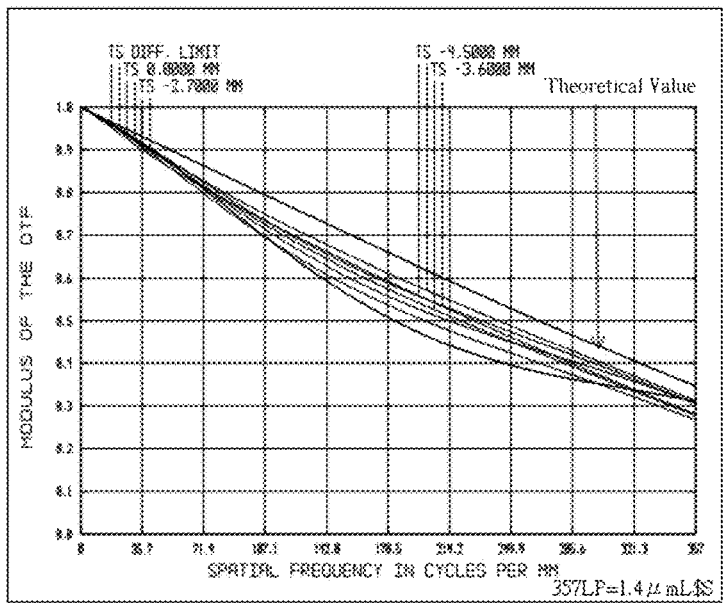

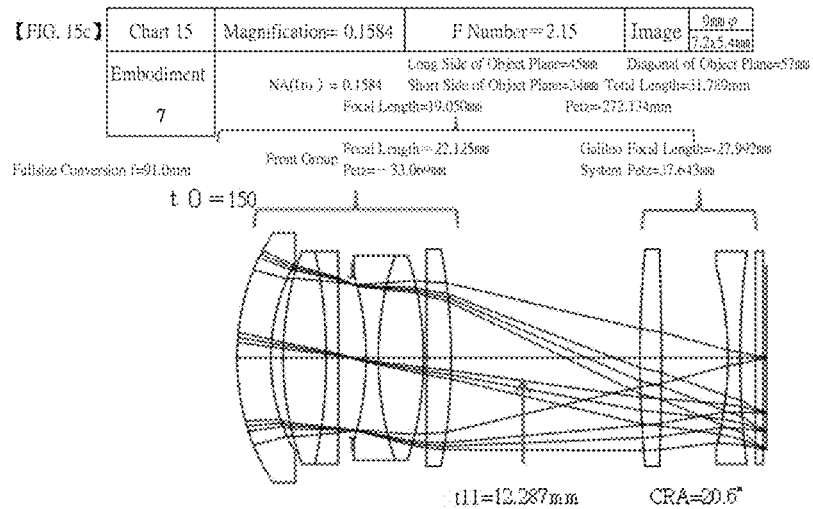
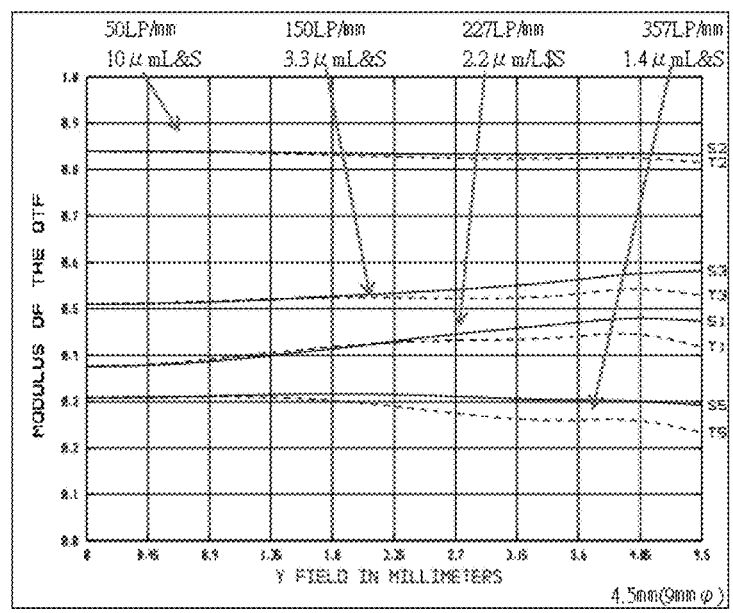
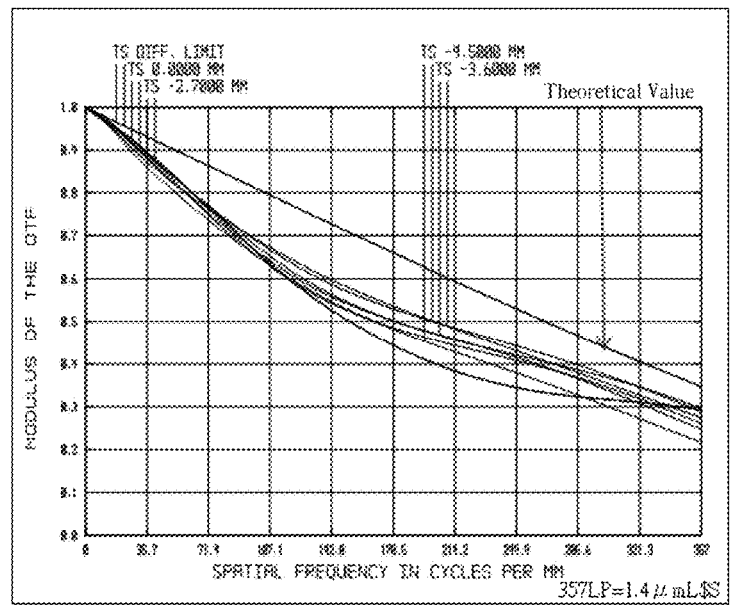

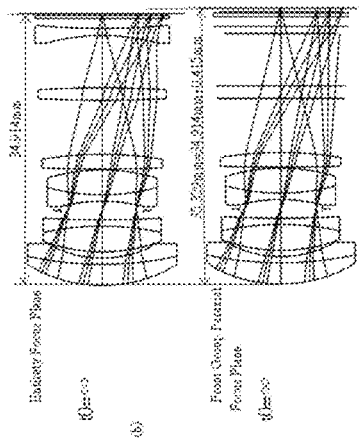
[FIG. 10]

[FIG. 17a]
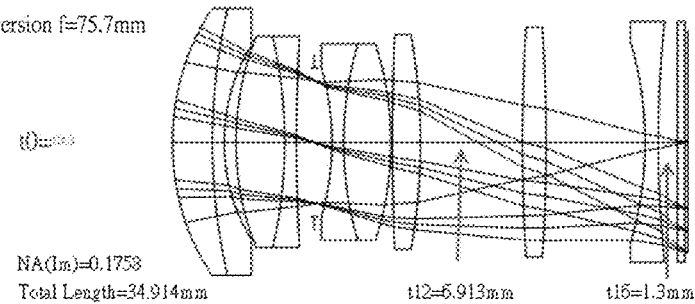
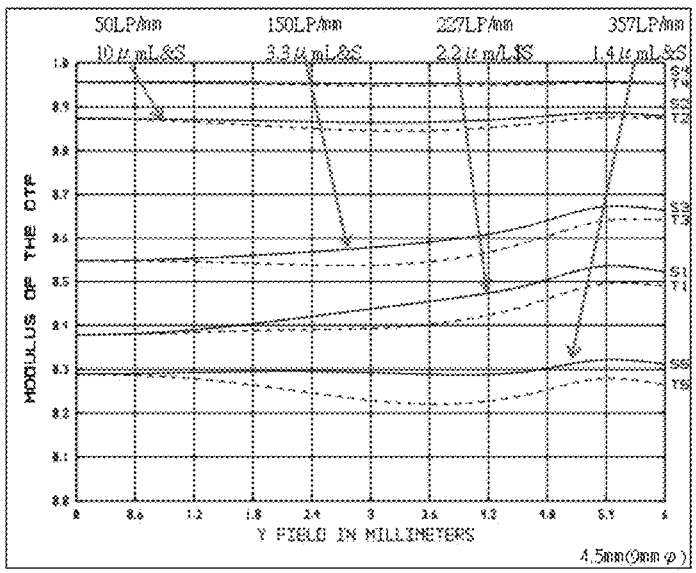
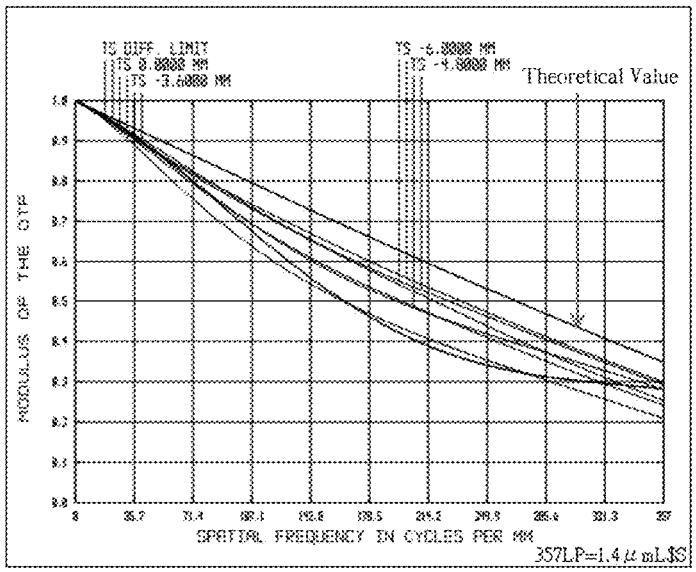

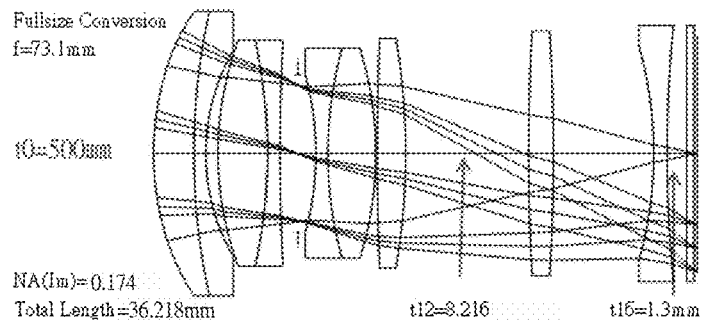
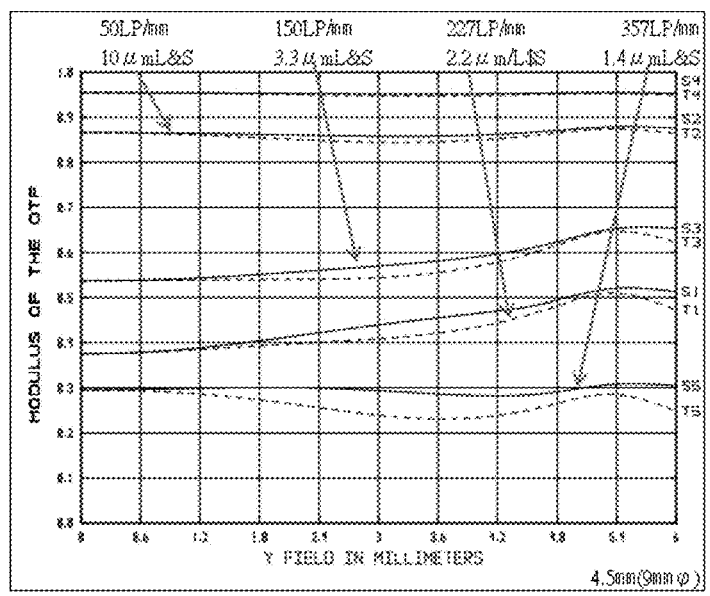
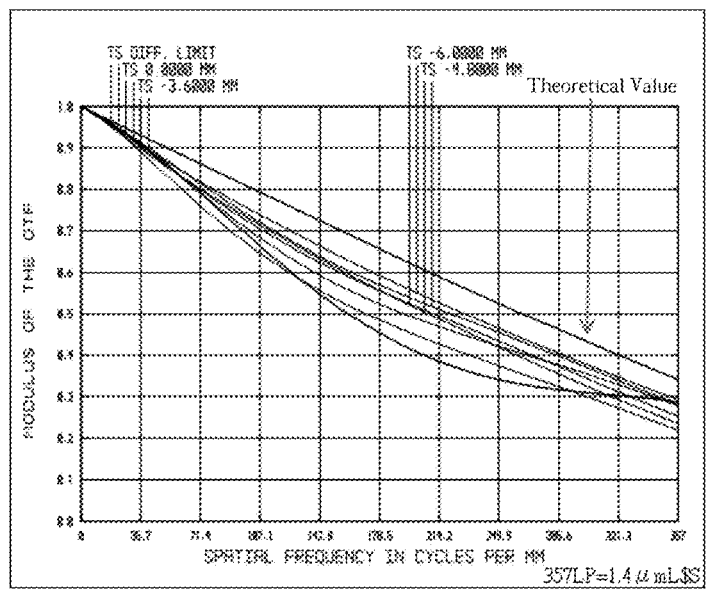

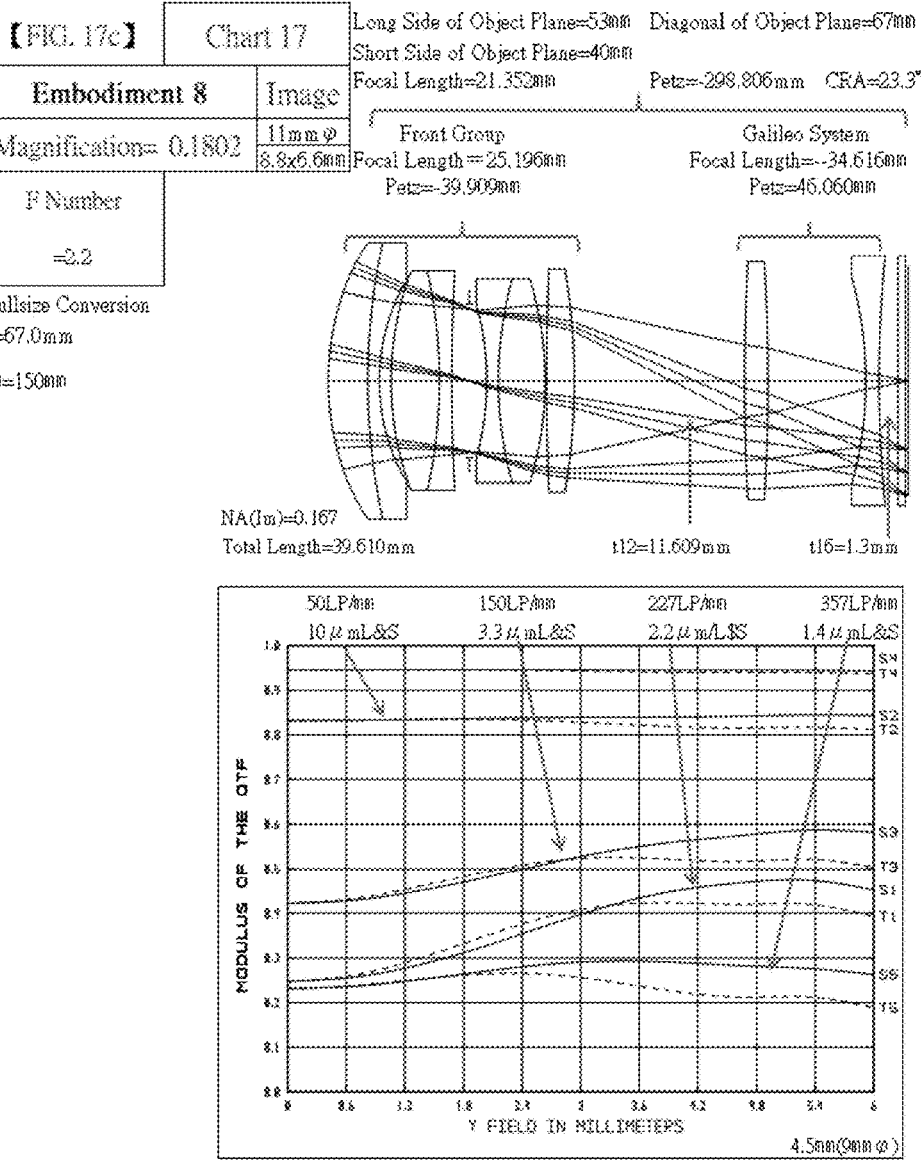
[FIG. 17c] Chart 17 Embodiment 8

Chart 18

Embodiment 9

Configuration: Afocal(6×7-piece + 2-piece Galileo)
Modified Gauss (Sonnetar) + Galileo

| | | | | |
|---|---|---|---|---|
| Image Size | 1/3 inch | | | Sensor φ 4.6×3.6mm |
| | φ[mm] | 1000mm | | |
| | f/# | 1/2 | | |
| ① Focal Length | | | | 1.456 |
| Magnification | | 500 | 0.784 | 11.319 |
| | | 12.009 | 11.795 | 0.08137 |
| | | 1/∞ | 0.0041 | 7mm |

Entirety

| | | | | |
|---|---|---|---|---|
| Angle of View (Object plane) | Diagonal | ±14.0° | 24mm | 5mm |
| | Long Side | ±11.3° | 19mm | 4.5mm |
| | Short Side | ±9.5° | 14.5mm | |
| Chief Ray Angle | Diagonal | 24.1° | | 22.5° |
| F' | | 2.90 | 2.90 | 2.21 |
| ② Entirety Focus Plane − Front Group Paraxial Focus Plane | | -0.111 | -0.011 | -0.103 |

Front Group

| | | |
|---|---|---|
| | 0.99 | 1.01 | 1.05 |
| ③MOD: Required range | | |
| ④ Focal Length | 11.922 | |
| Radius of Petzval Curvature | -12.324 | |

Galileo

| | |
|---|---|
| ④ Focal Length | -15.900 |
| Radius of Petzval Curvature | -0.755 |
| | 21.114 |

| | | |
|---|---|---|
| ⑤ Convex Focal Length | 26.93 | Radius of Convex Petzval Curvature | 50.704 |
| ⑥ Concave Focal Length | -9.969 | Radius of Concave Petzval Curvature | 14.907 |
| ⑦(⑤/⑥) Focal Length Ratio | -0.291 | Concave/Convex Petzval Ratio | 0.294 |

| Surf | Radius | Thick | Index | Abbe | Semi-Dia |
|---|---|---|---|---|---|
| OBJ | infinity | 0 | | | 4.500 |
| 1 | 6.903 | 2.300 | 1.5952 | 67.726 | 4.500 |
| 2 | 16.660 | 0.800 | 1.5163 | 64.142 | 4.500 |
| 3 | 3.971 | 0.600 | | | 2.800 |
| 4 | 7.193 | 2.700 | 1.4970 | 81.546 | 3.500 |
| 5 | -5.732 | 0.990 | 1.5174 | 52.430 | 3.500 |
| 6 | -57.399 | 0.800 | | | 3.500 |
| STO | infinity | 0.600 | | | 1.600 |
| 8 | 4.062 | 0.800 | 1.5174 | 52.430 | 2.000 |
| 9 | 6.972 | 2.200 | 1.4970 | 81.546 | 2.800 |
| 10 | 5.510 | 0.200 | | | 2.900 |
| 11 | 18.262 | 1.400 | | | 3.200 |
| 12 | -20.613 | 1/2 | | | 3.200 |
| 13 | 89.924 | 1.400 | 1.5952 | 67.726 | 3.200 |
| 14 | 24.023 | 3.200 | | | 3.200 |
| 15 | -7.661 | 0.900 | 1.5714 | 52.952 | 2.900 |
| 16 | 19.081 | 1.000 | | | 3.900 |
| 17 | infinity | 0.900 | 1.5233 | 54.517 | 3.500 |
| 18 | infinity | 0.200 | | | 3.200 |
| IMA | | | | | 0.656 |
| Wavelength[nm] | 0.546 | 0.486 | 0.486 | 0.579 | 0.2 |
| Weight | 1.0 | 0.6 | 0.3 | 0.6 | |

[FIG. 18]

Entirety Focus Plane
t(h=∞)

Front Group Paraxial Focus Plane
t(h=∞)

[FIG. 19a]
| Chart 19 |
|---|
| Embodiment 9 |
| Magnification= 1/∞ |
| F Number =2.8 |
| Image  6mm φ / 4.8x3.6 |
fullsize Conversion f=86.1mm
Long-side Angle of View=±11.3°  Diagonal Angle of View=±14.0°
Short-side Angle of View=±8.5°
Total Length=20.883mm
Focal Length=12.009mm   Petz=-93.767mm
Front Group          Galileo System
Focal Length = 11.992mm   Focal Length=-15.800mm
Petz=-12.234mm        Petz=21.114mm
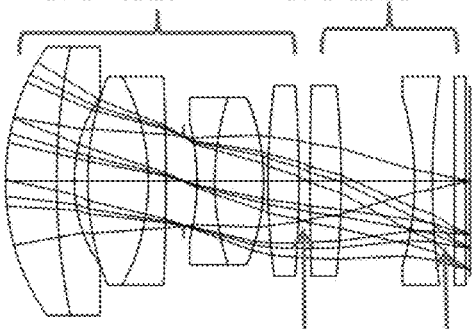
NA(Im) =0.1758   t12=0.500mm   t16=1.000mm
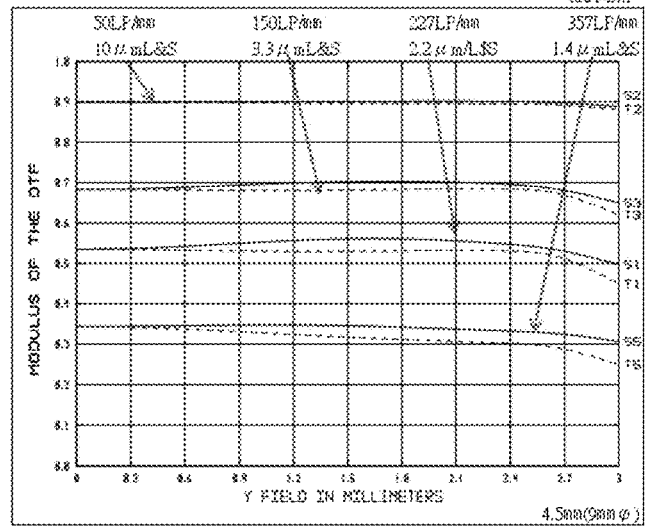
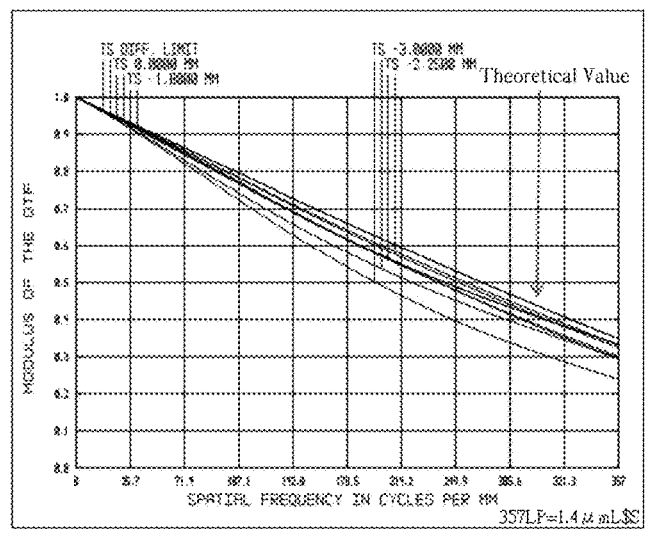

[FIG. 19b]
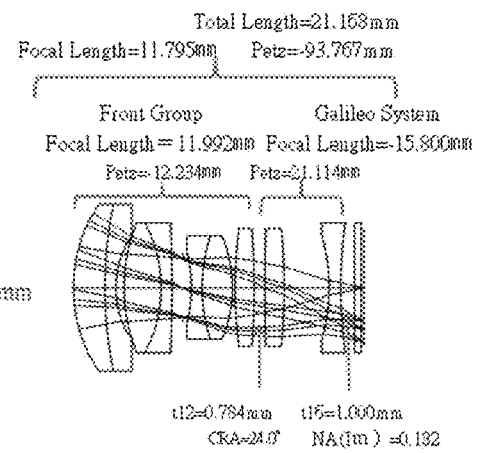
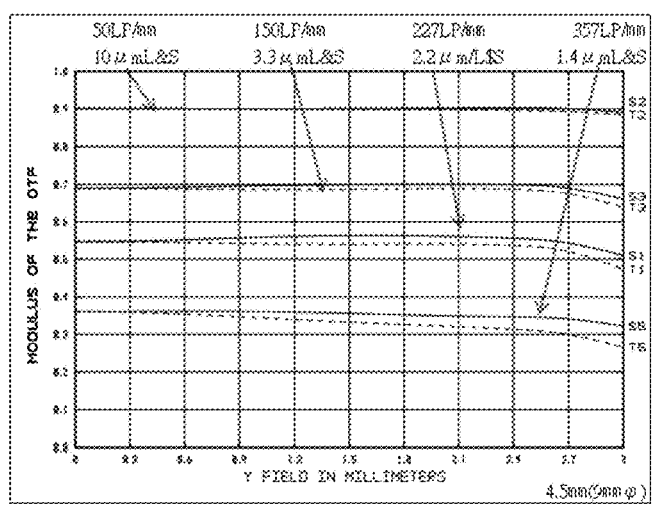
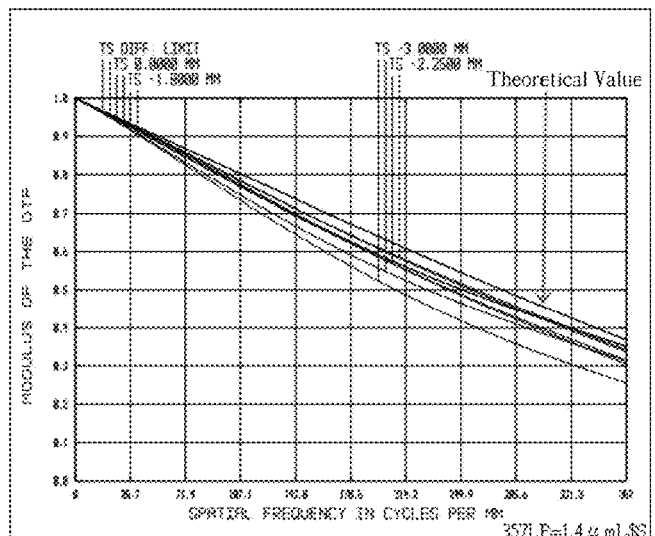

[FIG. 19c]
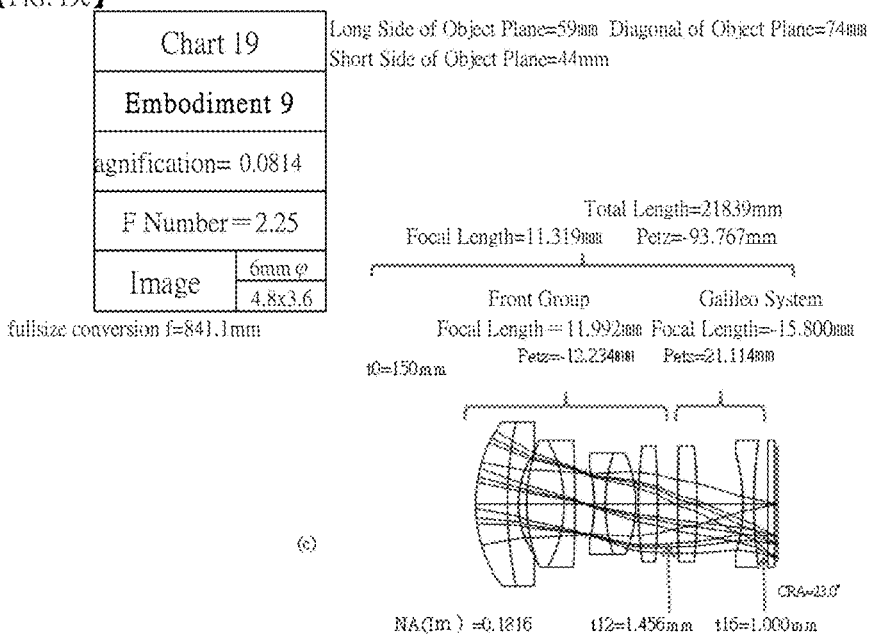
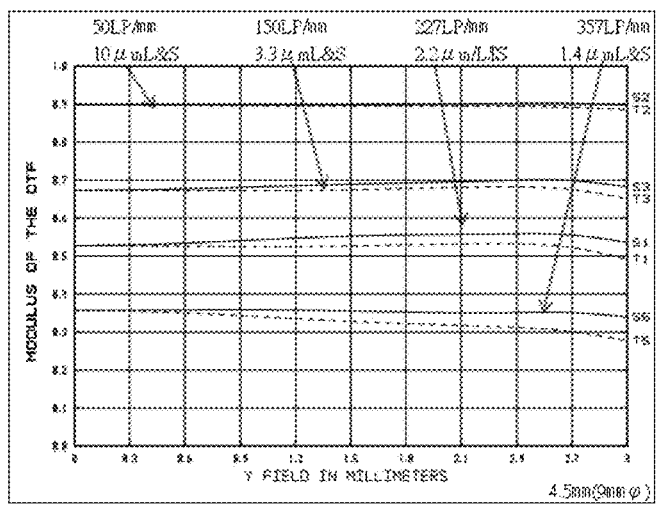
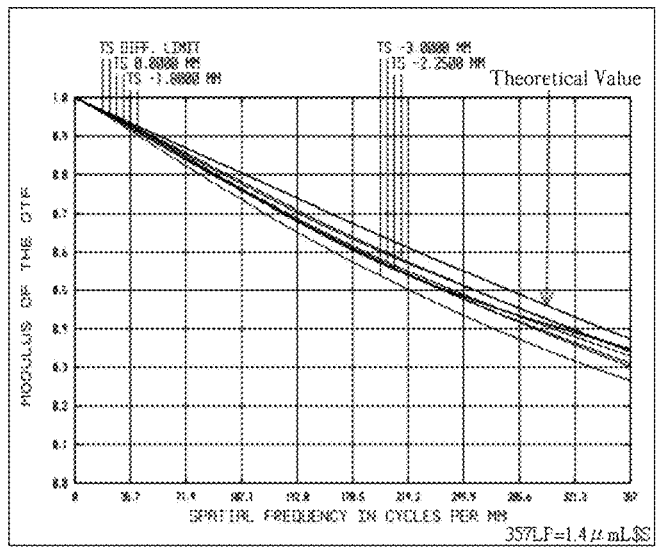

Chart 20

| | | Embodiment 10 | | | | | | | | |
|---|---|---|---|---|---|---|---|---|---|---|
| Configuration | | 4-division-5-piece + 2-piece Galileo Gauss + Galileo | | | | | | | | |
| Image Size | | 1/1.8 inch Concave 9mm φ 7.2x5.4mm | | | Surf | Radius | Thick | Index | Abbe | Semi-Dia |
| | | t[f]: Galileo Concave-Cover Glass | 3.6mm | | OBJ | Infinity | 0 | | | 5.200 |
| | t0[mm] | ∞ | 150 | | 1 | 7.339 | 2.200 | 1.6935 | 52.205 | 5.200 |
| | t1 | 3.420 | 6.000 | | 2 | 5.739 | 0.900 | | | 3.900 |
| | ④Focal Length | 17.748 | 16.611 | | 3 | 9.394 | 2.700 | 1.4970 | 81.546 | 4.400 |
| | Magnification | 1/∞ | 0.1250 | | 4 | -10.085 | 0.800 | 1.5174 | 52.430 | 4.400 |
| Entirety | | Diagonal | ±14.2° | 72mm | | 5 | 60.126 | 0.900 | | | 4.400 |
| | Angle of View (Object plan) | Long Side | ±11.5° | 108mm | | STO | Infinity | 0.900 | | | 2.700 |
| | | Short Side | 19.7° | 13mm | | 7 | -7.050 | 0.900 | 1.5174 | 52.430 | 3.000 |
| | Chief Ray Angle | Diagonal | 20.4° | 19.5° | | 8 | 13.291 | 2.700 | 1.4970 | 81.546 | 4.200 |
| | F/ | | 2.90 | 2.30 | | 9 | -5.220 | 0.300 | | | 4.200 |
| | ⑦Entirety Focus Plane - Front Group Paraxial Focus Plane | | 0.603 | 0.634 | | 10 | 45.260 | 1.600 | 1.5952 | 67.736 | 4.200 |
| | Radius of Petzval Curvature | | | | | 11 | -18.445 | 1.11 | | | 4.700 |
| | | | 17.667 | | | 12 | 34.621 | 1.400 | 1.5962 | 67.736 | 4.900 |
| Front Group | ④⑤⑥: Required range | 0.99 | 1.01 | 1.09 | | 13 | -39.317 | 5.147 | | | 4.900 |
| | Radius of Petzval Curvature | | -30.244 | | | 14 | -11.915 | 0.900 | 1.5714 | 52.952 | 4.400 |
| | ④ Focal Length | | 31.899 | | | 15 | 23.016 | 3.600 | | | 5.200 |
| Galileo | | | -0.554 | | | 16 | Infinity | 0.500 | 1.5233 | 54.517 | 5.200 |
| | Front Group Focal Length/Galileo Focal Length | | 58.295 | | | 17 | Infinity | 0.200 | | | 5.200 |
| | Radius of Petzval Curvature | | | | | IMA | | | | | 4.500 |
| | ⑤Convex Focal Length | 31.223 | Radius of Convex Petzval Curvature | | -49.522 | 1/1.8inch Cmos 9mm φ =7.2x5.4mm | | | | | |
| | ⑥Concave Focal Length | -13.600 | Radius of Concave Petzval Curvature | | 21.596 | | | | | | |
| | ⑤⑥Focal Length Ratio | -0.436 | Concave/Convex Petzval Ratio | | 0.436 | Wavelength[μm] | 0.546 | 0.436 | 0.486 | 0.579 | 0.656 |
| | | | | | | Weight | 1.0 | 0.6 | 0.2 | 0.6 | 0.2 |

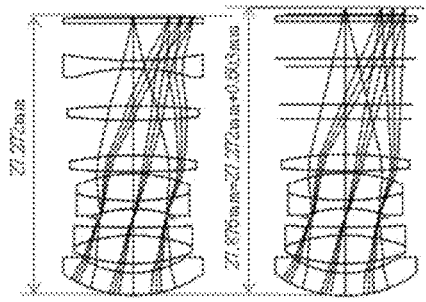

[FIG. 20]

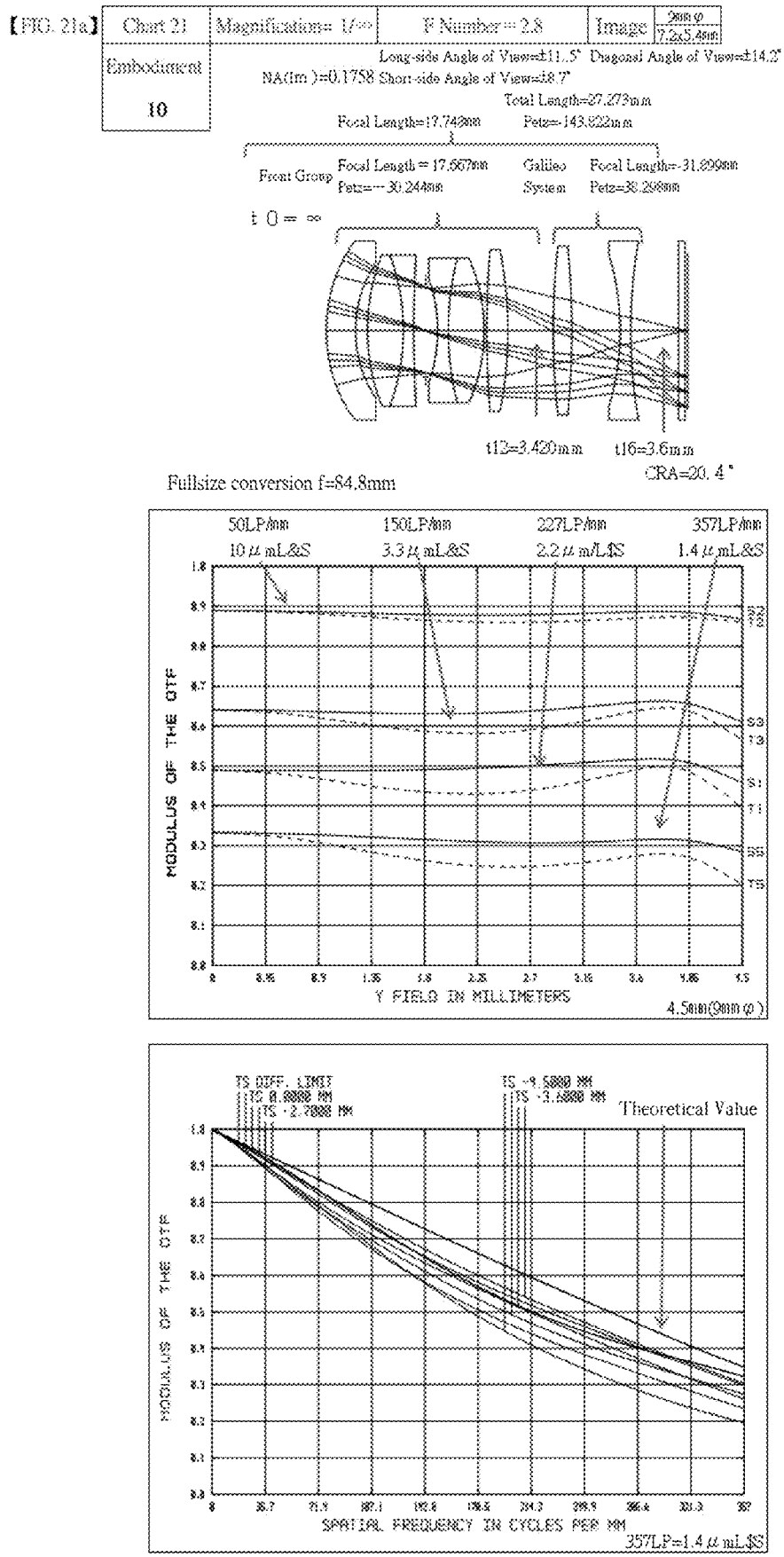

[FIG. 21b]
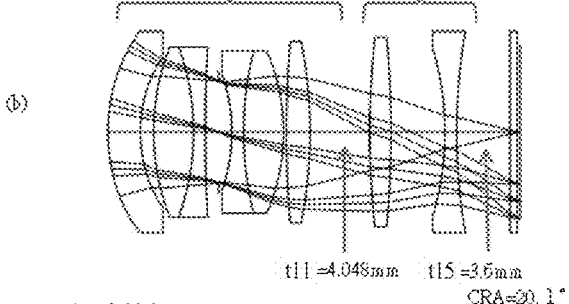
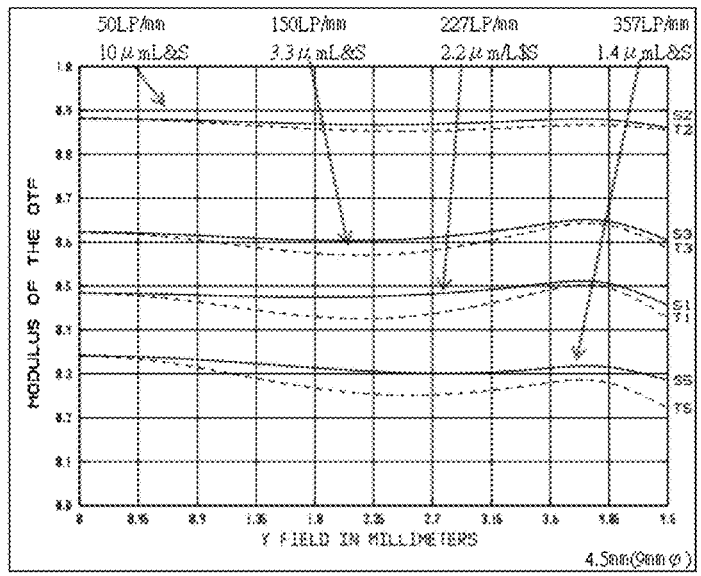
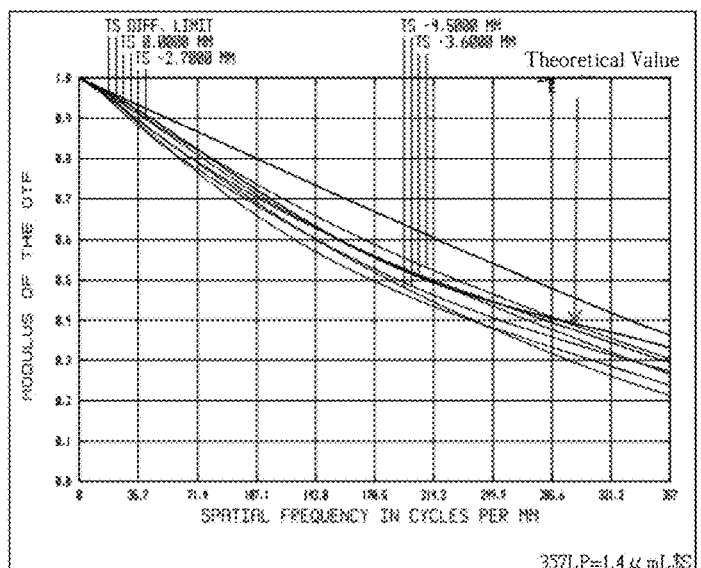

[FIG. 21c]
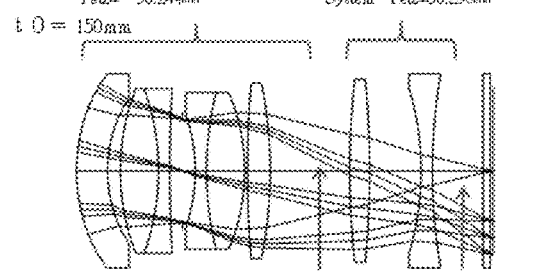
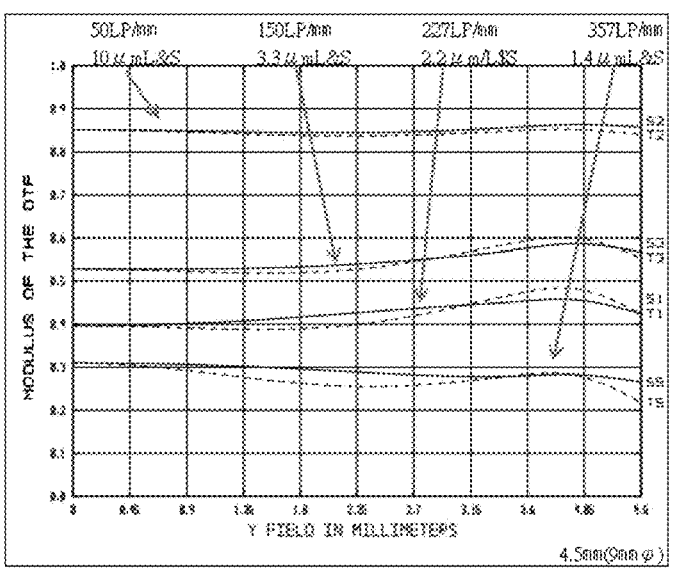
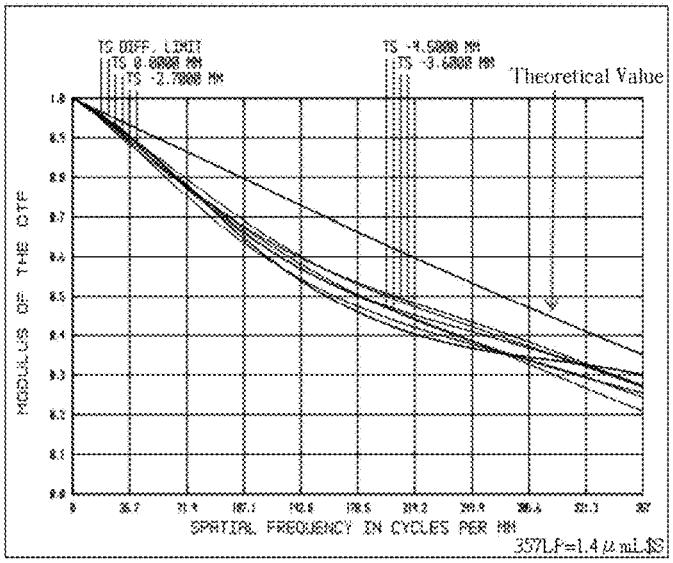

Chart 22

| | Embodiment 11 | | | | | | |
|---|---|---|---|---|---|---|---|
| Configuration | 4 division-5-piece + 2-piece Galileo | | | | | | |
| | Gauss + Galileo | | | | | | |
| | 1/1.8 inch 9mm φ 7.2x5.4mm | | | | | | |
| Image Size | 2.0mm | | | | | | |
| t16 : Galileo Concave-Cover Glass | | | | | | | |
| t[mm] | ∞ | 500 | | | 150 | | |
| t11 | 3.963 | 4.521 | | | 6.152 | | |
| ①Focal Length | 17.928 | 17.492 | | | 16.502 | | |
| Magnification | 1/∞ | 0.0363 | | | 0.12728 | | |
| Angle of View (Object plane) Diagonal | ±14.1° | 247mm | | | 71mm | | |
| Long Side | ±11.4° | 197mm | | | 57mm | | |
| Short Side | ±8.6° | 150mm | | | 43mm | | |
| Chief Ray Angle Diagonal | 22.9° | 22.4° | | | 21.5° | | |
| F/ | 2.80 | 2.80 | | | 2.80 | | |
| | 0.774 | 0.980 | | | 0.400 | | |
| ②Battery Focus Plane - Front Group Paraxial Focus Plane | -174.063 | | | | | | |
| Radius of Petzval Curvature | 10.068 | | | | | | |
| ③Focal Length | | 1.01 | | | 1.09 | | |
| ④D : Required range | | 1.03 | | | | | |
| Radius of Petzval Curvature | -28.699 | | | | | | |
| ⑤Focal Length | 35.341 | | | | | | |
| Front Group Focal Length/Galileo Focal Length | -0.696 | | | | | | |
| Radius of Petzval Curvature | 24.342 | | | | | | |
| ⑥Convex Focal Length | 45.724 | Radius of Convex Petzval Curvature | | | 72.737 | | |
| ⑦Concave Focal Length | -14.725 | Radius of Concave Petzval Curvature | | | 23.326 1/1.8 inch Case 9mm φ =7.2x5.4mm | | |
| ⑧(M)Focal Length Ratio | -0.322 | Concave/Convex Petzval Ratio | | | -0.321 | | |

| Surf | Radius | Thick | Glass | | Semi-Dia |
|---|---|---|---|---|---|
| | | | Index | Abbe | |
| OBJ | Infinity | 0 | | | 5.200 |
| 1 | 7.605 | 3.200 | 1.9935 | 53.205 | 3.900 |
| 2 | 6.090 | 0.900 | | | 4.400 |
| 3 | 9.651 | 2.700 | 1.4970 | 81.546 | 4.400 |
| 4 | -11.296 | 0.900 | 1.5174 | 52.430 | 4.400 |
| 5 | 125.311 | 0.900 | | | 2.700 |
| STO | Infinity | 0.800 | | | 3.000 |
| 7 | -7.815 | 0.800 | 1.5174 | 52.430 | 4.200 |
| 8 | 11.949 | 2.700 | 1.4970 | 81.546 | 4.200 |
| 9 | -9.985 | 0.200 | | | 4.200 |
| 10 | 55.452 | 1.660 | 1.5952 | 67.726 | 4.200 |
| 11 | -19.740 | 0.1 | | | 4.700 |
| 12 | 40.280 | 1.400 | 1.5952 | 67.736 | 4.900 |
| 13 | -60.706 | 5.147 | | | 4.900 |
| 14 | -11.423 | 0.900 | 1.5714 | 52.952 | 4.400 |
| 15 | 33.262 | 2.000 | | | 5.200 |
| 16 | Infinity | 0.500 | 1.5233 | 54.517 | 5.200 |
| 17 | Infinity | 0.200 | | | 5.200 |
| IMA | | | | | 4.500 |

| Wavelength[um] | 0.546 | 0.436 | 0.486 | 0.546 | 0.572 | 0.656 |
|---|---|---|---|---|---|---|
| Weight | 1.0 | 0.6 | 0.2 | 0.3 | 0.6 | 0.2 |

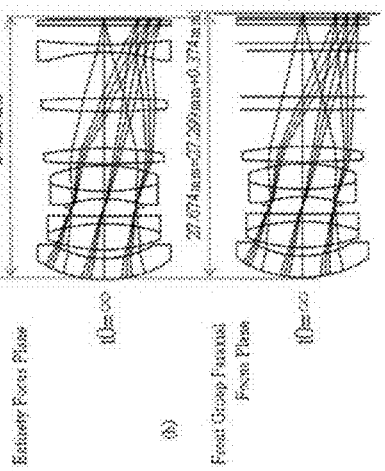

[FIG. 22]

[FIG. 23a]
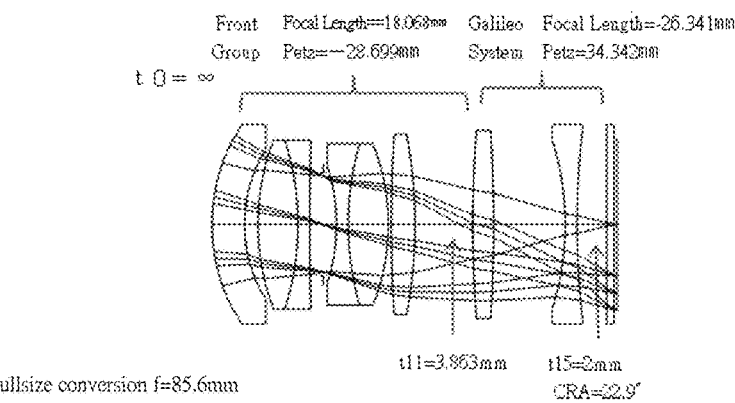
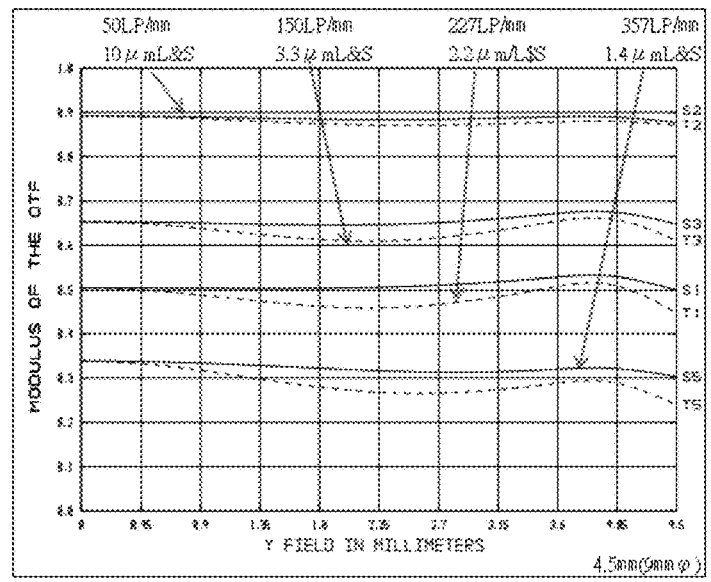
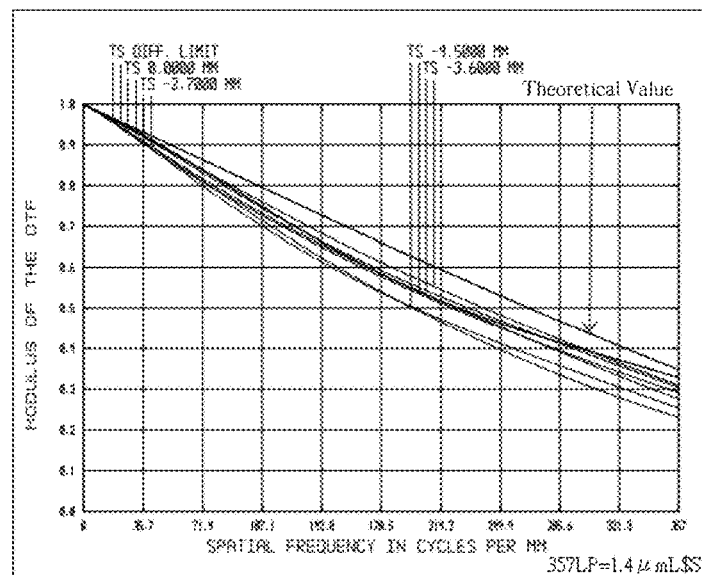

[FIG. 23b]
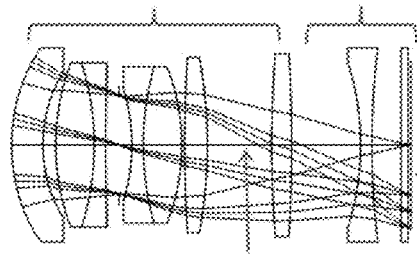
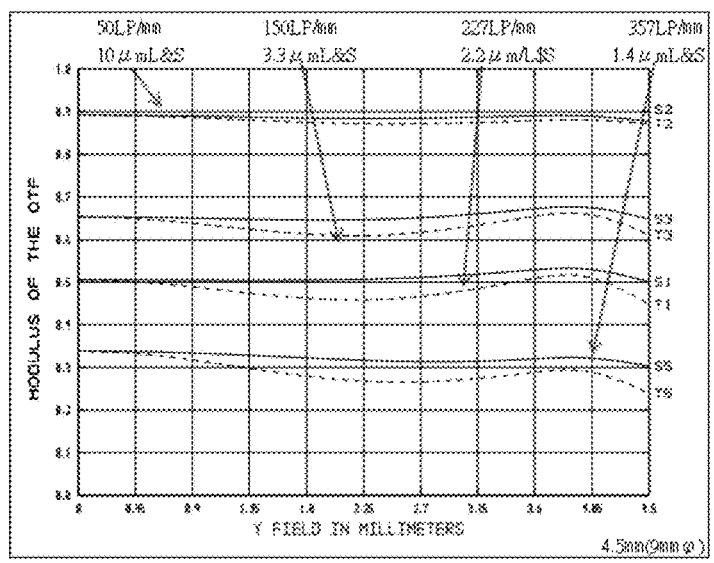
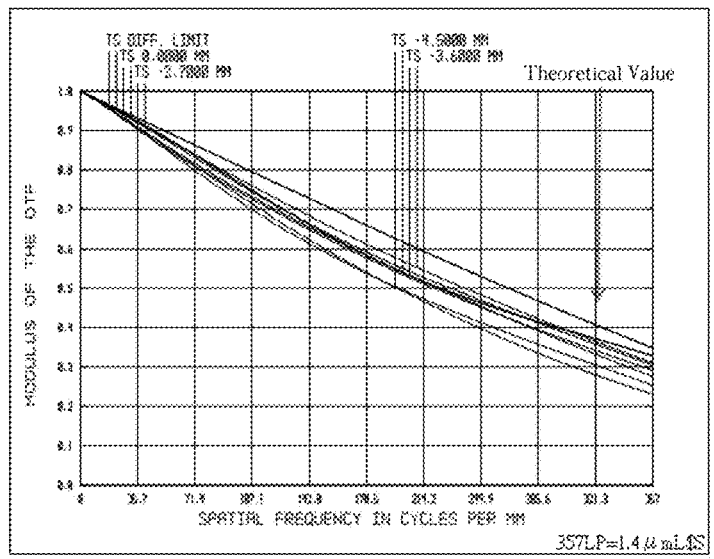

[FIG. 23c]
| Chart 23 | Magnification= 0.127 | F Number = 2.3 | Image | 9mm φ 7.2×5.4mm |
|---|---|---|---|---|
| Embodiment 11 | NA(m) = 0.172 | Long Side of Object Plane=57mm Diagonal of Object Plane=71mm Short Side of Object Plane=42mm Total Length=39.387mm Focal Length 16.503mm Petz=-174.663mm | | |
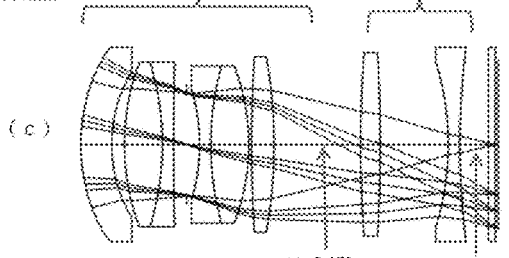
Front Group Focal Length=18.068mm Petz=-28.699mm  Galileo System Focal Length=-26.341mm Petz=34.342mm
t0 = 150mm
(c)
t11=6.152mm  t15=2mm
Fullsize conversion f=78.8mm  CRA=21.6°
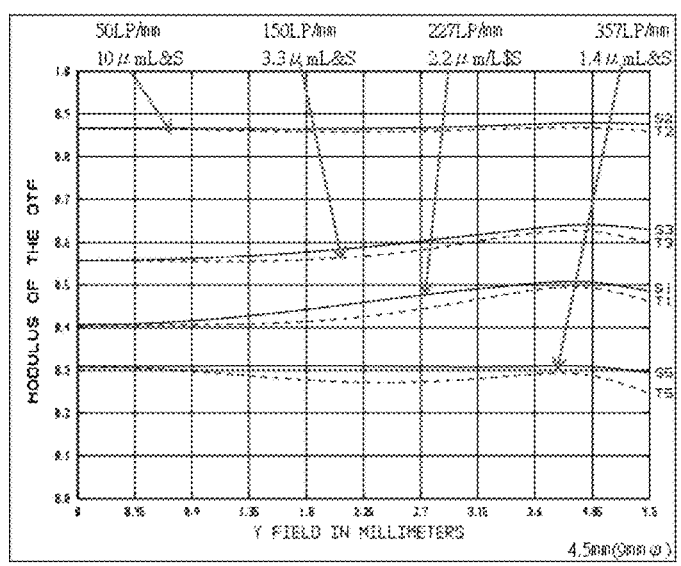
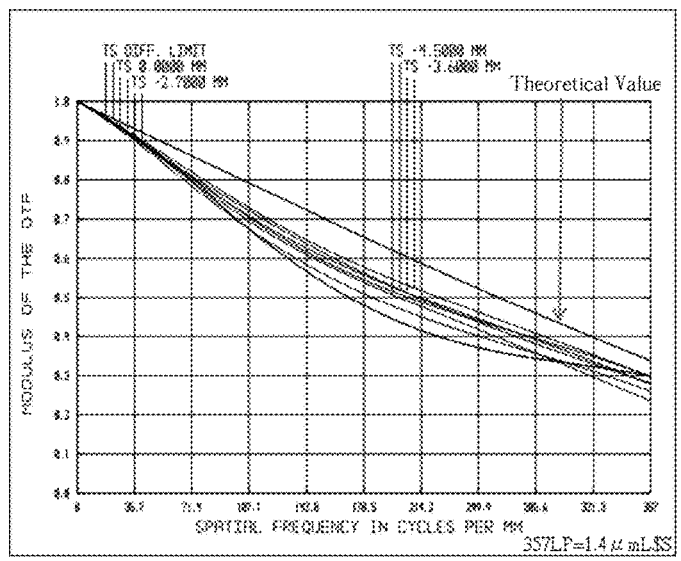

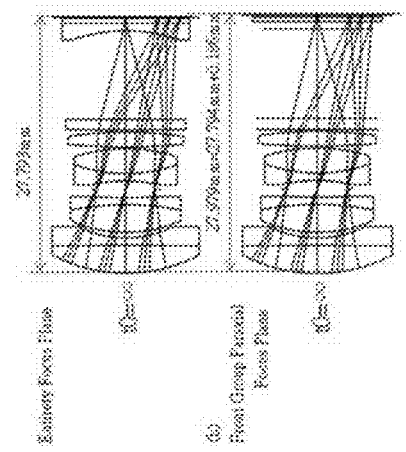
[FIG. 2A]

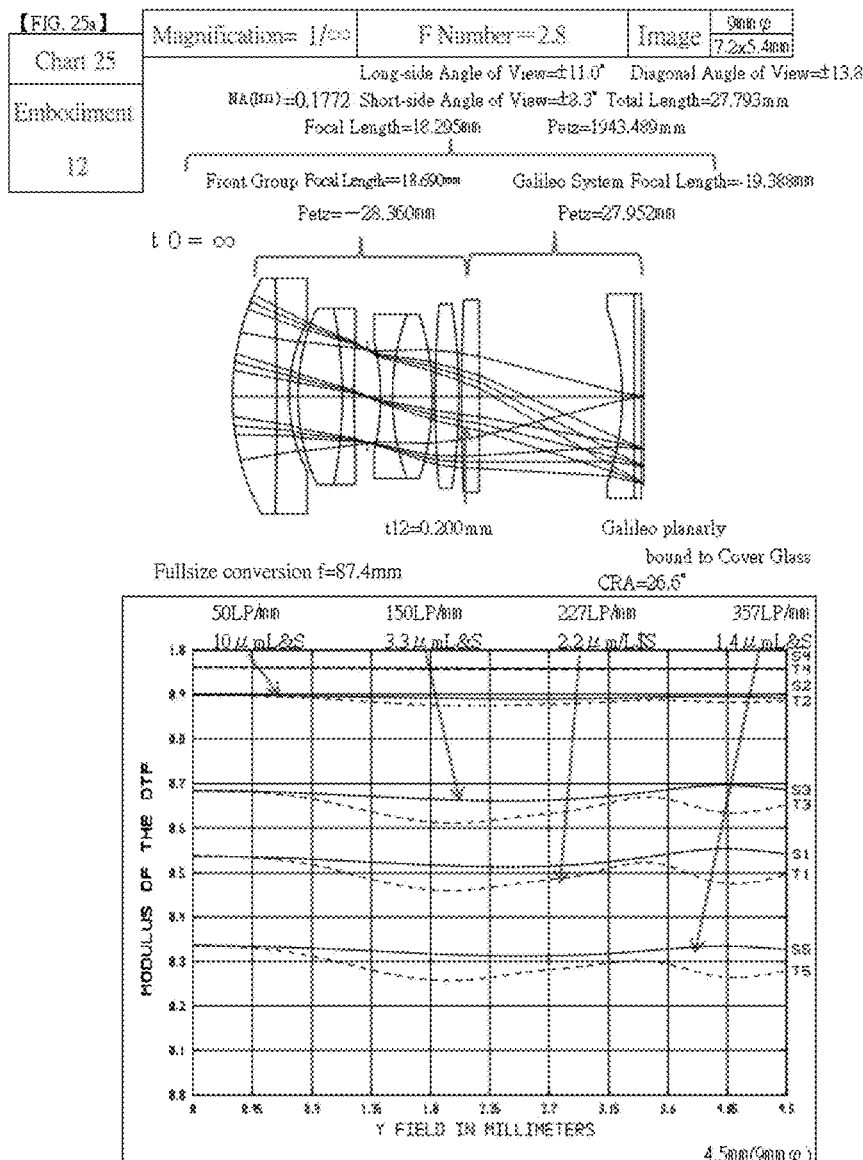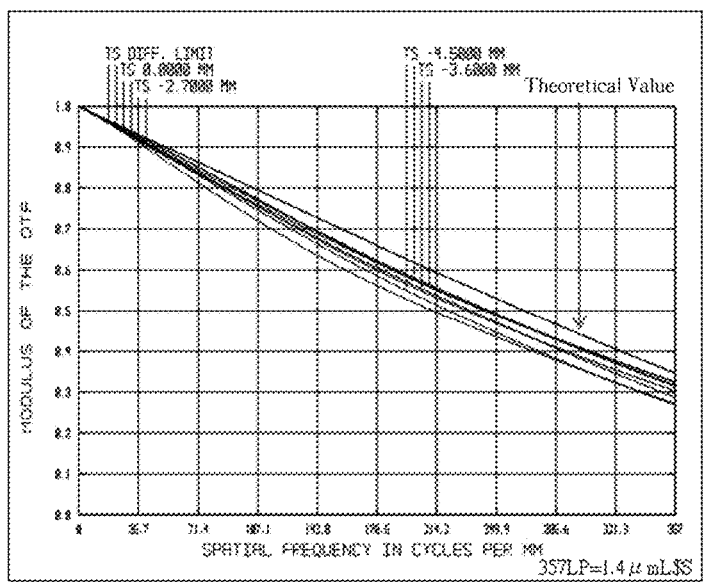

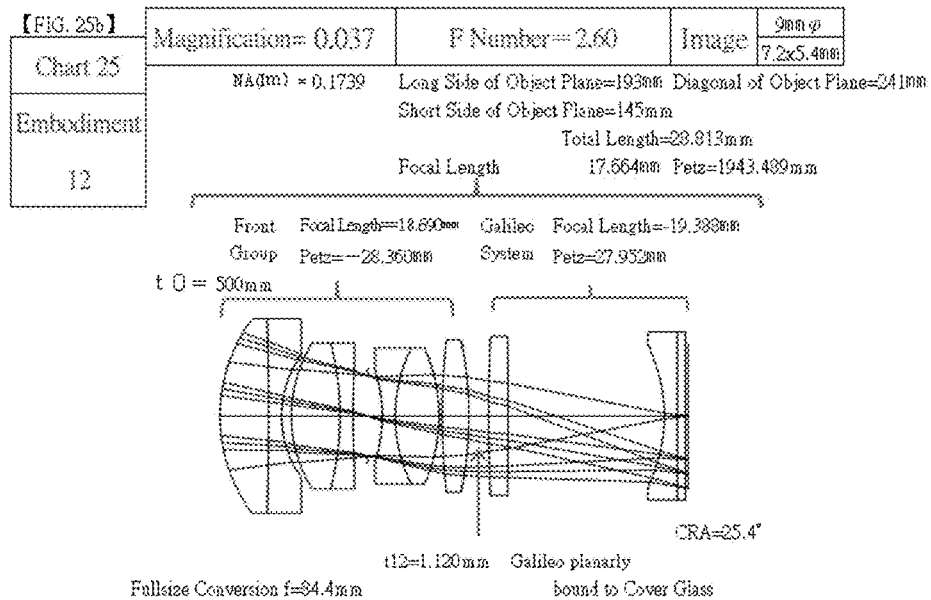
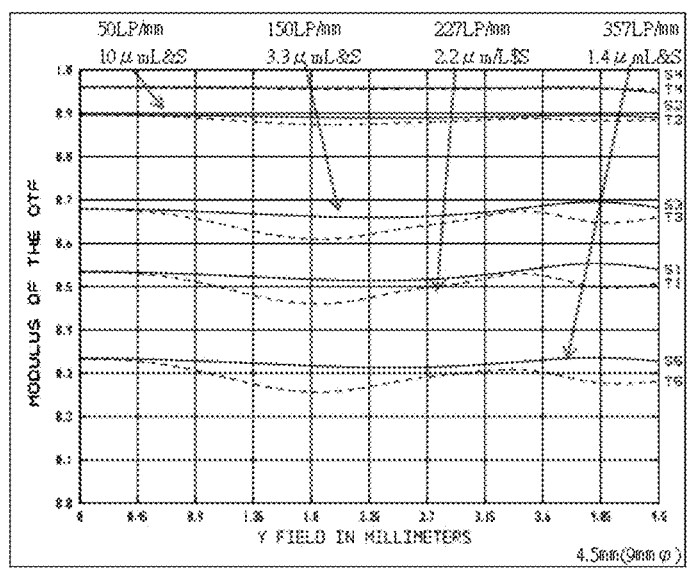
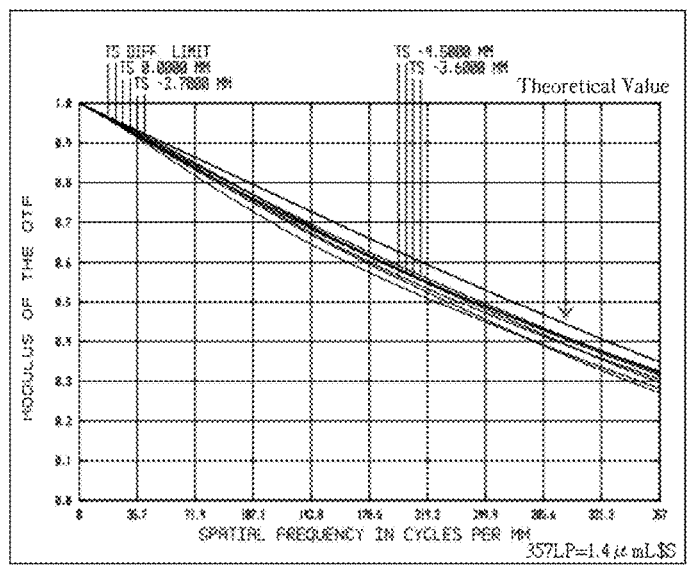

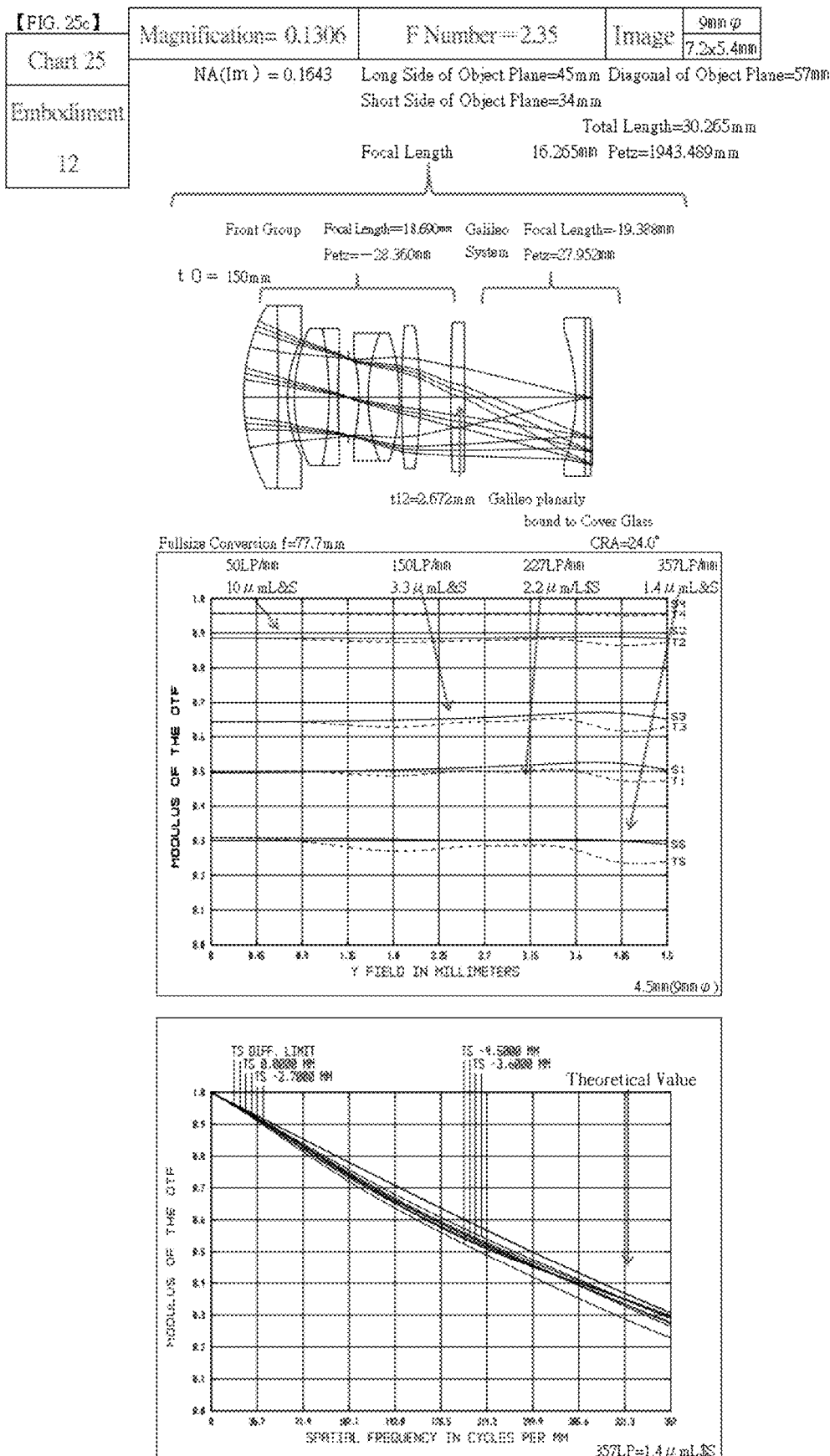

Chart 13

Embodiment 13

| Configuration | | | |
|---|---|---|---|
| Image Size | 4-division 2-pieces + 2-pieces Galileo | | |
| | Modified Grove (Shimahto) + Galileo | | |
| | 1/2.3 inch 7.98mm @ 6.4x4.8mm | | |
| t16 : Galileo Concave-Cover Glass | 0mm = phasmly bound | | |
| f[mm] | ∞ | 130 | |
| ①Focal Length | 0.800 0.961 | 2.097 | |
| | 14.954 14.493 | 13.460 | |
| Magnification | 0.0053 | 0.0455 | |
| Entirety | Angle of View (Object plane) | Diagonal | 20mm | 1.50mm |
| | | Long Side | 20mm | |
| | | Short Side | 170mm | 40mm |
| | Fv | Diagonal | 27.5° | 26.6° |
| | Chief Ray Angle | | 2.80 | 2.35 |
| | | | 0.054 | 0.097 |
| | ②Entirety Focus Plane Front Group Paraxial Focus Plane | | 722.795 | |
| Front Group | ③Focal Length | | 15.140 | |
| | (2MD : Remained range | 1.01 | 1.04 | 1.12 |
| | Radius of Petzval Curvature | | 21.412 | |
| Galileo | ④Focal Length | | −14.335 | |
| | | | −1.006 | |
| | Front Group Focal Length/Galileo Focal Length | | | |
| | Radius of Petzval Curvature | | 20.796 | |
| | ⑧Convex Focal Length | | 113.371 | Radius of Concave Petzval Curvature | −181.506 |
| | ⑨Concave Focal Length | | −11.335 | Radius of Concave Petzval Curvature | 18.659 |
| | ⑩CPFocal Length Ratio | | 0.101 | Concave/Convex Petzval Ratio | 0.103 |

| Surf | Radius | Thick | Glass Index | Abbe | Semi-Dia |
|---|---|---|---|---|---|
| OBJ | Infinity | ∞ | | | 5.200 |
| 1 | 9.199 | 2.970 | 1.5932 | 67.736 | 5.200 |
| 2 | −66.300 | 0.800 | 1.5168 | 64.143 | 3.400 |
| 3 | 5.628 | 0.500 | | | 4.000 |
| 4 | 6.998 | 2.800 | 1.4970 | 81.546 | 4.000 |
| 5 | −13.154 | 0.800 | 1.5174 | 52.430 | 4.000 |
| STO | 96.739 | 0.800 | | | 4.000 |
| 7 | Infinity | 0.800 | | | 1.920 |
| 8 | −8.522 | 0.800 | 1.5174 | 52.430 | 2.200 |
| 9 | 7.983 | 2.300 | 1.4970 | 81.546 | 3.000 |
| 10 | 4.657 | 0.100 | | | 3.500 |
| 11 | 25.075 | 1.800 | 1.5932 | 67.736 | 3.800 |
| 12 | 30.677 | ∞ | | | 3.800 |
| 13 | 52.476 | 1.100 | 1.5952 | 67.736 | 4.100 |
| 14 | 231.313 | 6.872 | | | 4.100 |
| 15 | −5.804 | 0.500 | 1.5714 | 52.952 | 3.900 |
| 16 | Infinity | 0.500 | 1.5293 | 54.317 | 4.500 |
| 17 | Infinity | 0.120 | | | 4.500 |
| IMA | | | | | 4.900 |

| Surf | Radius | 2nd Term | 4th Term | 5th Term | 6th Term | 8th Term | 10th Term |
|---|---|---|---|---|---|---|---|
| 13 Spheric | −5.804 | 0.549 | 0.436 | 0.488 | 0.0001 | 1.41E-08 | | |
| Wavelength(μm) | | 1.0 | 0.6 | 0.6 | 0.6 | −1.03E-04 | 7.10E-06 | −1.95E-07 |
| Weight | | | | | | 0.529 | 0.656 | 0.2 |

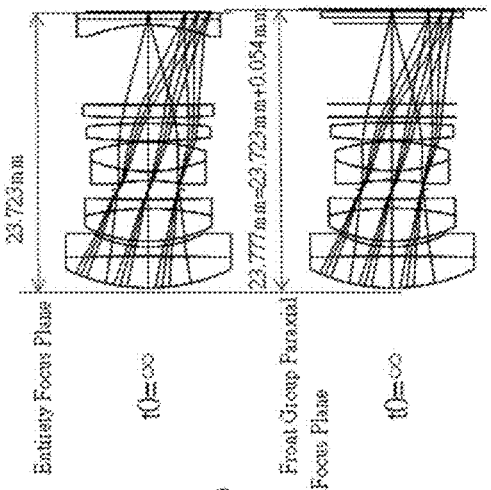

[ FIG. 26 ]

[FIG. 27a]
| Chart 27 | Magnification= 1/∞ | F Number = 2.8 | Image | 7.96mm φ |
|---|---|---|---|---|
| Embodiment 13 | NA(Im) = 0.1758  Long-side Angle of View=±13.5°  Diagonal Angle of View=±16.7° Short-side Angle of View=±10.2°  Total Length=23.723mm Focal Length=14.954mm  Petz=722.792 mm | | | 6.4x4.8mm |
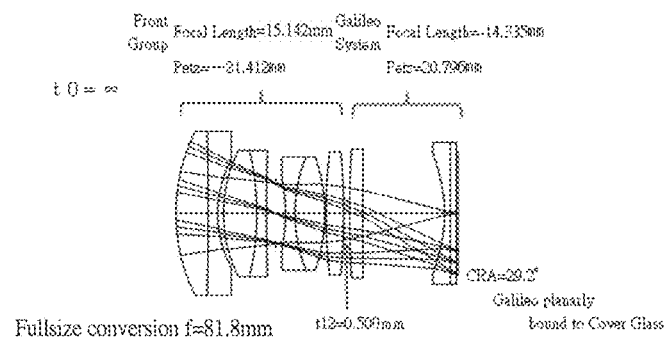
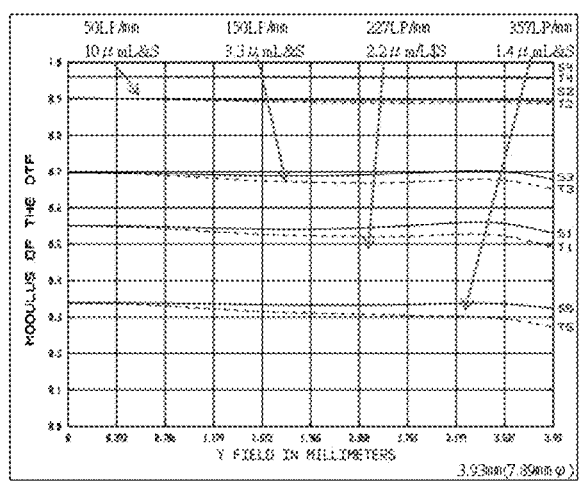
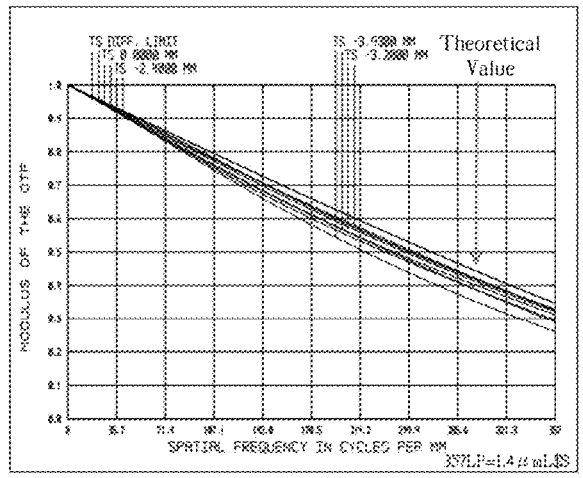

[FIG. 27b]
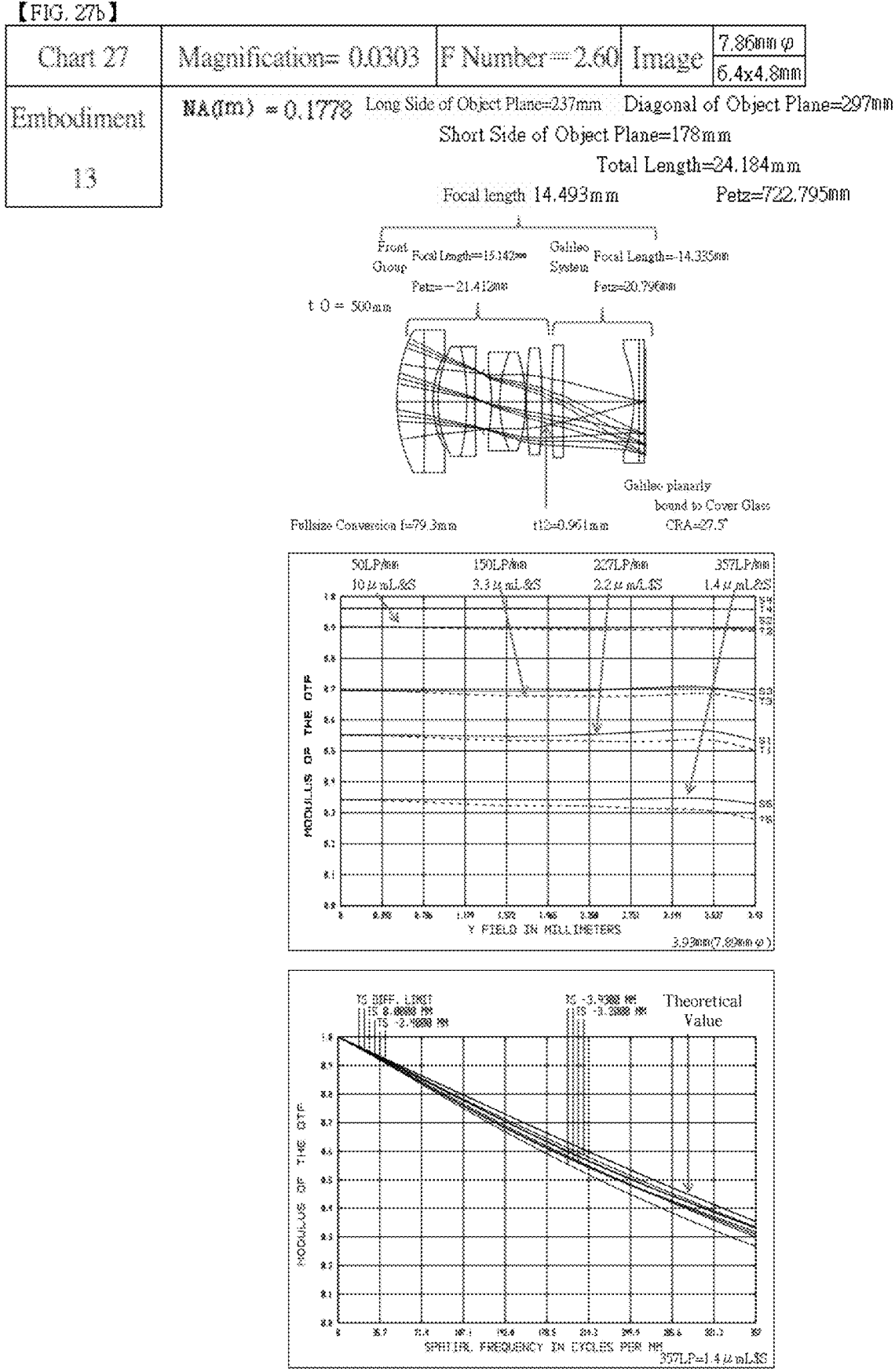

[FIG. 27c]
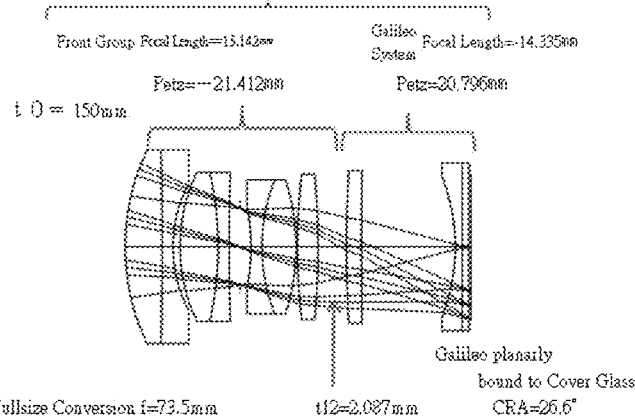
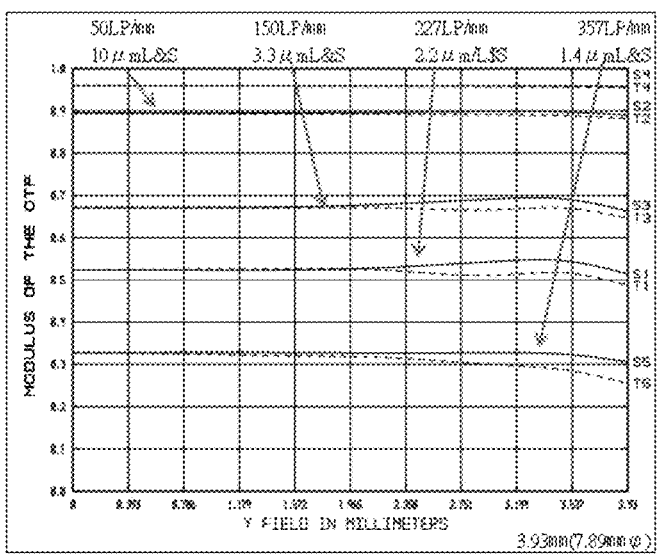
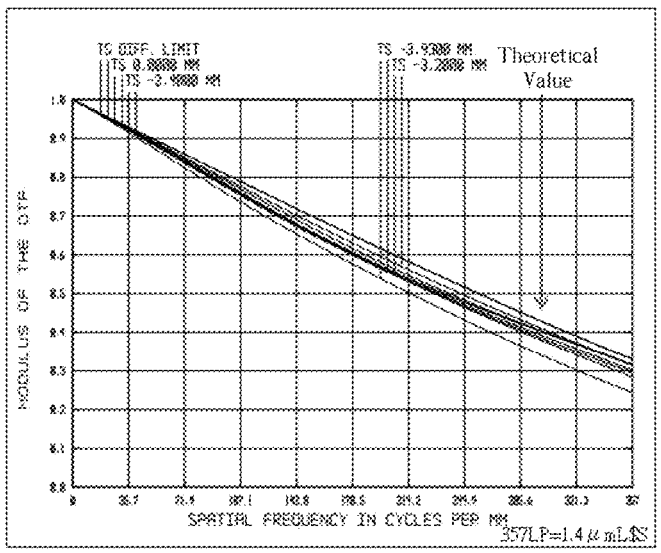

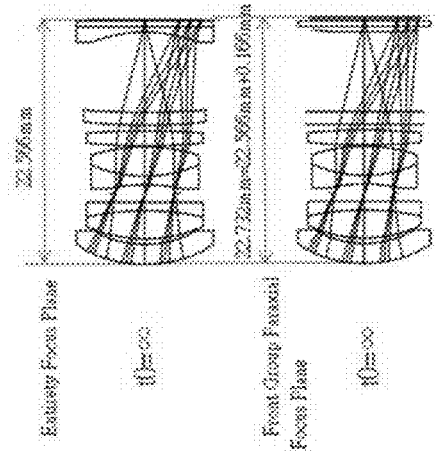
[FIG. 28]

[FIG. 29a]
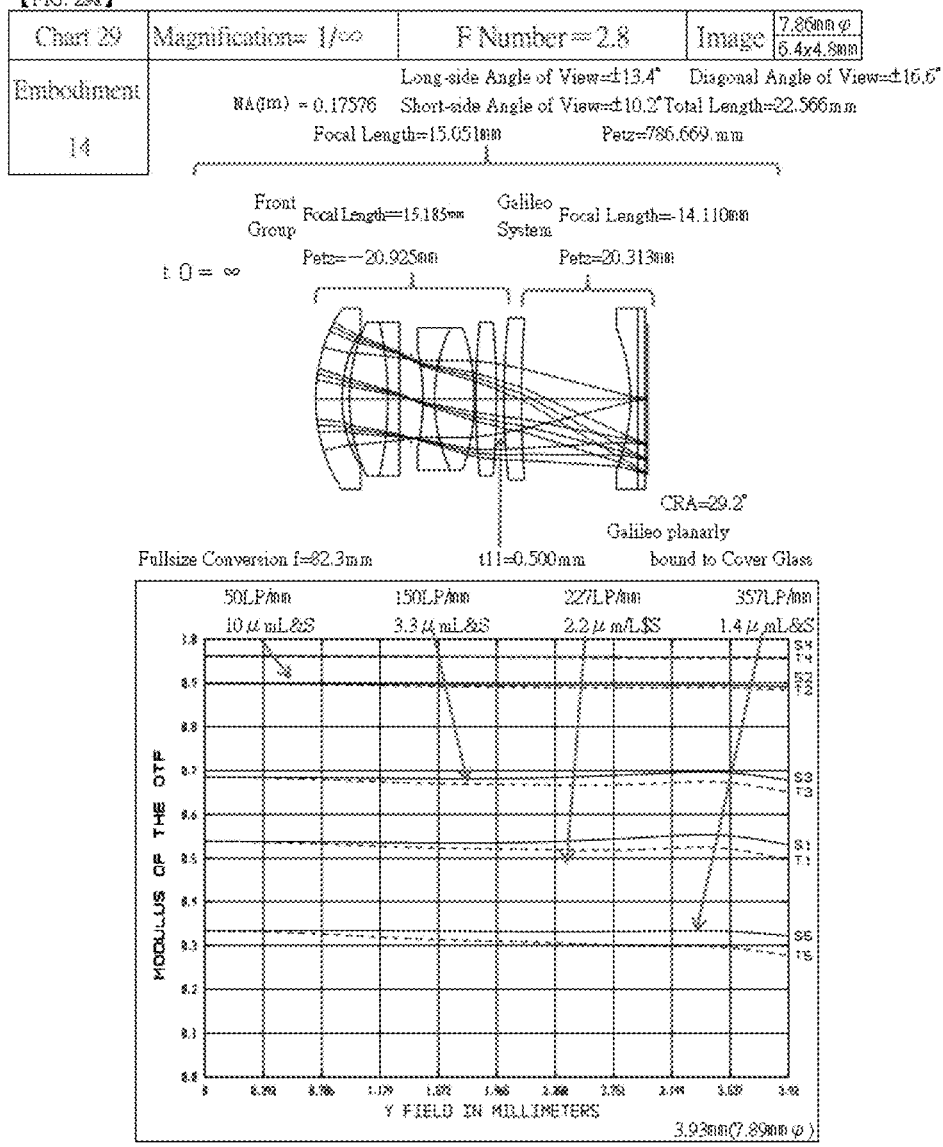
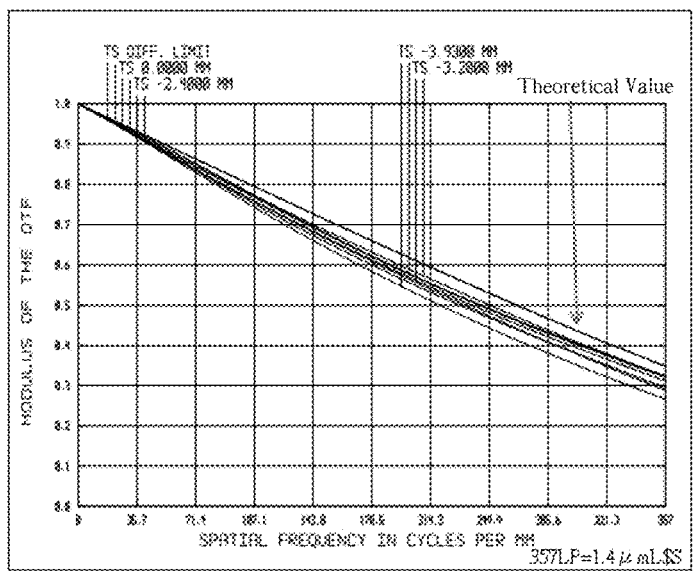

[FIG. 29b]
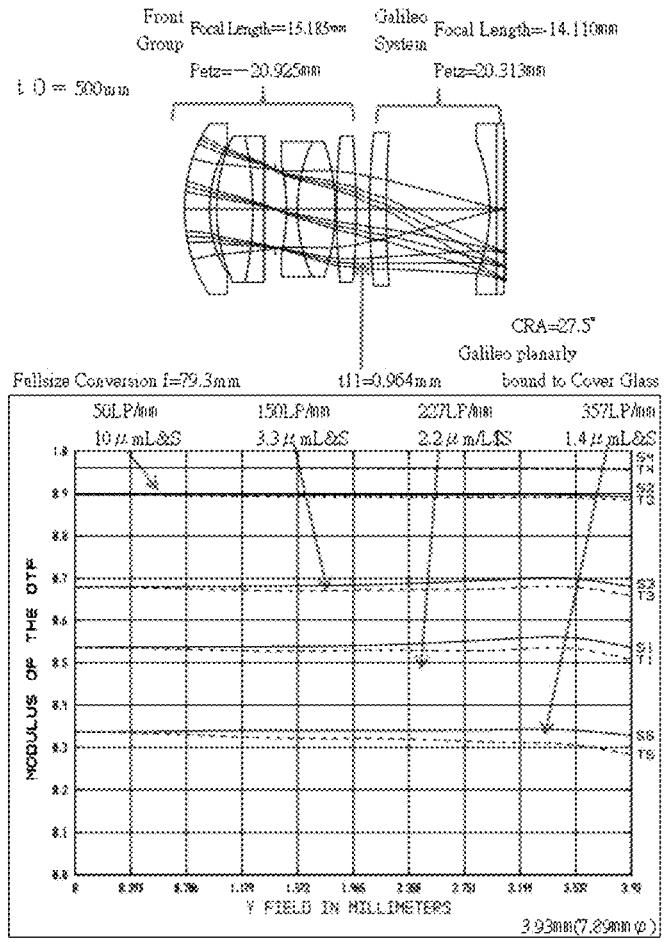
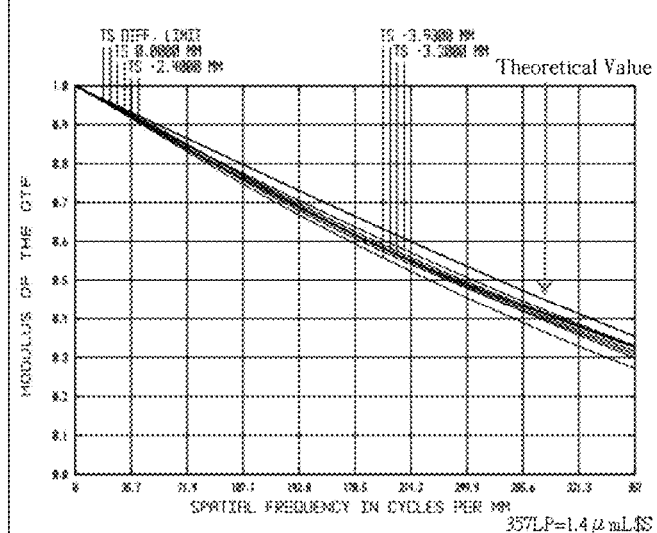

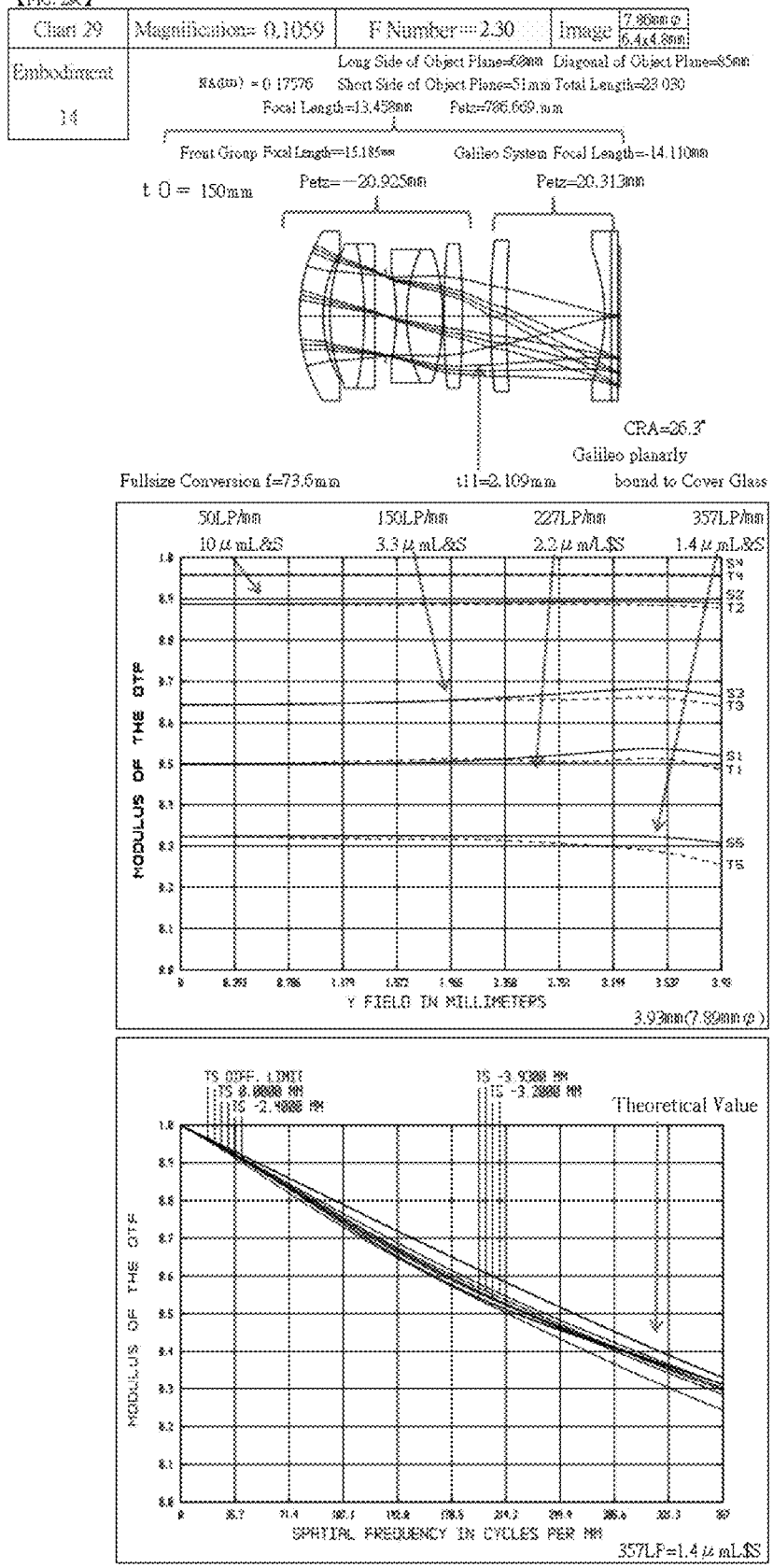

[FIG. 30]

IMAGING LENS

CROSS REFERENCE TO RELATED APPLICATION

The present application is a U.S. National Stage Application under 35 U.S.C. § 371 of International Patent Application No. PCT/JP2023/001885, filed on Jan. 23, 2023, which is based on and claims priority to Japanese Patent Application No. 2002-009414 filed on Jan. 25, 2022. The disclosures of both of the patent applications are incorporated by reference herein in their entirety.

BACKGROUND OF THE INVENTION

1. Field of the Invention

The present invention relates to an imaging lens for having a light form an image on a light-receiving portion of, for example, a CMOS image sensor.

2. Description of the Prior Art

The structures of CMOS image sensors are basically classified into a front-side illumination type and a back-side illumination type. For the front-side illumination type of CMOS image sensors, a photodiode is processed on a silicon wafer, and a wiring layer, a color filter and a microlens are arranged thereabove. In these years, with miniaturization, the number of wires is increasing, and thus a problem that light might be adversely shielded from reaching the CMOS photodiode becomes more and more serious.

Furthermore, due to the increased thickness of the wiring layer, the photodiode of the CMOS device is configured to be arranged at the bottom of a deep well, and only the light beam, which has a small angle relative to the vertical line, can be used by the photodiode. Furthermore, since the light beam reflected from the shielded area and scattered as described in the above former case and the light beam reflected from the wall of the well and scattered as described in the above latter case reach the photodiode as flare beams, the contrast of the image is adversely lowered.

On the other hand, for the back-side illumination type of CMOS image sensor, a silicon wafer formed with a photodiode layer is laminated to a silicon wafer formed of a wiring layer, the silicon wafer is machinery removed until the surface of the photodiode layer just appears, and the color filter and the microlens are processed and formed. Since the photodiode layer is disposed in front of the wiring layer for the back-side illumination type, the above-mentioned disadvantage encountered by the front-side illumination type can be solved. Although the processing of the back-side illumination type of CMOS image sensor requires high technique, the back-side illumination type of CMOS image sensor is replacing the front-side illumination type of CMOS image sensor.

Furthermore, with logic circuit embedded in the wiring layer and even exhibiting functions of an image processor, it can also be called a stacked CMOS image sensor.

With the use of this kind of CMOS image sensor, for obtaining a high quality image, an imaging lens suitable for a miniaturized CMOS image sensor will be needed. In consideration of the image resolution required by the imaging lens, the pixel size of the CMOS image sensor is considered.

The stacked CMOS image sensor is used as a variety of image input means of, for example, digital cameras, smart phones (=mobile phones), surveillance cameras, car cameras, etc. For enhancing image resolution up to 3.5 µm×3.5 µm for a 35 mm full-size digital camera and 1.4 µm×1.4 µm for a 1-inch to ⅓-inch industrial camera, a CMOS element (one pixel of the CMOS image sensor) can be further miniaturized.

For a smart phone camera of a mobile phone, a CMOS image sensor which has four 0.8 µm×0.8 µm CMOS pixels, i.e., R (red)+G (green)×2+B (blue), grouped with one microlens has also been commercialized. For an imaging lens, the resolution is required to be microlens diaphragm=1.6 µm×1.6 µm.

In a front-side type of CMOS, a 2.2 µm×2.2 µm element with an APS-H size (35.5 mmΦ, 29.2×20.2 mm) has been developed for industrial use. For an imaging lens corresponding to this kind of CMOS device, for example, an imaging lens as disclosed in Patent Reference 1 has been proposed. In the imaging lens disclosed in Patent Reference 1, high optical performance has been confirmed by an actually prototyped imaging lens.

Prior Art Reference

Patent Reference

U.S. Pat. No. 6,725,740

SUMMARY OF THE INVENTION

Problem to be Solved by the Invention

However, the imaging lens described in Patent Reference 1 employs a floating mechanism in which the lens group at the imaging side moves for focusing, resulting in a complicated structure and not easy to be handled.

Furthermore, the entire imaging surface of a camera with a 1-inch to ⅓-inch CMOS image sensor for industrial use has a CMOS element (one pixel of a CMOS image sensor) size of 1.4 µm×1.4 µm. As a criterion of a clear image, in general, imaging should be conducted at a contrast of a MTF value over 20%. However, for a 1.4 µm×1.4 µm element, there has not been any imaging lens achieving a contrast of a MTF value over 20%. The imaging lens described in Patent Reference 1 also could not obtain a contrast of a MTF value over 20% at any shooting distance because the lens group at the imaging side moves, and the lens group at the imaging side could not always be placed near the imaging plane.

Therefore, an object of the invention is to solve the above-described problem, and provide an imaging lens, which has a resolution corresponding to the miniaturized image sensor elements, and meanwhile, can be focused with a simple structure, can be provided.

Means for Solving the Problem

For solving the above-mentioned problems, an imaging lens according to an embodiment of the present invention includes a front group of imaging lens, which include a plurality of lenses anteroposteriorly arranged with an diaphragm interposed therein, and a convex-concave Galileo system formed with a convex lens at a front group side and a concave lens at an imaging plane side. Focusing is performed by fixing convex-concave Galileo system in a vicinity of an imaging plane and advancing the front group of imaging lens.

Effect of the Invention

As above, according to the present invention, an imaging lens, which has a resolution corresponding to the miniaturized image sensor elements, and meanwhile, can be focused with a simple structure, can be provided.

BRIEF DESCRIPTION OF THE DRAWINGS

FIG. 1 is a diagram illustrating Chart 1 according to Embodiment 1.

FIG. 2a is a diagram illustrating Chart 2 (shooting distance t0=∞, 500 mm, 150 mm) according to Embodiment 1.

FIG. 2b is a diagram illustrating Chart 2 (shooting distance t0=500 mm) according to Embodiment 1.

FIG. 2c is a diagram illustrating Chart 2 (shooting distance t0=150 mm) according to Embodiment 1.

FIG. 4 is a diagram illustrating Chart 4 according to Embodiment 2.

FIG. 5a is a diagram illustrating Chart 2 (shooting distance t0=∞, 500 mm, 150 mm) according to Embodiment 2.

FIG. 5b is a diagram illustrating Chart 2 (shooting distance t0=500 mm) according to Embodiment 2.

FIG. 5c is a diagram illustrating Chart 2 (shooting distance t0=150 mm) according to Embodiment 2.

FIG. 6 is a diagram illustrating Chart 6 according to Embodiment 3.

FIG. 7a is a diagram illustrating Chart 7 (shooting distance t0=∞, 500 mm, 150 mm) according to Embodiment 3.

FIG. 7b is a diagram illustrating Chart 7 (shooting distance t0=500 mm) according to Embodiment 3.

FIG. 7c is a diagram illustrating Chart 7 (shooting distance t0=150 mm) according to Embodiment 3.

FIG. 8 is a diagram illustrating Chart 8 according to Embodiment 4.

FIG. 9a is a diagram illustrating Chart 9 (shooting distance t0=∞, 500 mm, 150 mm) according to Embodiment 4.

FIG. 9b is a diagram illustrating Chart 9 (shooting distance t0=500 mm) according to Embodiment 4.

FIG. 9c is a diagram illustrating Chart 9 (shooting distance t0=150 mm) according to Embodiment 4.

FIG. 10 is a diagram illustrating Chart 10 according to Embodiment 5.

FIG. 11a is a diagram illustrating Chart 11 (shooting distance t0=∞, 500 mm, 150 mm) according to Embodiment 5.

FIG. 11b is a diagram illustrating Chart 11 (shooting distance t0=500 mm) according to Embodiment 5.

FIG. 11c is a diagram illustrating Chart 11 (shooting distance t0=150 mm) according to Embodiment 5.

FIG. 12 is a diagram illustrating Chart 12 according to Embodiment 6.

FIG. 13a is a diagram illustrating Chart 13 (shooting distance t0=∞, 500 mm, 150 mm) according to Embodiment 6.

FIG. 13b is a diagram illustrating Chart 13 (shooting distance t0=500 mm) according to Embodiment 6.

FIG. 13c is a diagram illustrating Chart 13 (shooting distance t0=150 mm) according to Embodiment 6.

FIG. 14 is a diagram illustrating Chart 14 according to Embodiment 7.

FIG. 15a is a diagram illustrating Chart 15 (shooting distance t0=∞, 500 mm, 150 mm) according to Embodiment 7.

FIG. 15b is a diagram illustrating Chart 15 (shooting distance t0=500 mm) according to Embodiment 7.

FIG. 15c is a diagram illustrating Chart 15 (shooting distance t0=150 mm) according to Embodiment 7.

FIG. 16 is a diagram illustrating Chart 16 according to Embodiment 8.

FIG. 17a is a diagram illustrating Chart 17 (shooting distance t0=∞, 500 mm, 150 mm) according to Embodiment 8.

FIG. 17b is a diagram illustrating Chart 17 (shooting distance t0=500 mm) according to Embodiment 8.

FIG. 17c is a diagram illustrating Chart 17 (shooting distance t0=150 mm) according to Embodiment 8.

FIG. 18 is a diagram illustrating Chart 18 according to Embodiment 9.

FIG. 19a is a diagram illustrating Chart 19 (shooting distance t0=∞, 500 mm, 150 mm) according to Embodiment 2.

FIG. 19b is a diagram illustrating Chart 19 (shooting distance t0=500 mm) according to Embodiment 9.

FIG. 19c is a diagram illustrating Chart 19 (shooting distance t0=150 mm) according to Embodiment 9.

FIG. 20 is a diagram illustrating Chart 20 according to Embodiment 10.

FIG. 21a is a diagram illustrating Chart 21 (shooting distance t0=∞, 500 mm, 150 mm) according to Embodiment 10.

FIG. 21b is a diagram illustrating Chart 21 (shooting distance t0=500 mm) according to Embodiment 10.

FIG. 21c is a diagram illustrating Chart 21 (shooting distance t0=150 mm) according to Embodiment 10.

FIG. 22 is a diagram illustrating Chart 22 according to Embodiment 11.

FIG. 23a is a diagram illustrating Chart 23 (shooting distance t0=∞, 500 mm, 150 mm) according to Embodiment 11.

FIG. 23b is a diagram illustrating Chart 23 (shooting distance t0=500 mm) according to Embodiment 11.

FIG. 23c is a diagram illustrating Chart 23 (shooting distance t0=150 mm) according to Embodiment 11.

FIG. 24 is a diagram illustrating Chart 24 according to Embodiment 12.

FIG. 25a is a diagram illustrating Chart 25 (shooting distance t0=∞, 500 mm, 150 mm) according to Embodiment 12.

FIG. 25b is a diagram illustrating Chart 25 (shooting distance t0=500 mm) according to Embodiment 12.

FIG. 25c is a diagram illustrating Chart 25 (shooting distance t0=150 mm) according to Embodiment 12.

FIG. 26 is a diagram illustrating Chart 26 according to Embodiment 13.

FIG. 27a is a diagram illustrating Chart 27 (shooting distance t0=∞, 500 mm, 150 mm) according to Embodiment 13.

FIG. 27b is a diagram illustrating Chart 27 (shooting distance t0=500 mm) according to Embodiment 13.

FIG. 27c is a diagram illustrating Chart 27 (shooting distance t0=150 mm) according to Embodiment 13.

FIG. 28 is a diagram illustrating Chart 28 according to Embodiment 14.

FIG. 29a is a diagram illustrating Chart 29 (shooting distance t0=∞, 500 mm, 150 mm) according to Embodiment 14.

FIG. 29b is a diagram illustrating Chart 29 (shooting distance t0=500 mm) according to Embodiment 14.

FIG. 29c is a diagram illustrating Chart 29 (shooting distance t0=150 mm) according to Embodiment 14.

FIG. 30 is a table summarizing the results of all embodiments.

DETAILED DESCRIPTION

In the following, each example of the invention will be explained with reference to the figures and tables attached as drawings. The examples shown below are intended to embody the technical concept of the invention and do not limit the invention to the following, unless specifically stated otherwise.

(General Description)

In the present application, an imaging lens is provided. The imaging lens includes a front group of imaging lens, which include a plurality of lenses anteroposteriorly arranged with an diaphragm interposed therein, and a convex-concave Galileo system formed with a convex lens at a front group side and a concave lens at an imaging plane side. Focusing is performed by fixing convex-concave Galileo system in a vicinity of an imaging plane and advancing the front group of imaging lens.

In the present imaging lens, the front group imaging lens and the Galileo system provide resolution corresponding to the elements of a miniaturized image sensor. Furthermore, since the Galileo system is fixed near the imaging plane, focusing can be performed with a simple structure. As a result, it is possible to provide an imaging lens that has a resolution that corresponds to the elements of a miniaturized image sensor and that can be focused with a simple structure.

In more detail, in the imaging lens according to the present application, at any shooting distance from t0=∞ to close-up t0=150 mm, MTF over 20% at 1.4 μmL&S (=357 LP/mm) can be obtained all over the imaging plane.

Herein, L&S is named under line-and-space, which means the width of a wire and the spacing between adjacent wires. LP/mm is named under line-pair/mm, which indicates the resolution of the imaging system. If X [μmL&S]=Y [LP/mm], then the relationship X=1000/Y/2 stands.

Furthermore, MTF (Modulation Transfer Function) is one of the indicators to evaluate the performance of a lens, and it is an expression of the degree to which the contrast of a subject can be faithfully reproduced as a spatial frequency characteristic for realizing the imaging performance of the lens.

With regards to the concrete embodiment for achieving the above object, Embodiment 1 is described with reference to FIG. 1 through FIG. 3e. FIG. 1 is a diagram illustrating Chart 1 according to Embodiment 1. FIG. 2a is a diagram illustrating Chart 2 (shooting distance t0=∞, 500 mm, 150 mm) according to Embodiment 1. FIG. 2b is a diagram illustrating Chart 2 (shooting distance t0=500 mm) according to Embodiment 1. FIG. 2c is a diagram illustrating Chart 2 (shooting distance t0=150 mm) according to Embodiment 1. FIGS. 3a-3e are diagrams illustrating Chart 3 according to Embodiment 1.

Figure 3A:
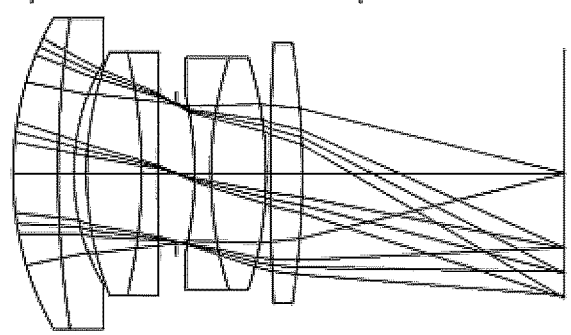
FIGS. 3a-3e are diagrams illustrating Chart 3 according to Embodiment 1.
Figure 3B:
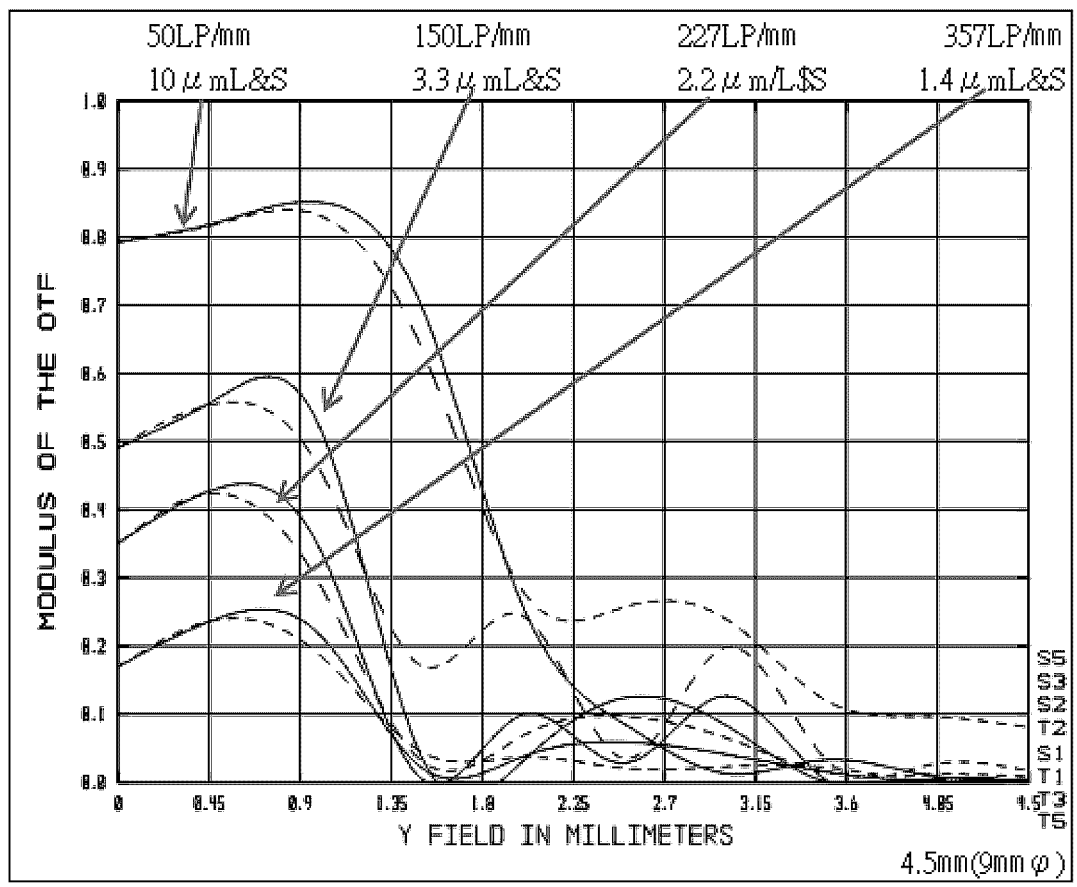

Data, optical path scheme and MTF of the front group of imaging lens in Embodiment 1 are indicated in the upper portion of Chart 3 (FIG. 3a, (a)). A part of the imaging plane, which has a relatively low image height, has a relatively high MTF value. However, for a radius of Petzval curvature being −27.948 mm, a part of the imaging plane, which has a relatively high image height, collapses forwards and the MTF value drops sharply.

Herein, the radius of the Petzval curvature is a theorized curvature of the image plane in Seidel's third-order aberration region. In Seidel's third-order aberration region, a radius of curvature of the meridional image plane, where imaging is performed with a good contrast of line width in the diameter direction of the image plane, and a radius of curvature of the sagittal image plane, where imaging is performed with a good contrast of line width in the circumferential direction of the image plane, overlap with each other, and the radius of Petzval curvature, which is a radius of curvature under a condition of no astigmatism, is theorized.

If only a convex lens is used, the radius of Petzval curvature is a negative value, and the image plane is configured as a shape curving toward the lens. In a concave lens is additionally used in the lens configuration, the radius of curvature increases, and the image plane becomes more upright, but the focal length of the imaging lens becomes longer due to the addition of the concave lens. This is resolved by the location of the concave lens. If the concave lens is located in the vicinity of the imaging focus plane of the convex lens, the combined focal length of the convex lens and the concave lens would be almost the focal length of the convex lens.

Figure 3C:
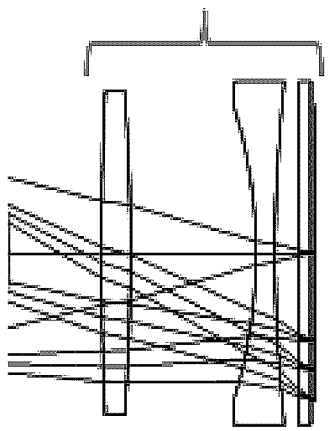

Data and optical path scheme of the Galileo system in Embodiment 1 are indicated in the middle portion of Chart 3 (FIG. 3c, (a)). As a radius of Petzval curvature of the Galileo system is +32.073 mm, a radius of Petzval curvature of the entirety of the imaging lens is 1/(1/32.073−1/27.948) =−217.309 mm, and the imaging plane becomes upright.

Figure 3D:
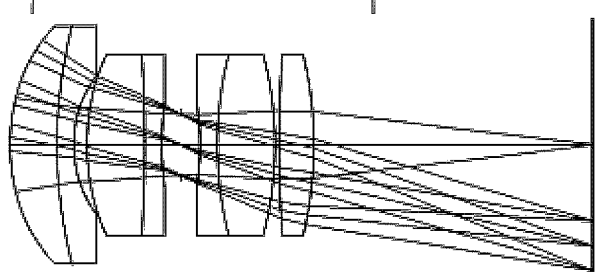
Figure 3E:
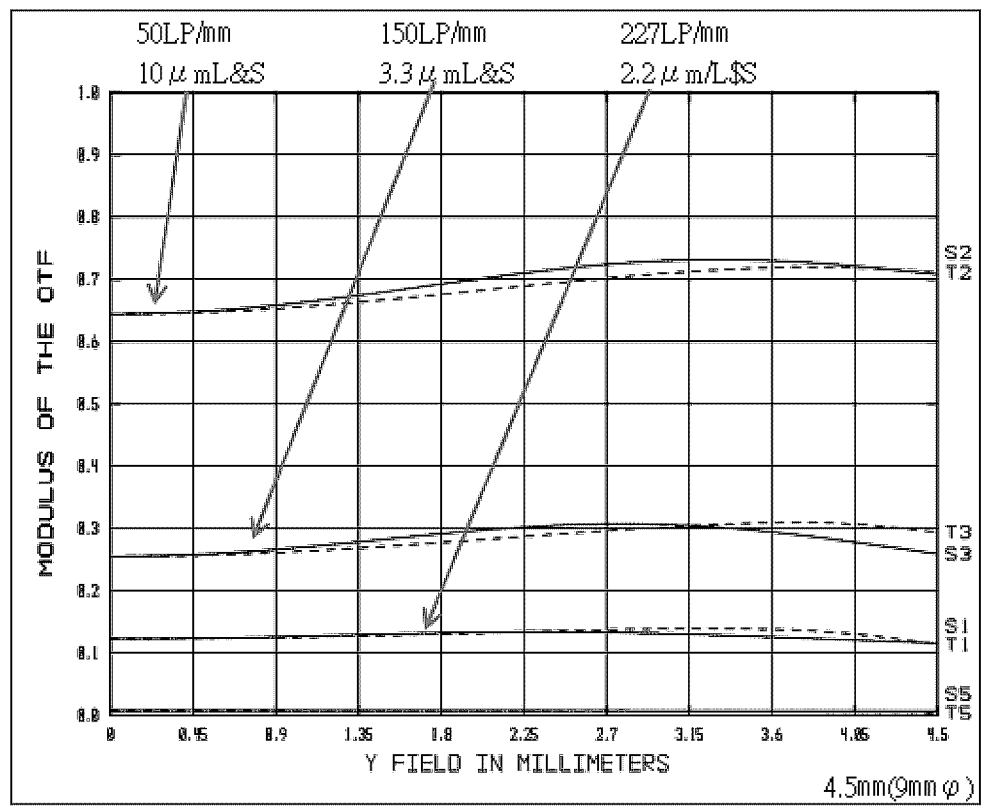

In the lower portion of Chart 3 (FIG. 3d, (b)), optimization is tried from the front group of imaging lens without the Galileo system, under the same focal length and the same imaging area. A radius of Petzval curvature of the Galileo system has stood from −27.948 mm to −73.262 mm. However, once the F number is lowered to 5.6, the resolving power is reduced. Nevertheless, MTF 30% can be obtained at 3.3 μmL&S=150 LP/mm over the entire imaging plane.

The front group of imaging lens is formed with a 4-division-6-piece Gauss type, a 4-division-7-piece Summitar type, or a modified Summitar type, in which front doublet lenses are divided to form a 5-division-7-piece one. This type of front group of imaging lens has a good aberration to an F number of about 5.6. According to the present invention, with the addition of the Galileo system, MTF 20% or more at 1.4 μmL&S can be achieved with an F number of 2.8 over the entire 9 mmΦ imaging plane.

With a standard specification of 1/1.8 inch (9 mmΦ, 7.2×5.4 mm) imaging plane and ±14.1° angle of view, the specification in the present application includes a size range of the imaging plane being ⅓ inch (6 mmΦ, 8×3.6 mm) to 1 inch (16 mmΦ, 12.8×9.6 mm) and a range of the angle of view being ±9.8° to ±16.8°. By emplying this kind of specification, almost aberration-free performance can be conducted.

In the present application, with the entirety of the lens combination formed with the front group of imaging lens and the convex-concave Galileo system, where a convex lens with a positive power at the front group imaging lens side and a concave lens with a negative power at an imaging plane side are lined up, as the convex-concave Galileo system is fixed near an imaging plane, the Galileo system is located near the focus position. Therefore, a value ((3)/(1)) obtained by dividing (3) a focal length of the front group of imaging lens without the convex-concave Galileo system by (1) a focal length of an entirety of the lens combination can be kept in a range of 0.9~1.2.

The numbers enclosed in parentheses above correspond to the circled numbers shown in the charts (figures). The same applies to the numbers enclosed in parentheses shown below.

This will be described by way of imaging data from a far distance (Chart 1: t0=∞) (t0: shooting distance) in Embodiment 1. When a lens with a negative power is added to the imaging lens, the raising of the image plane can be realized from Petzval's formula. From the sum of the reciprocal (1/P) of the radius P1 of Petzval curvature=−27.948 of the front group of imaging lens in the data of Embodiment 1 and the reciprocal (1/P2) of the radius P2 of Petzval curvature=32.073 of the Galilean system, the radius P of Petzval curvature=−217.309 of the overall imaging lens is obtained, as follows:

$1/P=1/P1+1/P2$ $1/(-217.309)=1/(-27.948)+1/32.073$

In thin-walled optics, if the focal length of lens 1 is f1, the focal length of lens 2 is f2, and a distance between the principal points of the two lens groups is d, the focal length f of the lens entirety is obtained by the formula below:

$$1/f=1/f1+1/f2-d/(f1\times f2)$$

With the front group of imaging lens (f1=18.534), the Galilean system (f2=−23.764) and the distance (d=19.177) between the principal points of the lens assembly, if f2 is located near the focus of the front group of imaging lens, the focal length of the entirety of imaging lens becomes f=18.046.

$$1/f=1/f1+1/f2--d/(f1\times f2)$$

$$1/18.046=1/18.534+1/(-23.764)-19.177/\{18.534\times(-23.764)\}$$

$$0.0554=0.0540-0.0421+0.0435$$

In this way, by fixing the Galileo system in the vicinity of the imaging plane, even if the f2 Galileo system includes a lens with an intense minus power, the focal length of the entirety of the imaging lens is close to the focal length of the front group of imaging lens.

The value ((3)/(1)) obtained by dividing (3) the focal length of the front group of imaging lens without the convex-concave Galileo system by (1) the focal length of the entirety of the lens combination is in the range of 0.9~1.2, which means the focal length (3) of the Galileo system is free to have little effect on the focal length of the entirety. Accordingly, the image bending in the front group can be easily corrected by the Galileo system. Based on the design principle that the above value ((3)/(1)) is within the range of 0.9~1.2, the front group and the Galileo system individually, or the front group+the Galileo system, can be optimized to obtain MTF greater than 20% at 1.4 μmL&S.

In connection with the correction for optimization, a value ((3)/(4)) obtained by dividing (3) the focal length of the front group of imaging lens by (4) the focal length of the Galileo system is a Petzval correction ratio indicated by a ratio of the focal lengths of the front group and the Galileo system. The value ((3)/(4)) is small when the radius of Petzval curvature of the front group is long, and in contrast, it is large when the radius of Petzval curvature of the front group is short. When the radius of Petzval curvature of the front group is long, it can be optimized with a weak correction of the convex-concave Galileo system, and when the radius of Petzval curvature of the front group is short, a strong correction of the convex-concave Galileo system is required.

In the present application, in consideration of correction by way of the convex-concave Galileo system to be described later, lens design is performed to make the value ((3)/(4)) obtained by dividing (3) the focal length of the front group of imaging lens by (4) the focal length of the Galileo system lie in a range from −0.2 to −1.0.

In Embodiment 1,
(3)/(4)=−0.780, which lies in the range from −0.2 to −1.0;
the focal length of the entirety of the lens combination is 18.046 mm, and the radius of Petzval curvature is −217.309;
the focal length of the front group is 18.534 mm, and the radius of Petzval curvature is −27.948; and
the focal length of the Galileo system is −23.764 mm, and the radius of Petzval curvature is 32.073.

In connection with the correction for performing optimization with the convex-concave Galileo system, a value ((6)/(5)) obtained by dividing (5) a focal length of a convex lens of the convex-concave Galileo system by (6) a focal length of a concave lens is given as an example. The value ((6)/(5)) is a ratio of focal lengths of convex and concave lens. When the focal length of the concave lens is relatively long (=Petzval correction is relatively small), it results in a relatively large value. When the focal length of the concave lens is relatively short (=Petzval correction is relatively large), it results in a relatively small value. According to the present application, if the image plane of the front group is upright, a gradual Galileo correction is performed. If the image plane largely curves, an intensive Galileo correction is performed. Control can be conducted with the convex and concave Galileo system.

According to the present application, for obtaining MTF over 20% at 21.4 μmL&S, lens design is performed to make the value ((6)/(5)) obtained by dividing (5) a focal length of a convex lens of the convex-concave Galileo system by (6) a focal length of a concave lens lie in a range from −0.08 to −0.8.

In Embodiment 1,
(6)/(5)=−0.276, which lies in the range from −0.08 to −0.8;
the focal length of the entirety of the lens combination is 18.046 mm, and the radius of Petzval curvature is −217.309;
the focal length of the front group is 18.534 mm, and the radius of Petzval curvature is −27.948; and
the focal length of the Galileo system is −23.764 mm, and the radius of Petzval curvature is 32.073.

As above, according to the present application, the imaging lens corresponding to an AI image input device, in which a CMOS element of a back-side illumination CMOS image sensor is miniaturized to 1.4 μm×1.4 μm and even has an edge computer function through further stacking, is provided. While a conventional imaging lens has been improved for roll-up film, since a back-side illumination stacked CMOS image sensor exhibits high-speed electronic image transfer and even an electronic shutter function, the space immediately in front of the sensor can be effectively used, and the arrangement of the Galileo system with the minus power, which has a flat function of image plane upright, can be made easy. The image resolution is from ten plus micrometers of silver salt film down to 1.4 μm for miniaturized CMOS element.

In this way, with the imaging lens according to the present application+back-side illumination stacked CMOS image sensor, an AI image means with an MTF contrast of more than 15% and preferably more than 20% at 1.4 μmL&S over the entire CMOS surface can be achieved.

DESCRIPTIONS OF EMBODIMENTS

Hereinafter, embodiments of the present application are described.

The following embodiments meet the above described correlations of:
- a value ((3)/(1)) obtained by dividing (3) a focal length of the front group of imaging lens by (1) a focal length of an entirety of the lens combination being 0.9~1.2;
- a value ((3)/(4)) obtained by dividing (3) the focal length of the front group of imaging lens by (4) a focal length of the Galileo system being from −0.2 to −1.1;
- a value ((6)/(5)) obtained by dividing (6) a focal length of a concave lens by (5) a focal length of a convex lens of the Galileo system being from −0.08 to −0.8.

Embodiment 1

As shown on Chart 1 and Chart 2 (FIGS. 1 and 2a-2c), Embodiment 1 has:
- image size=1/1.8 inch (9 mmΦ), 4-division-7-piece Gauss modification (Summitar)+2-piece Galileo;
- magnification=1/∞, t0=∞, angle of view=±14.0°, focal length=18.046, F/2.80, front group focus/entirety focus ∞=1.03, Galileo~cover glass=1 mm, CRA=26.3°;
- magnification=0.0369×, t0=500 mm, diagonal field of view=244 mm, focal length=17.545, F/2.60, CRA=25.3°;
- magnification=0.1292×, t0=150 mm, diagonal field of view=70 mm, focal length=16.404, F/2.35, CRA=24.3°.

Herein, CRA, also referred to as Chief Ray Angle, is an incident angle of the chief ray through the pupil center to a CMOS surface. For example, the chief ray from ∞=infinity in Embodiment 1 enters the periphery of the CMOS surface at CRA=26.3°. In a case of a wide-angle lens with a large angle of view, the CRA is large. CRA also varies depending on the lens type, and in Embodiment 2 with the same angle of view as Embodiment 1, CRA=20.9°.

In Embodiment 1, the value ((3)/(1)) obtained by dividing (3) the focal length of the front group of imaging lens by (1) the focal length of the entirety of the lens combination is 1.03 at t0=∞, is 1.06 at t0=500 mm, and is 1.13 at t0=150 mm. Therefore, the correlation 0.9<(3)/(1)<1.2 is complied with.

In Embodiment 1, the value ((3)/(4)) obtained by dividing (3) the focal length of the front group of imaging lens by (4) a focal length of the Galileo system is −0.780. Therefore, the correlation −0.2>(3)/(4)>−1.1 is complied with.

In Embodiment 1, the value ((6)/(5)) obtained by dividing (6) a focal length of a concave lens of the Galileo system by (5) a focal length of a convex lens of the Galileo system is −0.276. Therefore, the correlation −0.08>(6)/(5)>−0.8 is complied with.

As shown in Chart 2 (FIGS. 2a-2c), MTF contrast at 357 LP/mm=1.4 μmL&S is 28% at t0=∞, is 28% at t0=500 mm, and is 26% at t0=150 mm. Therefore, MTF contrast over 20% over the entire image surface from infinity to 150 mm close-up is obtained, and it almost overlaps the theoretical value and achieves good aberration correction.

Embodiment 2

As shown on Chart 4 and Chart 5 (FIGS. 4 and 5a-5c), Embodiment 2 has:
- image size=1/1.8 inch (9 mmΦ), 5-division-7-piece Gauss modification (front lens separated)+2-piece Galileo;
- magnification=1/∞, t0=∞, angle of view=±14.4°, focal length=17.553, F/2.80, front group focus/entirety focus ∞=1.08, Galileo~cover glass=1 mm, CRA=20.9°;
- magnification=0.0359×, t0=500 mm, diagonal field of view=251 mm, focal length=17.409, F/2.65, CRA=20.1°;
- magnification=0.126×, t0=150 mm, diagonal field of view=72 mm, focal length=17.060, F/2.45, CRA=18.8°.

In Embodiment 2, the value ((3)/(1)) obtained by dividing (3) the focal length of the front group of imaging lens by (1) the focal length of the entirety of the lens combination is 1.08 at t0=∞, is 1.09 at t0=500 mm, and is 1.11 at t0=150 mm. Therefore, the correlation 0.9<(3)/(1)<1.2 is complied with.

In Embodiment 2, the value ((3)/(4)) obtained by dividing (3) the focal length of the front group of imaging lens by (4) a focal length of the Galileo system is −0.231. Therefore, the correlation −0.2>(3)/(4)>−1.1 is complied with.

In Embodiment 2, the value ((6)/(5)) obtained by dividing (6) a focal length of a concave lens of the Galileo system by (5) a focal length of a convex lens of the Galileo system is −0.710. Therefore, the correlation −0.08>(6)/(5)>−0.8 is complied with.

If the front lens is separated into a planar-convex lens and a strong meniscus-shaped concave lens, the radius of Petzval curvature of the front group of imaging lens stands and the correction by the Galileo system near the imaging plane can be made mild. Although it is slightly worse than in Embodiment 1, the addition of the Galileo system is helpful to raise the image plane and potentially improve aberrations even if a lens type even more different from the front group of imaging lens is selected.

As shown in Chart 5 (FIGS. 5a-5c), MTF contrast at 357 LP/mm=1.4 μmL&S is 26% at t0=∞, is 24% at t0=500 mm, and is 20% at t0=150 mm. Therefore, MTF contrast over 20% over the entire image surface from infinity to 150 mm close-up is obtained.

Embodiment 3

As shown on Chart 6 and Chart 7 (FIGS. 6 and 7a-7c), Embodiment 3 has:
- image size=1/1.8 inch (9 mmΦ), 4-division-7-piece Gauss modification (Summitar)+2-piece Galileo;
- magnification=1/∞, t0=∞, angle of view=±16.2°, focal length=15.524, F/2.95, front group focus/entirety focus ∞=0.94, Galileo~cover glass=1 mm, CRA=29.3°;
- magnification=0.0314×, t0=500 mm, diagonal field of view=287 mm, focal length=14.563, F/2.75, CRA=28.9°;
- magnification=0.107×, t0=150 mm, diagonal field of view=84 mm, focal length=14.357, F/2.50, CRA=28.2°.

In Embodiment 3, the value ((3)/(1)) obtained by dividing (3) the focal length of the front group of imaging lens by (1) the focal length of the entirety of the lens combination is 0.94 at t0=∞, is 1.01 at t0=500 mm, and is 1.02 at t0=150 mm. Therefore, the correlation 0.9<(3)/(1)<1.2 is complied with.

In Embodiment 3, the value ((3)/(4)) obtained by dividing (3) the focal length of the front group of imaging lens by (4) a focal length of the Galileo system is −0.718. Therefore, the correlation −0.2>(3)/(4)>−1.1 is complied with.

In Embodiment 3, the value ((6)/(5)) obtained by dividing (6) a focal length of a concave lens of the Galileo system by (5) a focal length of a convex lens of the Galileo system is −0.244. Therefore, the correlation −0.08>(6)/(5)>−0.8 is complied with.

As shown in Chart 7 (FIGS. 7a-7c), MTF contrast at 357 LP/mm=1.4 µmL&S is 20% at t0=∞, is 22% at t0=500 mm, and is 22% at t0=150 mm. Therefore, MTF contrast over 20% over the entire image surface from infinity to 150 mm close-up is obtained.

Embodiment 4

FIG. 8 is a diagram illustrating Chart 8 according to Embodiment 4. FIGS. 9a~9c are diagrams illustrating Chart 9 according to Embodiment 4. As shown on Chart 8 and Chart 9 (FIGS. 8 and 9a-9c), Embodiment 4 has:
- image size=1/1.8 inch (9 mmΦ), 4-division-7-piece Gauss modification (Summitar)+2-piece Galileo;
- magnification=1/∞, t0=∞, angle of view=±10.8°, focal length=23.666, F/2.90, front group focus/entirety focus ∞=1.05, Galileo~cover glass=1 mm, CRA=20.1°;
- magnification=0.0491×, t0=500 mm, diagonal field of view=183 mm, focal length=22.847, F/2.60, CRA=19.5°;
- magnification=0.1792×, t0=150 mm, diagonal field of view=50 mm, focal length=20.930, F/2.10, CRA=18.5°.

In Embodiment 4, the value ((3)/(1)) obtained by dividing (3) the focal length of the front group of imaging lens by (1) the focal length of the entirety of the lens combination is 1.05 at t0=∞, is 1.08 at t0=500 mm, and is 1.18 at t0=150 mm. Therefore, the correlation 0.9<(3)/(1)<1.2 is complied with.

In Embodiment 4, the value ((3)/(4)) obtained by dividing (3) the focal length of the front group of imaging lens by (4) a focal length of the Galileo system is −0.737. Therefore, the correlation −0.2>(3)/(4)>−1.1 is complied with.

In Embodiment 4, the value ((6)/(5)) obtained by dividing (6) a focal length of a concave lens of the Galileo system by (5) a focal length of a convex lens of the Galileo system is −0.369. Therefore, the correlation −0.08>(6)/(5)>−0.8 is complied with.

As shown in Chart 9 (FIGS. 9a-9c), MTF contrast at 357 LP/mm=1.4 µmL&S is 25% at t0=∞, is 27% at t0=500 mm, and is 22% at t0=150 mm. Therefore, MTF contrast over 20% over the entire image surface from infinity to 150 mm close-up is obtained.

Embodiment 5

FIG. 10 is a diagram illustrating Chart 10 according to Embodiment 5. FIGS. 11a~11c are diagrams illustrating Chart 11 according to Embodiment 5. As shown on Chart 10 and Chart 11 (FIGS. 10 and 11a-11c), Embodiment 5 has:
- image size=1/1.8 inch (9 mmΦ), 4-division-6-piece Gauss+2-piece Galileo;
- magnification=1/∞, t0=∞, angle of view=±14.0°, focal length=18.077, F/2.80, front group focus/entirety focus ∞=1.02, Galileo~cover glass=1 mm, CRA=25.9°;
- magnification=0.0369×, t0=500 mm, diagonal field of view=244 mm, focal length=17.559, F/2.60, CRA=26.0°;
- magnification=0.1299×, t0=150 mm, diagonal field of view=69 mm, focal length=16.380, F/2.30, CRA=24.5°.

In Embodiment 5, the value ((3)/(1)) obtained by dividing (3) the focal length of the front group of imaging lens by (1) the focal length of the entirety of the lens combination is 1.02 at t0=∞, is 1.05 at t0=500 mm, and is 1.13 at t0=150 mm. Therefore, the correlation 0.9<(3)/(1)<1.2 is complied with.

In Embodiment 5, the value ((3)/(4)) obtained by dividing (3) the focal length of the front group of imaging lens by (4) a focal length of the Galileo system is −0.806. Therefore, the correlation −0.2>(3)/(4)>−1.1 is complied with.

In Embodiment 5, the value ((6)/(5)) obtained by dividing (6) a focal length of a concave lens of the Galileo system by (5) a focal length of a convex lens of the Galileo system is −0.267. Therefore, the correlation −0.08>(6)/(5)>−0.8 is complied with.

In Embodiment 5, modification is made from Embodiment 1 as follows. The pieces of the front lens is changed from 2 pieces as in Embodiment 1 into one piece and the focal length is changed from 18.046 mm to 18.077 mm, and although the focal length of the Galileo system is also slightly changed from −23.764 mm to −22.916 mm, MTF contrast is still good.

As shown in Chart 11 (FIGS. 11a-11c), MTF contrast at 357 LP/mm=1.4 µmL&S is 28% at t0=∞, is 28% at t0=500 mm, and is 21% at t0=150 mm. Therefore, MTF contrast over 21% over the entire image surface from infinity to 150 mm close-up is obtained.

Embodiment 6

FIG. 12 is a diagram illustrating Chart 12 according to Embodiment 6. FIGS. 13a~13c are diagrams illustrating Chart 13 according to Embodiment 6. As shown on Chart 12 and Chart 13 (FIGS. 12 and 13a-13c), Embodiment 6 has:
- image size=1/1.8 inch (9 mmΦ), 4-division-6-piece Gauss+2-piece Galileo;
- magnification=1/∞, t0=∞, angle of view=±16.2°, focal length=15.464, F/3.00, front group focus/entirety focus ∞=1.00, Galileo~cover glass=1 mm, CRA=28.1°;
- magnification=0.0312×, t0=500 mm, diagonal field of view=288 mm, focal length=15.089, F/2.80, CRA=27.7°;
- magnification=0.1065×, t0=150 mm, diagonal field of view=85 mm, focal length=14.259, F/2.55, CRA=27.0°.

In Embodiment 6, the value ((3)/(1)) obtained by dividing (3) the focal length of the front group of imaging lens by (1) the focal length of the entirety of the lens combination is 1.00 at t0=∞, is 1.02 at t0=500 mm, and is 1.08 at t0=150 mm. Therefore, the correlation 0.9<(3)/(1)<1.2 is complied with.

In Embodiment 6, the value ((3)/(4)) obtained by dividing (3) the focal length of the front group of imaging lens by (4) a focal length of the Galileo system is −0.801. Therefore, the correlation −0.2>(3)/(4)>−1.1 is complied with.

In Embodiment 6, the value ((6)/(5)) obtained by dividing (6) a focal length of a concave lens of the Galileo system by (5) a focal length of a convex lens of the Galileo system is −0.220. Therefore, the correlation −0.08>(6)/(5)>−0.8 is complied with.

As shown in Chart 13 (FIGS. 13a-13c), MTF contrast at 357 LP/mm=1.4 µmL&S is 20% at t0=∞, is 20% at t0=500 mm, and is 20% at t0=150 mm. Therefore, MTF contrast over 20% over the entire image surface from infinity to 150 mm close-up is obtained.

Embodiment 7

FIG. 14 is a diagram illustrating Chart 14 according to Embodiment 7. FIGS. 15a~15c are diagrams illustrating Chart 15 according to Embodiment 7. As shown on Chart 14 and Chart 15 (FIGS. 14 and 15a-15c), Embodiment 7 has:

image size=1/1.8 inch (9 mmΦ), 4-division-6-piece Gauss+2-piece Galileo;

magnification=1/∞, t0=∞, angle of view=±11.9°, focal length=21.406, F/2.90, front group focus/entirety focus ∞=1.03, Galileo~cover glass=1 mm, CRA=22.0°;

magnification=0.0441×, t0=500 mm, diagonal field of view=204 mm, focal length=20.693, F/2.60, CRA=21.3°;

magnification=0.1584×, t0=150 mm, diagonal field of view=57 mm, focal length=19.050, F/2.15, CRA=20.6°.

In Embodiment 7, the value ((3)/(1)) obtained by dividing (3) the focal length of the front group of imaging lens by (1) the focal length of the entirety of the lens combination is 1.03 at t0=∞, is 1.07 at t0=500 mm, and is 1.16 at t0=150 mm. Therefore, the correlation 0.9<(3)/(1)<1.2 is complied with.

In Embodiment 7, the value ((3)/(4)) obtained by dividing (3) the focal length of the front group of imaging lens by (4) a focal length of the Galileo system is −0.790. Therefore, the correlation −0.2>(3)/(4)>−1.1 is complied with.

In Embodiment 7, the value ((6)/(5)) obtained by dividing (6) a focal length of a concave lens of the Galileo system by (5) a focal length of a convex lens of the Galileo system is −0.322. Therefore, the correlation −0.08>(6)/(5)>−0.8 is complied with.

As shown in Chart 15 (FIGS. 15a-15c), MTF contrast at 357 LP/mm=1.4 μmL&S is 26% at t0=∞, is 28% at t0=500 mm, and is 23% at t0=150 mm. Therefore, MTF contrast over 20% over the entire image surface from infinity to 150 mm close-up is obtained.

Embodiment 8

FIG. 16 is a diagram illustrating Chart 16 according to Embodiment 8. FIGS. 17a~17c are diagrams illustrating Chart 16 according to Embodiment 8. As shown on Chart 16 and Chart 17 (FIGS. 16 and 17a-17c), Embodiment 8 has:

image size=2/3 inch (12 mmΦ), 4-division-7-piece modified Gauss (Summitar)+2-piece Galileo;

magnification=1/∞, t0=∞, angle of view=±14.0°, focal length=24.127, F/2.80, front group focus/entirety focus ∞=1.04, Galileo~cover glass=1.3 mm, CRA=25.6°;

magnification=0.04986×, t0=500 mm, diagonal field of view=241 mm, focal length=23.288, F/2.60, CRA=25.2°;

magnification=0.1802×, t0=150 mm, diagonal field of view=67 mm, focal length=21.352, F/2.20, CRA=23.3°.

In Embodiment 8, the value ((3)/(1)) obtained by dividing (3) the focal length of the front group of imaging lens by (1) the focal length of the entirety of the lens combination is 1.04 at t0=∞, is 1.08 at t0=500 mm, and is 1.18 at t0=150 mm. Therefore, the correlation 0.9<(3)/(1)<1.2 is complied with.

In Embodiment 8, the value ((3)/(4)) obtained by dividing (3) the focal length of the front group of imaging lens by (4) a focal length of the Galileo system is −0.728. Therefore, the correlation −0.2>(3)/(4)>−1.1 is complied with.

In Embodiment 8, the value ((6)/(5)) obtained by dividing (6) a focal length of a concave lens of the Galileo system by (5) a focal length of a convex lens of the Galileo system is −0.303. Therefore, the correlation −0.08>(6)/(5)>−0.8 is complied with.

As shown in Chart 17 (FIGS. 17a-17c), MTF contrast at 357 LP/mm=1.4 μmL&S is 21% at t0=∞, is 22% at t0=500 mm, and is 20% at t0=150 mm. Therefore, MTF contrast over 20% over the entire image surface from infinity to 150 mm close-up is obtained.

Embodiment 9

FIG. 18 is a diagram illustrating Chart 18 according to Embodiment 9. FIGS. 19a~19c are diagrams illustrating Chart 18 according to Embodiment 9. As shown on Chart 18 and Chart 19 (FIGS. 18 and 19a-19c), Embodiment 9 has:

image size=1/3 inch (6 mmΦ), 4-division-7-piece modified Gauss (Summitar)+2-piece Galileo;

magnification=1/∞, t0=∞, angle of view=±14.0°, focal length=12.009, F/2.80, front group focus/entirety focus ∞=0.99, Galileo~cover glass=1 mm, CRA=24.1°;

magnification=0.0241×, t0=500 mm, diagonal field of view=249 mm, focal length=11.795, F/2.60, CRA=24.0°;

magnification=0.08137×, t0=150 mm, diagonal field of view=74 mm, focal length=11.319, F/2.25, CRA=23.0°.

In Embodiment 9, the value ((3)/(1)) obtained by dividing (3) the focal length of the front group of imaging lens by (1) the focal length of the entirety of the lens combination is 0.99 at t0=∞, is 1.01 at t0=500 mm, and is 1.05 at t0=150 mm. Therefore, the correlation 0.9<(3)/(1)<1.2 is complied with.

In Embodiment 9, the value ((3)/(4)) obtained by dividing (3) the focal length of the front group of imaging lens by (4) a focal length of the Galileo system is −0.755. Therefore, the correlation −0.2>(3)/(4)>−1.1 is complied with.

In Embodiment 9, the value ((6)/(5)) obtained by dividing (6) a focal length of a concave lens of the Galileo system by (5) a focal length of a convex lens of the Galileo system is −0.241. Therefore, the correlation −0.08>(6)/(5)>−0.8 is complied with.

In Embodiment 9, modification is made from Embodiment 1 as follows. The image size is changed from 1/1.8 inch=9 mmΦ as in Embodiment 1 into 1/3 inch=6 mmΦ, which is 0.63 times reduced, and the focal length is changed from 18.046 mm to 12.009 mm, which is shorter by 0.67 times.

As shown in Chart 19 (FIGS. 19a-19c), MTF contrast at 357 LP/mm=1.4 μmL&S is 25% at t0=∞, is 28% at t0=500 mm, and is 28% at t0=150 mm. Therefore, MTF contrast over 20% over the entire image surface from infinity to 150 mm close-up is obtained.

Embodiment 10

FIG. 20 is a diagram illustrating Chart 20 according to Embodiment 10. FIGS. 21a~21c are diagrams illustrating Chart 21 according to Embodiment 10. As shown on Chart 20 and Chart 21 (FIGS. 20 and 21a-21c), Embodiment 10 has:

image size=1/1.8 inch (9 mmΦ), 4-division-6-piece Gauss+2-piece Galileo;

magnification=1/∞, t0=∞, angle of view=±14.2°, focal length=17.748, F/2.80, front group focus/entirety focus ∞=0.99, Galileo~cover glass=3.6 mm, CRA=20.4°;

magnification=0.0361×, t0=500 mm, diagonal field of view=249 mm, focal length=17.404, F/2.60, CRA=20.1°;

magnification=0.1250×, t0=150 mm, diagonal field of view=72 mm, focal length=16.611, F/2.30, CRA=19.5°.

In Embodiment 10, the value ((3)/(1)) obtained by dividing (3) the focal length of the front group of imaging lens by (1) the focal length of the entirety of the lens combination is 0.99 at t0=∞, is 1.01 at t0=500 mm, and is 1.09 at t0=150 mm. Therefore, the correlation 0.9<(3)/(1)<1.2 is complied with.

In Embodiment 10, the value ((3)/(4)) obtained by dividing (3) the focal length of the front group of imaging lens by (4) a focal length of the Galileo system is −0.554. Therefore, the correlation −0.2>(3)/(4)>−1.1 is complied with.

In Embodiment 10, the value ((6)/(5)) obtained by dividing (6) a focal length of a concave lens of the Galileo system by (5) a focal length of a convex lens of the Galileo system is −0.436. Therefore, the correlation −0.08>(6)/(5)>−0.8 is complied with.

In Embodiment 10, the optical axis spacing from the back surface of the concave lens of the Galileo system to the CMOS cover glass incident surface is changed from 1 mm in Embodiment 2 to 3.6 mm.

As shown in Chart 21 (FIGS. 21a-21c), MTF contrast at 357 LP/mm=1.4 μmL&S is 20% at t0=∞, is 22% at t0=500 mm, and is 22% at t0=150 mm. Therefore, if the distance of Galileo~cover glass is separated up to 3.6 mm, MTF tends to deteriorate, but MTF contrast over 20% over the entire image surface from infinity to 150 mm close-up is still obtained.

Embodiment 11

FIG. 22 is a diagram illustrating Chart 22 according to Embodiment 11. FIGS. 23a-23c are diagrams illustrating Chart 23 according to Embodiment 11. As shown on Chart 22 and Chart 23 (FIGS. 22 and 23a-23c), Embodiment 11 has:

image size=1/1.8 inch (9 mmΦ), 4-division-6-piece Gauss+2-piece Galileo;
  magnification=1/∞, t0=∞, angle of view=±14.1°, focal length=17.926, F/2.80, front group focus/entirety focus ∞=1.01, Galileo~cover glass=2 mm, CRA=22.9°;
  magnification=0.0365×, t0=500 mm, diagonal field of view=247 mm, focal length=17.492, F/2.60, CRA=22.4°;
  magnification=0.12728×, t0=150 mm, diagonal field of view=71 mm, focal length=16.503, F/2.30, CRA=21.6°.

In Embodiment 11, the value ((3)/(1)) obtained by dividing (3) the focal length of the front group of imaging lens by (1) the focal length of the entirety of the lens combination is 1.01 at t0=∞, is 1.03 at t0=500 mm, and is 1.09 at t0=150 mm. Therefore, the correlation 0.9<(3)/(1)<1.2 is complied with.

In Embodiment 11, the value ((3)/(4)) obtained by dividing (3) the focal length of the front group of imaging lens by (4) a focal length of the Galileo system is −0.686. Therefore, the correlation −0.2>(3)/(4)>−1.1 is complied with.

In Embodiment 11, the value ((6)/(5)) obtained by dividing (6) a focal length of a concave lens of the Galileo system by (5) a focal length of a convex lens of the Galileo system is −0.322. Therefore, the correlation −0.08>(6)/(5)>−0.8 is complied with.

In Embodiment 11, the optical axis spacing from the back surface of the concave lens of the Galileo system to the CMOS cover glass incident surface is changed from 3.6 mm in Embodiment 11 toward 2 mm, and the contrast close to Embodiment 2 can be obtained.

As shown in Chart 23 (FIGS. 23a-23c), MTF contrast at 357 LP/mm=1.4 μmL&S is 24% at t0=∞, is 23% at t0=500 mm, and is 24% at t0=150 mm. Therefore, MTF contrast over 20% over the entire image surface from infinity to 150 mm close-up is obtained.

Embodiment 12

FIG. 24 is a diagram illustrating Chart 24 according to Embodiment 12. FIGS. 25a-25c are diagrams illustrating Chart 25 according to Embodiment 12. As shown on Chart 24 and Chart 25 (FIGS. 24 and 25a-25c), Embodiment 12 has:

image size=1/1.8 inch (9 mmΦ), 4-division-7-piece modified Gauss (Summitar)+2-piece Galileo with bound plane;
  magnification=1/∞, t0=∞, angle of view=±13.8°, focal length=18.295, F/2.80, front group focus/entirety focus ∞=1.02, Galileo~cover glass=0 mm (bound), CRA=26.6°;
  magnification=0.0373×, t0=500 mm, diagonal field of view=241 mm, focal length=17.664, F/2.60, CRA=25.4°;
  magnification=0.1306×, t0=150 mm, diagonal field of view=57 mm, focal length=16.265, F/2.30, CRA=24.0°.

In Embodiment 12, the value ((3)/(1)) obtained by dividing (3) the focal length of the front group of imaging lens by (1) the focal length of the entirety of the lens combination is 1.02 at t0=∞, is 1.06 at t0=500 mm, and is 1.15 at t0=150 mm. Therefore, the correlation 0.9<(3)/(1)<1.2 is complied with.

In Embodiment 12, the value ((3)/(4)) obtained by dividing (3) the focal length of the front group of imaging lens by (4) a focal length of the Galileo system is −0.964. Therefore, the correlation −0.2>(3)/(4)>−1.1 is complied with.

In Embodiment 12, the value ((6)/(5)) obtained by dividing (6) a focal length of a concave lens of the Galileo system by (5) a focal length of a convex lens of the Galileo system is −0.113. Therefore, the correlation −0.08>(6)/(5)>−0.8 is complied with.

In Embodiment 12, with the modified Gauss (Summitar)+ Galileo type of Embodiment 1, the Galileo system is configured with a convex lens and a concave lens, which is concave at the light input side and planar at the light output side, and the plane is bound to the cover glass of a solid-state image element such as CMOS. Once the concave lens and the cover glass of CMOS are bound together, reflecting surfaces relative to air are two less, so reflection loss becomes less. Furthermore, if the concave lens and the cover glass are integrated, the number of parts is also reduced by one.

In Embodiment 12, since the light output plane is limited to be planar, the degree of design freedom is lowered, and with concave light input plane being aspheric, the deterioration of aberration can be compensated.

As shown in Chart 25 (FIGS. 25a-25c), MTF contrast at 357 LP/mm=1.4 μmL&S is 27% at t0=∞, is 27% at t0=500 mm, and is 24% at t0=150 mm. Therefore, MTF contrast over 20% over the entire image surface from infinity to 150 mm close-up is obtained.

The binding or integration of the concave lens of the Galileo system and the cover glass in Embodiment 12 may also be applied to Embodiment 2 to Embodiment 11, and the aberration can be reproduced by compensating the aberration level difference in each embodiment.

Embodiment 13

FIG. 26 is a diagram illustrating Chart 26 according to Embodiment 13. FIGS. 27a-27c are diagrams illustrating Chart 27 according to Embodiment 13. As shown on Chart 26 and Chart 27 (FIGS. 26 and 27*a*-27*c*), Embodiment 13 has:

image size=1/2.3 inch (7.86 mmΦ), 4-division-7-piece modified Gauss (Summitar)+2-piece Galileo;

magnification=1/∞, t0=∞, angle of view=±16.7°, focal length=14.954, F/2.80, front group focus/entirety focus ∞=1.01, Galileo~cover glass=0 mm (bound), CRA=29.2°;

magnification=0.03033×, t0=500 mm, diagonal field of view=297 mm, focal length=14.493, F/2.60, CRA=27.5°;

magnification=0.10455×, t0=150 mm, diagonal field of view=86 mm, focal length=13.480, F/2.35, CRA=26.6°.

In Embodiment 13, the value ((3)/(1)) obtained by dividing (3) the focal length of the front group of imaging lens by (1) the focal length of the entirety of the lens combination is 1.01 at t0=∞, is 1.04 at t0=500 mm, and is 1.12 at t0=150 mm. Therefore, the correlation 0.9<(3)/(1)<1.2 is complied with.

In Embodiment 13, the value ((3)/(4)) obtained by dividing (3) the focal length of the front group of imaging lens by (4) a focal length of the Galileo system is −1.056. Therefore, the correlation −0.2>(3)/(4)>−1.1 is complied with.

In Embodiment 13, the value ((6)/(5)) obtained by dividing (6) a focal length of a concave lens of the Galileo system by (5) a focal length of a convex lens of the Galileo system is −0.105. Therefore, the correlation −0.08>(6)/(5)>−0.8 is complied with.

As shown in Chart 27 (FIGS. 27*a*-27*c*), MTF contrast at 357 LP/mm=1.4 μmL&S is 28% at t0=∞, is 29% at t0=500 mm, and is 26% at t0=150 mm. Therefore, MTF contrast over 20% over the entire image surface from infinity to 150 mm close-up is obtained.

The binding or integration of the concave lens of the Galileo system and the cover glass in Embodiment 13 may also be applied to Embodiment 2 to Embodiment 11, and the aberration can be reproduced by compensating the aberration level difference in each embodiment.

Embodiment 14

FIG. 28 is a diagram illustrating Chart 28 according to Embodiment 14. FIGS. 29*a*~29*c* are diagrams illustrating Chart 29 according to Embodiment 14. As shown on Chart 28 and Chart 29 (FIGS. 28 and 29*a*-29*c*), Embodiment 14 has:

image size=1/2.3 inch (7.86 mmΦ), 4-division-7-piece Gauss+2-piece Galileo with bound plane;

magnification=1/∞, t0=∞, angle of view=±16.6°, focal length=15.051, F/2.80, front group focus/entirety focus ∞=1.01, Galileo~cover glass=0 mm (bound), CRA=29.2°;

magnification=0.03046×, t0=500 mm, diagonal field of view=295 mm, focal length=14.500, F/2.60, CRA=27.5°;

magnification=0.1059×, t0=150 mm, diagonal field of view=85 mm, focal length=13.458, F/2.30, CRA=26.3°.

In Embodiment 14, the value ((3)/(1)) obtained by dividing (3) the focal length of the front group of imaging lens by (1) the focal length of the entirety of the lens combination is 1.01 at t0=∞, is 1.05 at t0=500 mm, and is 1.13 at t0=150 mm. Therefore, the correlation 0.9<(3)/(1)<1.2 is complied with.

In Embodiment 14, the value ((3)/(4)) obtained by dividing (3) the focal length of the front group of imaging lens by (4) a focal length of the Galileo system is −1.076. Therefore, the correlation −0.2>(3)/(4)>−1.1 is complied with.

In Embodiment 14, the value ((6)/(5)) obtained by dividing (6) a focal length of a concave lens of the Galileo system by (5) a focal length of a convex lens of the Galileo system is −0.089. Therefore, the correlation −0.08>(6)/(5)>−0.8 is complied with.

As shown in Chart 29 (FIGS. 29*a*-29*c*), MTF contrast at 357 LP/mm=1.4 μmL&S is 27% at t0=∞, is 29% at t0=500 mm, and is 26% at t0=150 mm. Therefore, MTF contrast over 20% over the entire image surface from infinity to 150 mm close-up is obtained.

The binding or integration of the concave lens of the Galileo system and the cover glass in Embodiment 14 may also be applied to Embodiment 2 to Embodiment 11, and the aberration can be reproduced by compensating the aberration level difference in each embodiment.

(Summary of Embodiments)

Figure 30:
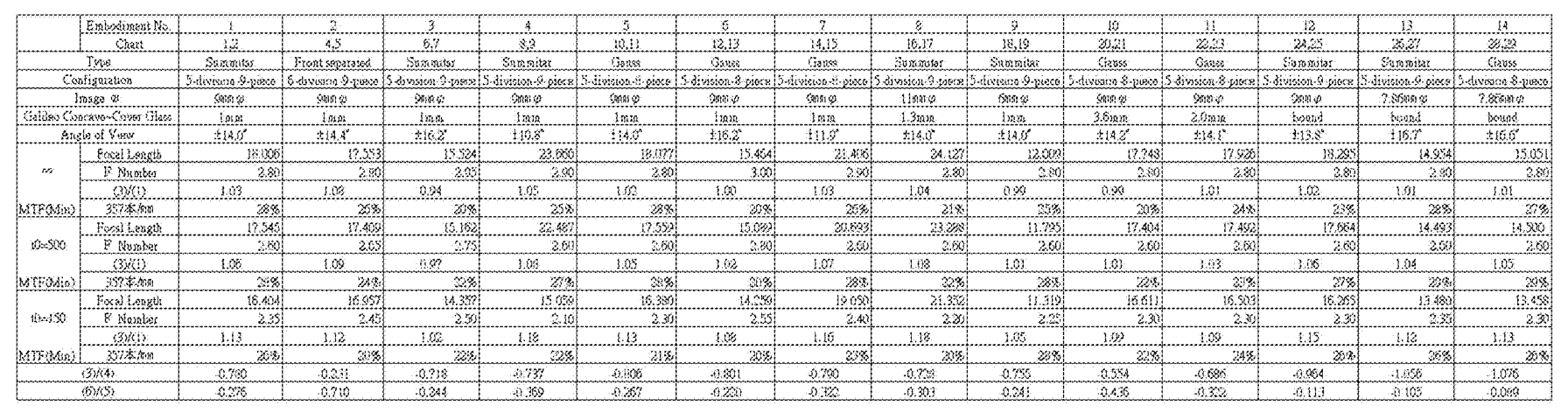

FIG. 30 is a table summarizing the results of all embodiments. In the imaging lens according to the present application, the convex-concave Galileo system is fixed in the vicinity of the imaging plane. In the above embodiments, in the case that the lens surface at the imaging plane side of a concave lens of the convex-concave Galileo system is bound to the cover glass of the image sensor (Embodiments 12-14), a spacing 3.6 mm (Embodiment 10) is indicated.

Aberration correction is easier when spacing between an end of the Galileo system at the imaging sensor side and an end of the image sensor at the lens side is less. As a definition of "the convex-concave Galileo system is fixed in the vicinity of the imaging plane", depending on the focal length or the imaging plane size, spacing between the end of the Galileo system at the imaging sensor side and the end of the image sensor at the lens side can be exemplified as a range of 0-8 mm, it can be exemplified as a preferable range of 0-6 mm, and it can be exemplified as a more preferable range of 0-4 mm.

For example, in Embodiment 2, as the focal length of the front group/the focal length of the Galileo system (3)/(4))=−0.231, the focal length of the Galileo system is long. Since the focal length of the Galileo system is long, for compensating the image curvature in the Galileo system, the radius of Petzval curvature in the Galileo system is also mildly enlarged. As such, it stands as the radius of Petzval curvature of the front group in Embodiment 2 is −55.540 mm, which means a weak correction is enough.

On the contrary, in Embodiment 12, as the focal length of the front group/the focal length of the Galileo system (3)/(4))=−0.964, the focal length of the Galileo system is short. This means that as the radius of Petzval curvature of the front group is −28.360 mm, the image curvature is collapsed toward the front side, so a strong correction must be applied in the Galileo system.

For reducing the radius of Petzval curvature in the Galileo system, the concave lens is required to be highly minus. Therefore, in Embodiment 2, compared with the focal length of the concave lens of the Galileo system/the focal length of the convex lens ((6)/(5))=−0.710, which is a large value, the focal length of the concave lens of the Galileo system/the focal length of the convex lens ((6)/(5))=−0.113, which is a small value.

As demonstrated in the above embodiments, since the convex-concave Galileo system is fixed near the imaging plane, the Galileo system is disposed near the focus. Therefore, the value ((3)/(1)) obtained by dividing (3) the focal length of the front group imaging lens without the convex-concave Galileo system by (1) the focal length of the entirety of the lens combination is in the range of 0.9 to 1.2. This means that even if a lens with a strong negative power is brought into the Galileo system, the focal length of the entirety of the imaging lens is close to that of the front group imaging lens. In other words, the focal length of the Galileo system provides a degree of freedom that does not affect the overall focal length too much. This allows the image curvature of the front group to be easily compensated by the Galileo system, and MTF over 20% at 1.4 μmL&S can be obtained.

The value ((3)/(4)) obtained by dividing (3) the focal length of the front group of imaging lens by (4) the focal length of the Galileo system is a Petzval correction ratio indicated by a ratio of the focal lengths of the front group and the Galileo system. The value is small when the radius of Petzval curvature of the front group is long, and in contrast, it is large when the radius of Petzval curvature of the front group is short.

As demonstrated in the above embodiments, the lens is design to have the value ((3)/(4)) obtained by dividing (3) the focal length of the front group imaging lens by (4) the focal length of the Galileo system fall within a range of –0.2 to –1.0.

The value ((5)/(6)) related to correction with the convex-concave Galileo system is obtained by dividing (5) the focal length of the convex lens of the convex-concave Galileo system by (6) the focal length of the concave lens. When the focal length of the concave lens is relatively long (=Petzval correction is relatively small), it results in a relatively large value. When the focal length of the concave lens is relatively short (=Petzval correction is relatively large), it results in a relatively small value. According to the present application, if the image plane of the front group is upright, a gradual Galileo correction is performed. If the image plane largely curves, an intensive Galileo correction is performed. Control can be conducted with the convex and concave Galileo system.

In order to obtain MTF over 20% at 1.4 μmL&S as demonstrated in the above embodiments, the lens is designed to have the numerical value ((5)/(6)) obtained by dividing (5) the focal length of the convex lens of the convex-concave Galileo system by (6) the focal length of the concave lens lie in the range of –0.08 to –0.8.

With the above correction, MTF over 20% at 1.4 μmL&S (=357 LP/mm) can be obtained on the entire imaging surface from infinity (distance t0=∞) to close position (t0=150 mm).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An imaging lens, comprising:
   a front group of imaging lens comprising a plurality of lenses, which are anteroposteriorly arranged with an diaphragm interposed therein; and
   a convex-concave Galileo system formed with a convex lens at a front group side and a concave lens at an imaging plane side, focusing being performed by fixing the convex-concave Galileo system in a vicinity of an imaging plane and advancing the front group of imaging lens,
   wherein a surface at the imaging plane side of a lens, which is an end one of the Galileo system at the imaging plane side, is a planar surface, and the planar surface is in contact with a surface at an end of an image sensor at the imaging plane side.

2. The imaging lens according to claim 1, wherein a value obtained by dividing a focal length of the front group of imaging lens without the convex-concave Galileo system by a focal length of an entirety of the imaging lens is within a range greater than 0.9 and less than 1.2.

3. The imaging lens according to claim 2, wherein a value obtained by dividing a focal length of the front group of imaging lens by a focal length of the convex-concave Galileo system is within a range less than –0.2 and greater than –1.1.

4. The imaging lens according to claim 3, wherein a value obtained by dividing a focal length of the concave lens of the convex-concave Galileo system by a focal length of the convex lens is within a range less than –0.08 and greater than –0.8.

5. The imaging lens according to claim 4, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

6. The imaging lens according to claim 3, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

7. The imaging lens according to claim 2, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

8. The imaging lens according to claim 1, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

9. The imaging lens according to claim 2, wherein a value obtained by dividing a focal length of the concave lens of the convex-concave Galileo system by a focal length of the convex lens is within a range less than –0.08 and greater than –0.8.

10. The imaging lens according to claim 9, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

11. An imaging lens, comprising:
    a front group of imaging lens comprising a plurality of lenses, which are anteroposteriorly arranged with an diaphragm interposed therein; and
    a convex-concave Galileo system formed with a convex lens at a front group side and a concave lens at an imaging plane side, focusing being performed by fixing the convex-concave Galileo system in a vicinity of an imaging plane and advancing the front group of imaging lens,
    wherein the front group of imaging lens is of a 4-division-6-piece Gauss type, a 4-division-7-piece Summitar type, or a modified Summitar type, in which front doublet lenses are divided to form a 5-division-7-piece one.

12. The imaging lens according to claim 11, wherein a value obtained by dividing a focal length of the front group of imaging lens without the convex-concave Galileo system by a focal length of an entirety of the imaging lens is within a range greater than 0.9 and less than 1.2.

13. The imaging lens according to claim 12, wherein a value obtained by dividing a focal length of the front group of imaging lens by a focal length of the convex-concave Galileo system is within a range less than −0.2 and greater than −1.1.

14. The imaging lens according to claim 13, wherein a value obtained by dividing a focal length of the concave lens of the convex-concave Galileo system by a focal length of the convex lens is within a range less than −0.08 and greater than −0.8.

15. The imaging lens according to claim 14, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

16. The imaging lens according to claim 13, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

17. The imaging lens according to claim 12, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

18. The imaging lens according to claim 11, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

19. The imaging lens according to claim 12, wherein a value obtained by dividing a focal length of the concave lens of the convex-concave Galileo system by a focal length of the convex lens is within a range less than −0.08 and greater than −0.8.

20. The imaging lens according to claim 19, wherein with a standard specification of 1/1.8 inch (9 mmΦ, 7.2×5.4 mm) imaging plane and ±14.1° angle of view, a size range of the imaging plane is characterized to be ⅓ inch (6 mmΦ, 8×3.6 mm) to 1 inch (16 mmΦ, 12.8×9.6 mm) and a range of the angle of view is characterized to be ±9.8° to ±16.8°.

* * * * *